(12) United States Patent
Unrath

(10) Patent No.: US 8,288,679 B2
(45) Date of Patent: Oct. 16, 2012

(54) LASER PROCESSING SYSTEMS USING THROUGH-THE-LENS ALIGNMENT OF A LASER BEAM WITH A TARGET FEATURE

(75) Inventor: Mark A. Unrath, Portland, OR (US)

(73) Assignee: Electro Scientific Industries, Inc., Portland, OR (US)

(*) Notice: Subject to any disclaimer, the term of this patent is extended or adjusted under 35 U.S.C. 154(b) by 337 days.

(21) Appl. No.: 12/790,093

(22) Filed: May 28, 2010

(65) Prior Publication Data

US 2010/0301024 A1 Dec. 2, 2010

Related U.S. Application Data

(60) Provisional application No. 61/181,889, filed on May 28, 2009.

(51) Int. Cl.
*B23K 26/00* (2006.01)
*B23K 26/02* (2006.01)
*B23K 26/08* (2006.01)
*B23K 26/06* (2006.01)

(52) U.S. Cl. .................................. 219/121.67
(58) Field of Classification Search ............... 219/121.6, 219/121.67
See application file for complete search history.

(56) References Cited

U.S. PATENT DOCUMENTS

| | | | |
|---|---|---|---|
| 5,084,883 A | 1/1992 | Khalid et al. | |
| 5,751,585 A | 5/1998 | Cutler et al. | |
| 5,798,927 A | 8/1998 | Cutler et al. | |
| 5,837,962 A | 11/1998 | Overbeck | |
| 5,847,960 A | 12/1998 | Cutler et al. | |
| 6,496,292 B2 | 12/2002 | Fillion et al. | |
| 6,706,998 B2 | 3/2004 | Cutler | |
| 6,706,999 B1 | 3/2004 | Barrett et al. | |
| 6,713,718 B1 | 3/2004 | Lu | |
| 7,019,891 B2 | 3/2006 | Johnson | |
| 7,133,182 B2 | 11/2006 | Johnson et al. | |
| 7,133,186 B2 | 11/2006 | Johnson | |
| 7,133,187 B2 | 11/2006 | Johnson | |
| 7,133,188 B2 | 11/2006 | Johnson | |

(Continued)

FOREIGN PATENT DOCUMENTS

WO 0047361 A1 8/2000

(Continued)

OTHER PUBLICATIONS

Notification of Transmittal of the International Search Report and The Written Opinion of the International Searching Authority, or the Declaration dated Jan. 5, 2011, for PCT/US2010/036707, international filing date May 28, 2010.

*Primary Examiner* — William D Coleman
(74) *Attorney, Agent, or Firm* — Stoel Rives LLP

(57) ABSTRACT

A laser processing system for micromachining a workpiece includes a laser source to generate laser pulses for processing a feature in a workpiece, a galvanometer-driven (galvo) subsystem to impart a first relative movement of a laser beam spot position along a processing trajectory with respect to the surface of the workpiece, and an acousto-optic deflector (AOD) subsystem. The AOD subsystem may include a combination of AODs and electro-optic deflectors. The AOD subsystem may vary an intensity profile of laser pulses as a function of deflection position along a dither direction. The AOD subsystem may be used for aligning a processing laser beam to workpiece features.

15 Claims, 35 Drawing Sheets

U.S. PATENT DOCUMENTS

| | | |
|---|---|---|
| 7,245,412 B2 | 7/2007 | Bruland et al. |
| 7,297,972 B2 | 11/2007 | Bruland |
| 7,315,038 B2 | 1/2008 | Bruland |
| 2006/0039419 A1 | 2/2006 | Deshi |
| 2008/0017618 A1 | 1/2008 | Bruland |
| 2009/0059976 A1* | 3/2009 | Shibatani .................. 372/29.01 |
| 2009/0125242 A1* | 5/2009 | Choi et al. ..................... 702/19 |
| 2009/0321396 A1 | 12/2009 | Gu et al. |
| 2010/0301023 A1 | 12/2010 | Unrath et al. |

FOREIGN PATENT DOCUMENTS

| | | |
|---|---|---|
| WO | 2005121889 A2 | 12/2005 |

* cited by examiner

LASER PROCESSING SYSTEMS USING THROUGH-THE-LENS ALIGNMENT OF A LASER BEAM WITH A TARGET FEATURE

RELATED APPLICATION

This application claims the benefit under 35 U.S.C. §119(e) of U.S. Provisional Application No. 61/181,889, filed May 28, 2009, which is hereby incorporated by reference herein in its entirety.

TECHNICAL FIELD

This disclosure is related to laser processing of dielectric or other materials.

BACKGROUND INFORMATION

Laser processing of dielectric and conductive materials is commonly used to ablate fine features in electronic components. For example, chip packaging substrates may be laser processed in order to route signals from the semiconductor die to a ball-grid array or similar package. Laser processed features may include signal traces, ground traces, and microvias (to connect signal traces between package layers). A recent design trend incorporates signal and ground traces on a single layer to tightly control signal impedance while reducing the number of layers in a chip package. Such an approach may require small feature dimensions and spacing (e.g., about 10 microns (μm) to about 25 μm), and long trace lengths per package (e.g., about 5 meters (m) to about 10 m). In order to construct chip packages economically, the speed at which such features are ablated may be quite high (e.g., from about 1 meter/second (m/s) to about 10 m/s). Certain packages may be processed, for example, in about 0.5 second (s) to about 5 s to meet customer throughput goals.

Another useful characteristic of chip packaging may be to provide intersecting traces with controlled depth variation. For example, ground traces may branch at several points throughout the pattern. At each branching intersection, the traces may be ablated with a desired depth variation of less than about +/−10%. Normally, if two trenches were to be ablated at one point, the double exposure of the ablating beam would create a depth variation of about 100%.

Another useful characteristic of chip packaging may be to provide variable trace widths at different parts of the package to control impedance or provide pads for inter-layer connection vias. Trace width control should be provided with reduced or minimal disruption to the high-velocity processing of the main trace.

It may also be useful to process features of arbitrary size and shape, at high speed, with reduced or minimal time used to change the feature's characteristics. For example, features may include microvias with a variety of diameters and/or sidewall taper, square or rectangular pads, alignment fiducials, and/or alphanumeric notation. Traditionally, for processing features such as microvias, optical systems have been designed to provide shaped intensity profiles (e.g., flat-top beams) of variable diameter, or purely Gaussian beams. These optical systems may have significant time delays (e.g., about 10 milliseconds (ms) to about 10 s) when changing laser processing spot characteristics.

Other problems are associated with building a machine to meet the processing parameters noted above. For example, traces may change direction throughout the package due to routing requirements. When processing traces at high velocity, the variation in trajectory angle may require high beam position acceleration at very short time scales. Laser processing can easily exceed the dynamic limits of the beam positioner, for example, when running at the high velocities (e.g., about 1 m/s to about 10 m/s) used for high throughput.

Such accelerations and/or velocities may be difficult to achieve in traditional laser processing machines, which have relied on beam positioning technologies such as linear stages in combination with mirror galvanometer beam deflectors (referred to herein as "galvos" or "galvo mirrors"), along with static (or slowly varying) beam conditioning optics that cannot respond in the time scales used for this type of processing (e.g., on the order of about 1 microsecond (μs) to about 100 μs).

The actual ablation process may also be a factor to consider. Laser pulses with high peak power may be used to ablate the dielectric material while minimizing thermal side effects such as melting, cracking, and substrate damage. For example, ultrafast lasers with pulse widths in a range between about 20 picoseconds (ps) and about 50 ps at repetition rates of about 5 megaHertz (MHz) to about 100 MHz can process materials with high peak power while providing significant pulse overlap to avoid pulse spacing effects. Fiber lasers now commonly provide pulse widths in the nanosecond region at repetition rates of greater than about 500 kiloHertz (kHz). Normally, for a given process condition (ablation depth and width), the "dosage" (power/velocity) applied to the processed material should be constant. However, at low velocities, the applied power may become so low that the peak pulse power may be insufficient to ablate the material without inducing thermal effects (e.g., melting and charring).

Another processing effect that can reduce ablation efficiency may be the interaction of the processing beam with the plume of ablated material. Plumes may distort or deflect the beam enough to disrupt the focused beam, or cause accuracy issues due to its deflection.

Beam positioner designs may deflect the process beam using galvos. The intensity profile of the process beam at a workpiece may be Gaussian (for simple focusing of a Gaussian beam), or a shaped intensity profile (e.g., flat-top profile) for beams conditioned by a fixed optic beam shaper.

Systems have been described in which acousto-optic deflectors (AODs) have been combined with galvos to provide high-speed deflection, for example in U.S. Pat. Nos. 5,837,962 and 7,133,187. However, these references do not describe obtaining the desired performance in advanced beam positioner designs.

SUMMARY OF THE DISCLOSURE

In one embodiment, a laser processing system for micromachining a workpiece includes a laser source to generate a series of laser pulses for processing a feature in a surface of the workpiece, a galvanometer-driven (galvo) subsystem to impart a first relative movement of a laser beam spot position along a processing trajectory with respect to the surface of the workpiece, and an acousto-optic deflector (AOD) subsystem. The AOD subsystem may include a combination of AODs and electro-optic deflectors.

In one embodiment, a method is provided for aligning a processing laser beam to workpiece features. The processing laser beam comprising a predetermined wavelength for processing the workpiece features. The method includes propagating the processing laser beam along a propagation path through a scan lens to a workpiece. The method also includes manipulating the processing laser beam so as to illuminate, through the scan lens, a selected region of the workpiece comprising an alignment target with the manipulated processing laser beam at the predetermined wavelength. The selected region is larger than a reference laser beam spot of the processing laser beam provided through the scan lens. The method further includes directing at least a portion of a reflection of the manipulated processing laser beam back through the scan lens to a camera for imaging the selected region of the workpiece. Based on an image of the selected region captured by the camera, the method also includes determining a position of the reference laser beam spot relative to the alignment target.

DETAILED DESCRIPTION OF PREFERRED EMBODIMENTS

Figure 1:
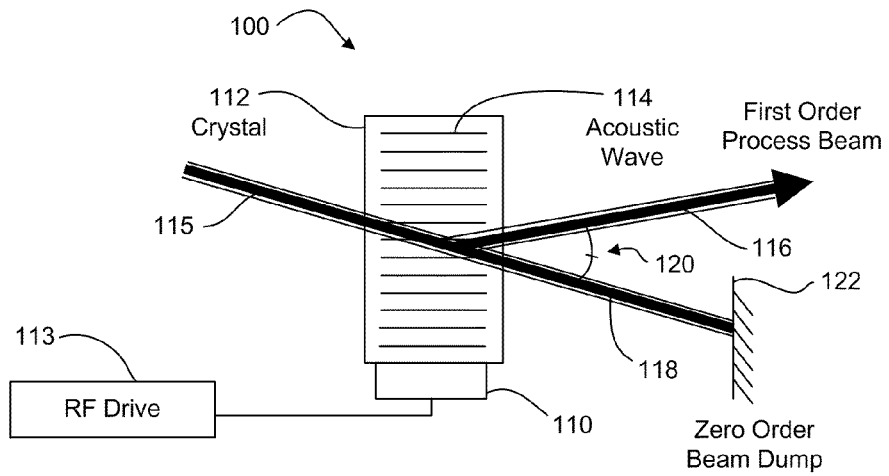
FIG. 1 is a block diagram illustrating operation of an AOD that may be used according to certain embodiments.

Embodiments disclosed herein provide flexible, high-speed beam positioning and conditioning that is economical and feasible. This disclosure describes the use of AODs in combination with linear positioning stages and/or galvos.

While the example embodiments disclosed herein are directed to AODs, electro-optic deflectors (EODs) may also be used. In certain embodiments, for example, EODs are suitable replacements for some or all AOD pointing (deflection) functions. EODs (when set up for angular deflection) do not typically modulate power. Thus, in certain embodiments, one or more AODs are used for power modulation and one or more EODs are used for pointing. Acousto-optic devices that perform modulation may be referred to herein as acousto-optic modulators (AOMs). Other mechanical beam steering technologies such as fast-steering mirrors (FSMs) may be substituted for the galvo beam positioning subsystem without loss of functionality.

A laser processing system, according to certain embodiments described in detail below, provides both AOD and galvo positioning. A system that includes AOD and galvo beam positioning may provide the ability to trade off larger deflection range vs. high diffraction efficiency from the AOD by tailoring the power linearization curves for desired operating condition.

Certain embodiments provide for dithering the process beam by rapidly updating the AOD deflection commands to produce a selected intensity profile for customized processing of the workpiece. The dithering can be used to change the effective dimensions of a process beam (e.g., its width or cross-sections shape), or to create customized spot intensity profiles for applications such as via formation (top-hat intensity profiles of arbitrary shape). Dithering may be used, for example, to create intersecting ablated features on the workpiece while avoiding undesirable depth variation due to over-exposure of portions of the intersection. Intersection processing capabilities disclosed herein allow for either continuous processing (shaping the beam intensity profile while processing the main features, without stopping), or custom processing using a raster approach, which provides the ability to create arbitrarily-shaped intersections that may otherwise be impossible or difficult to process on-the-fly.

A system with AOD and galvo positioning may also provide for optimizing the raster pattern (location and intensity of process beam points) to properly form a desired intersection. Certain embodiments also provide for correcting for galvo positioning error by properly filtering galvo error signals to match the phase and gain response from the galvo error to beam position over a selected frequency range, while simultaneously filtering undesirable noise. In an alternative approach to dithering, certain embodiments provide for changing the process beam spot size by "chirping" the AOD acoustic waveform to defocus the beam on a pulse-pulse basis.

In addition, or in other embodiments, the operation of galvo beam positioners are coordinated with the operation of AOD positioning to allow the AODs to deflect the process beam for high-bandwidth trajectory components and to allow the galvos to deflect the beam for the lower-bandwidth components, either through separate profiling commands or through filtering of the main beam trajectory commands. High-velocity beam trajectories may be enabled by allowing the AODs to reduce beam velocity in a small, local area while not changing galvo velocity, which enables processing of larger local features at full speed. Similarly, the modulation of process beam power to maintain constant dosage during feature processing (independent of beam velocity) allows the galvos to run at full speed in certain sections and to rapidly decelerate to lower speeds at other sections to better track the trajectory.

In certain embodiments, multiple workpiece features may be processed in parallel (using AODs to dither between features) to reduce the beam positioner speed and allow higher throughput through parallel processing. The intersection processing capabilities provided by AODs may be used to join portions of the workpiece features processed in parallel to adjoining sections that are not processed in parallel.

AODs may also be used to stabilize beam jitter at little additional cost or complexity in the optical train and/or to avoid the undesirable effects of plume formation during workpiece processing by using the AODs to dither the beam position along the velocity vector of the selected workpiece feature. AODs may also be used to simultaneously provide field illumination and a reference process beam spot for through-the-lens viewing of and alignment to the workpiece, providing (at little extra cost or complexity) the ability to align the process beam to workpiece features with very high accuracy, and also to optimize the focus adjustment for the process beam. AODs may also provide the ability to tailor the duty cycle of a process beam such that heat-affected-zone effects are minimized.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments can be practiced without one or more of the specific details, or with other methods, components, or materials. Further, in some cases, well-known structures, materials, or operations are not shown or described in detail in order to avoid obscuring aspects of the invention. Furthermore, the described features, structures, or characteristics may be combined in any suitable manner in one or more embodiments.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a non-transitory, machine-readable medium having stored thereon instructions that may be used to program a computer (or other electronic device) to perform the processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/computer-readable medium suitable for storing electronic instructions.

I. AOD Overview

FIG. 1 illustrates the operation of an AOD 100 that may be used according to certain embodiments. The AOD 100 includes a piezoelectric transducer 110 bonded to a crystal 112. The AOD 100 further includes a radio frequency (RF) drive 113 configured to drive the piezoelectric transducer 110 to produce an RF frequency acoustic wave 114 (e.g., in a frequency range between about 50 MHz and about 1500 MHz) in the crystal 112. An incoming laser beam 115 is diffracted by the acoustic wave 114 set up in the crystal 112, with a portion of the input beam power being deflected (a "first order" beam 116) and the remainder of the power being undeflected (a "zero order" beam 118). In some embodiments, the first order beam 116 is used for processing and the zero order beam is sent to a beam dump 122. The first order deflection angle 120 is proportional to the applied RF frequency.

Figure 2:
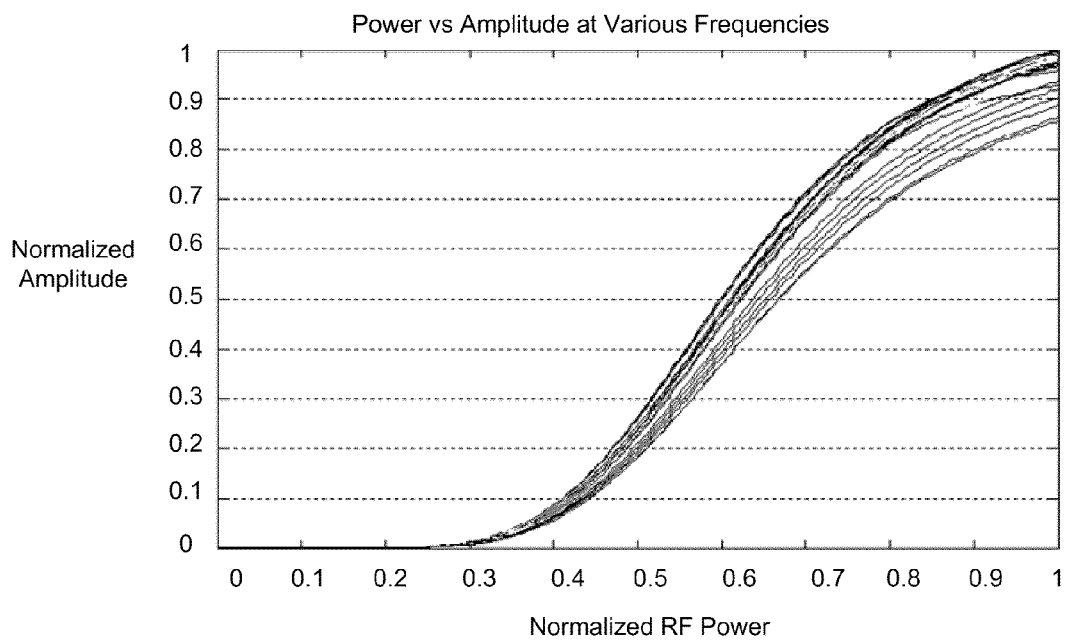
FIG. 2 graphically represents AOD diffraction efficiency curves vs. RF power at various RF frequencies that may be used according to certain embodiments.

In one embodiment, the incoming beam angle relative to the acoustic wave column is set to the Bragg angle. Setting the incoming beam angle to the Bragg angle increases or maximizes the diffraction efficiency, which is the ratio of first order beam power to input beam power. The relative power deflected into the first order beam 116 may be approximately proportional to the RF power applied by the RF drive 113 at low RF power levels. However, the relative power deflected into the first order beam 116 may saturate at a high level (e.g., as shown in FIG. 2). In actual operation, small amounts of power may also be scattered or deflected into higher order beams (not shown).

Diffraction efficiencies of AODs can range up to about 95% or more for a properly designed device with a good (high quality Gaussian) input beam, at a selected RF frequency and amplitude. As the RF frequency varies, the deflected beam angles vary, and the diffraction efficiency falls below its maximum value. AODs can maintain greater than about 90% efficiency over a deflection range equivalent to about 3 to 5 diameters of the focused spot at a workpiece (not shown). Specially designed AODs can achieve even higher diffraction efficiencies through techniques that steer the acoustic beam angle as a function of RF frequency.

Two AODs can be combined to create a two-dimensional (2-D) deflection subsystem. When placed before the galvos, as discussed below, the two AODs impart a small beam deflection around the nominal beam position created by the galvos. Such an arrangement is described, for example, in U.S. Pat. No. 5,837,962. When using such an arrangement to process a workpiece, certain embodiments maintain a constant beam power during AOD deflection despite the variation in diffraction efficiency as a function of AOD deflection. Maintaining a constant beam power during AOD deflection can be accomplished at high speed (e.g., at update rates used for AODs from about 0.1 μps to about 10 μs) by updating (e.g., modulating) the RF power amplitude as a function of RF frequency. The RF power modulation has the effect of lowering the diffraction efficiency in the middle portion of the AOD deflection range such that it matches or approximates the lowest diffraction efficiency. While matching the lowest diffraction efficiency lowers the efficiency of the deflection subsystem, it allows the AODs to be used in applications that use substantially constant (or predictable) power over the AOD deflection range.

As discussed above, EODs may be used as an alternative to AODs (or in conjunction with AODs) for angular deflection applications. EOD deflectors have capabilities similar to AODs, with limited range (e.g., equivalent to a few spot diameters at the workpiece), very high bandwidths (e.g., microsecond response times), and high transmission efficiency. However, the crystals used to implement EOD devices may suffer from relatively high optical power absorption (e.g., a few percent) or significant electrical power dissipation, which may lead to issues with thermal lensing and/or beam pointing drift. Still, for some embodiments (e.g., using low optical power and/or high-transmission wavelengths), the techniques described below using AODs may be accomplished with EODs.

II. Power Linearization

To properly use AODs in laser processing applications, according to certain embodiments, the diffraction efficiency curve is linearized as a function of RF power and frequency. For predictable operation, a normalized AOD power attenuation command (ranging from 0 to 1) may be used that results in linear attenuation of the first order beam power. FIG. 2 graphically represents AOD diffraction efficiency curves vs. RF power at various RF frequencies that may be used according to certain embodiments. As shown in FIG. 2, AOD diffraction efficiency curves are generally non-linear. Due to the non-linear nature of the diffraction efficiency curves, diffraction efficiency vs. RF power may be mapped, according to certain embodiments, and a linearization function (e.g., a polynomial equation, look-up-table, or similar algorithm) may be generated that provides the RF power that results in the commanded attenuation.

Figure 3:
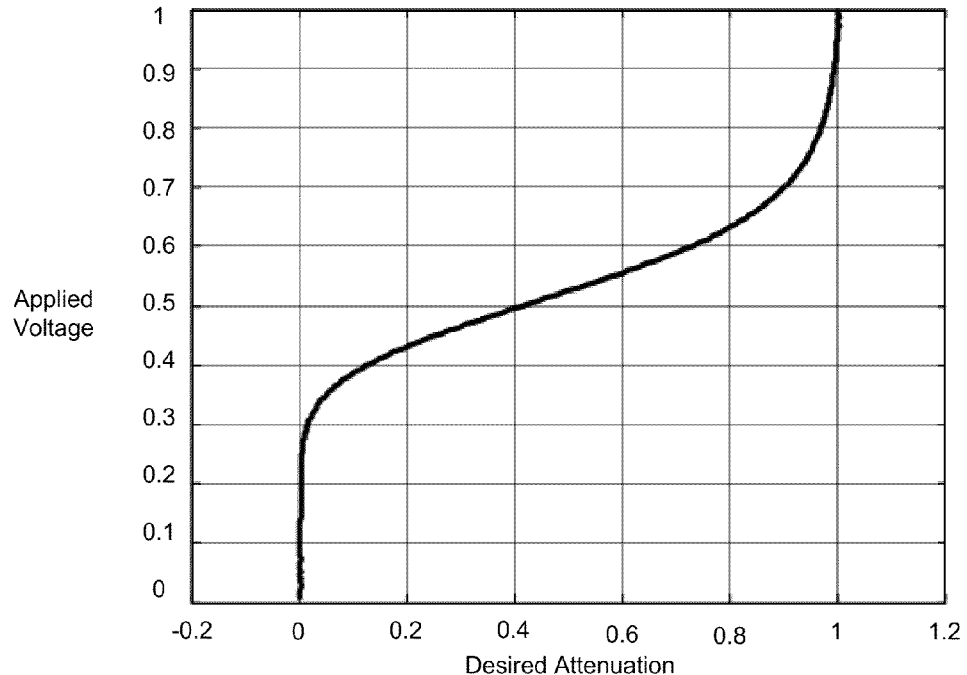
FIG. 3 graphically represents an example AOD power linearization curve used to select a desired attenuation according to one embodiment.

FIG. 3 graphically represents an example AOD power linearization curve used to select a desired attenuation according to one embodiment. The example linearization function illustrated in FIG. 3 may be represented in lookup table form. The linearization function shown in FIG. 3 is valid for a specified RF frequency, with slight variation for different RF frequencies. To enable linear operation over a reasonable RF frequency (and thus deflection) range, certain embodiments use a plurality of linearization tables. The number of linearization tables depends on the frequency range applied to the AOD and the precision with which the power normalization is maintained. In certain embodiments, the linearization tables can create linear power regulation within a tolerance of about 1%.

In a 2-D AOD configuration, only one AOD may be necessary to control the RF power for power linearization. Modulation of a first AOD's RF power can provide the control used to linearize the diffraction efficiency of a second AOD. In certain such embodiments, the second AOD operates near its saturation point, where changes in the RF frequency have the smallest effect on diffraction efficiency, which minimizes or reduces the diffraction efficiency variation as a function of deflection. If desired for certain embodiments, either of the two AODs can be used for power linearization. In certain embodiments, the first AOD may be used for coarse power control and the second AOD may be used for fine power control in order to minimize or reduce the linearization errors introduced by quantized RF power commands.

Figure 4:
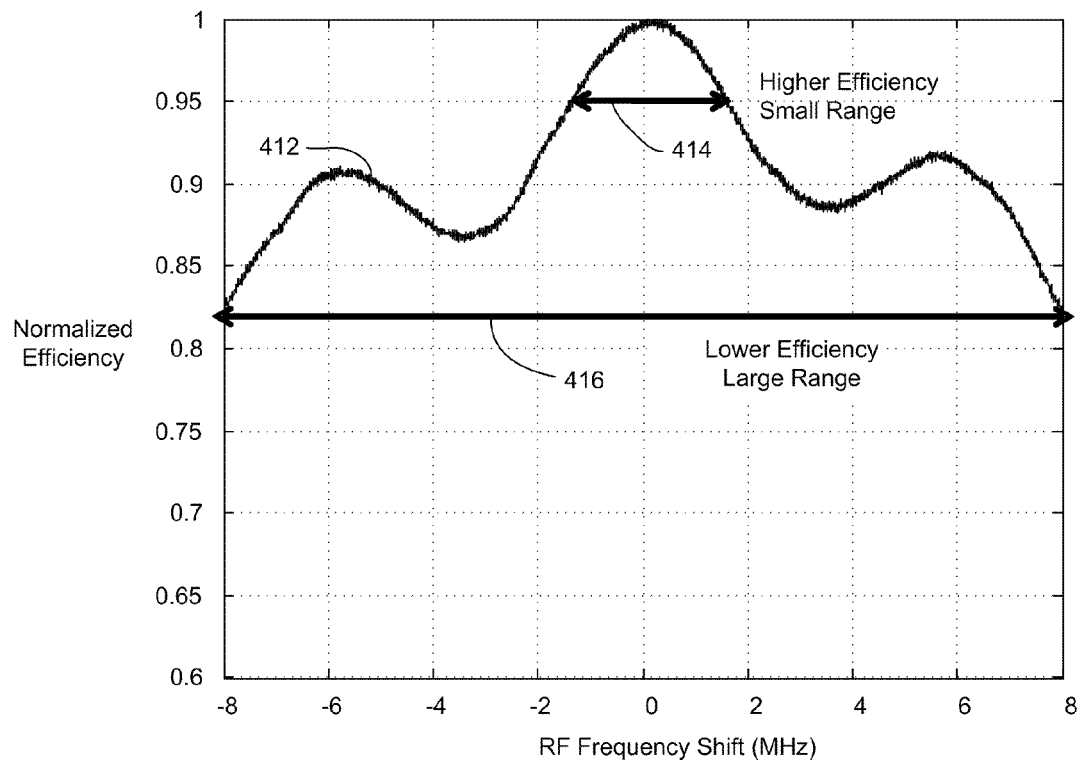
FIG. 4 graphically represents AOD diffraction efficiencies vs. RF frequency that may be used to select a tradeoff between diffraction efficiency and deflection range according to certain embodiments.

Due to the peaking of the diffraction efficiency curve at an optimum RF frequency setting, operation at other frequencies may require that the AOD run at a lower optical efficiency. If the AOD is to be operated with consistent optical output power over a given deflection range, the requested output power may be configured in certain embodiments to remain below the minimum achievable output power over the entire deflection range. This constraint may be recognized in the design of the laser processing system, and may guide the selection of the AOD's operational deflection range. For processes that require very high optical efficiency, the AOD can be operated within a small deflection range (e.g., less than about 5 spot diameters). For processes requiring a larger deflection range (e.g., up to hundreds of spot diameters), the maximum efficiency can be reduced to allow the user to trade off efficiency (e.g., optical power) vs. deflection range. For example, FIG. 4 graphically represents AOD diffraction efficiencies vs. RF frequency that may be used to select a tradeoff between diffraction efficiency and deflection range according to certain embodiments. FIG. 4 shows the diffraction efficiency response vs. RF frequency shift and the change in minimum diffraction efficiency for an example RF frequency (deflection amplitude) operating range 412. A high efficiency over a small range is shown at arrow 414 and a lower efficiency over a larger range is shown at arrow 416.

III. Dithering

Figure 5:
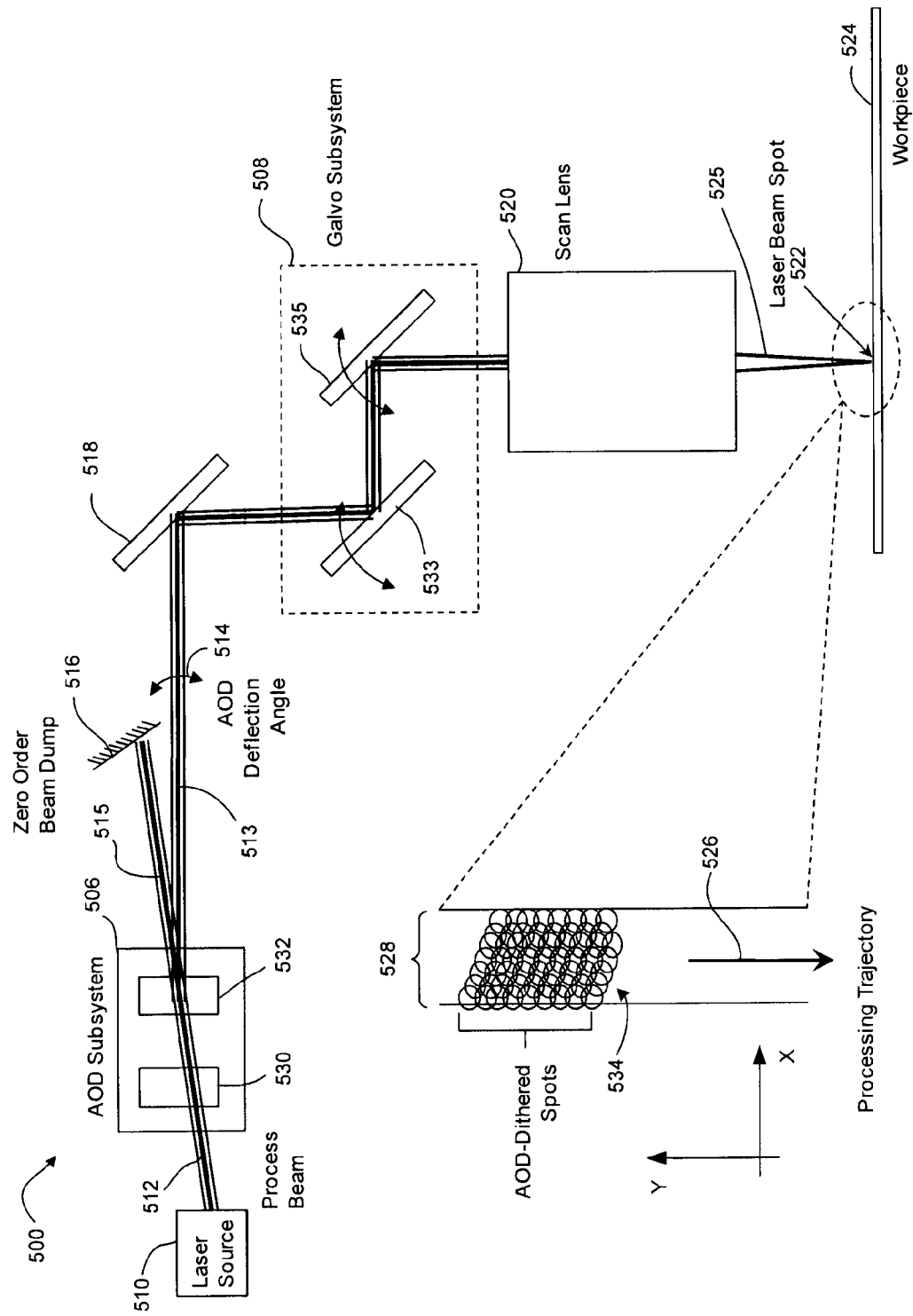
FIG. 5 is a block diagram of a system including an AOD subsystem and galvo subsystem for dithering a laser beam according to one embodiment.

FIG. 5 is a block diagram of a system 500 including an AOD subsystem 506 and galvo subsystem 508 for dithering a laser beam according to one embodiment. The system 500 includes a laser source 510 for providing a process beam 512 to the AOD subsystem 506. In one embodiment, the laser source 510 includes a pulsed laser source such that the process beam 512 comprises a series of laser pulses. In another embodiment, the laser source 510 includes continuous wave (CW) laser source such that the process beam 512 comprises a CW laser beam. In certain such embodiments, the AOD subsystem 506 generates laser pulses from the CW laser beam by deflecting the process beam 512 at discrete ("pulse") intervals.

As discussed above, the AOD subsystem 506 deflects a first order beam 513 of the process beam 512 at an AOD deflection angle 514 and a zero order beam 515 of the process beam 512 to a beam dump 516. The system 500 may further include a fixed mirror 518 to deflect the first order beam 513 to the galvo subsystem 508, and a scan lens 520 to focus a laser beam spot 522 on or within a workpiece 524. The output of the scan lens 520 may be referred to herein as a focused laser beam 525.

In one embodiment, the AOD subsystem 506 may include a single AOD used to provide deflection back and forth in a first direction (e.g., a dither direction) while the galvo subsystem 508 provides deflection in a second direction along a processing trajectory 526. For increased speed and versatility, however, the AOD subsystem 506 in the embodiment illustrated in FIG. 5 provides 2-D deflection along an X-axis and a Y-axis with respect to a surface of the workpiece 524. In this example, the Y-axis may be referred to as being parallel to the processing trajectory 526 and the X-axis may be referred to as being perpendicular to the processing trajectory 526. Thus, the X-axis may be referred to as the dithering direction. The processing trajectory 526 may correspond to a direction, for example, that the system 500 scribes or cuts a trench 528 (e.g., under control of the galvo subsystem 508) into a surface of the workpiece 524.

To provide the illustrated 2-D deflection, the AOD subsystem 506 includes a first AOD 530 to deflect the first order beam 513 in a first direction and a second AOD 532 to deflect the first order beam 513 in a second direction, as the galvo subsystem 508 moves the beam axis along a processing trajectory 526. In other words, the movement of beam spot positions provided by the AOD subsystem 506 is superimposed on the movement of the beam spot positions provided by the galvo subsystem 508. As shown in FIG. 5, the galvo subsystem 508 may also include a first galvo mirror 533 and a second galvo mirror 535 to deflect the first order beam 513 in both the X-axis and Y-axis directions with respect to the surface of the workpiece 524.

The orientation of the AOD deflections may not align to the deflection axes of the galvo subsystem 508. In general, a coordinate transformation may be applied to the AOD deflection commands to align the resulting AOD deflections to a desired coordinate frame. This coordinate transformation may also be a function of velocity, rotating the AOD deflection coordinate frame in order to keep the AOD beam deflection perpendicular to the processing trajectory defined by the galvo subsystem 508.

With the AOD subsystem 506 included in the system 500, several operational modes are enabled. In one embodiment, an operational mode includes an ability to dither the process beam 512 to effectively widen the laser beam spot 522 at the workpiece 524. In other words, dithering the process beam 512 includes spatially locating a series of focused laser beam spots 534 to create geometric features having dimensions greater than those of an individual laser beam spot 522 focused by the scan lens 520. For illustrative purposes, FIG. 5 shows the dithered laser beam spots 534 as viewed from above the surface of the workpiece 524 as the trench 528 is processed in the direction of the processing trajectory 526. Thus, for example, the series of dithered laser beam spots 534 at a given repetition rate has the effect of a series of larger diameter laser beam spots successively applied in the direction of the processing trajectory 526 at a lower pulse repetition rate.

In certain embodiments, the AODs 530, 532 can update their respective acoustic fields (filling the optical aperture with a new acoustic waveform) on the order of about 0.1 µs to about 10 µs. Assuming a nominal update rate of about 1 µs, the process beam's position can be rapidly updated such that several of the dithered laser beam spots 534 overlap during processing. The dithered laser beam spots 534 may overlap in the dimension (e.g., along the X-axis or dither direction) perpendicular to the processing trajectory 526 to widen the feature (e.g., the trench 528) being processed. As shown in FIG. 5, the dithered laser beam spots 534 may also overlap in the direction of the processing trajectory 526. To keep the dithered beam oriented normal to the processing trajectory 526, according to certain embodiments, a dither axis may be constantly adjusted as the angle of the processing trajectory 526 changes. In addition, the dither axis may be adjusted to compensate for the angle imparted on the line of dither points as a function of the process trajectory velocity. Given a trajectory velocity V, a dither update period Td, a number of dither points Npts, and a dither excursion Dd, this angle equals a tan [Td*(Npts-1)*V/Dd].

In addition to dithering the beam position with respect to the surface of the workpiece 524, or in other embodiments, the AOD subsystem 506 may be used to vary the intensity profile in the dither axis. The manipulation of the intensity profile of the process beam 512 along the dither axis enables shaping of the cross-section of the processed trench 528. For example, the trench 528 may be processed with rectangular, U, or V shaped cross sections. Shaping features such as sidewall slope may be useful in situations such as intersection formation. The shaping resolution may be based on the fundamental spot size, and the shaped intensity profile may be a convolution of the dither pattern (location and intensity) and the spot intensity profile (e.g., Gaussian or another profile shape). A feature may be shaped, for example, by overlapping pulses at certain locations (e.g., two or more pulses may be applied at the same location) along the dither axis to remove selected amounts of target material, and/or by modulating the power amplitudes of laser pulses as a function of deflection position along the dither axis.

In addition to the shaping of the feature along the dither axis, or in other embodiments, the AOD subsystem 506 may be used to control the power as a function of the position along the processing trajectory 526 to allow similar shaping of the "endpoint" of a processed linear feature. Controlling the power as a function of the position along the processing trajectory 526 may also be useful in applications such as intersection formation. The use of the AOD subsystem 506 enables power modulation to occur at very high speeds (e.g., on the order of microseconds) such that fine control of intensity profiles (e.g., with feature dimensions in a range between about 5 µm and about 50 µm) may be possible at high processing velocities (e.g., in a range between about 1 m/s and about 5 m/s).

Figure 5A:
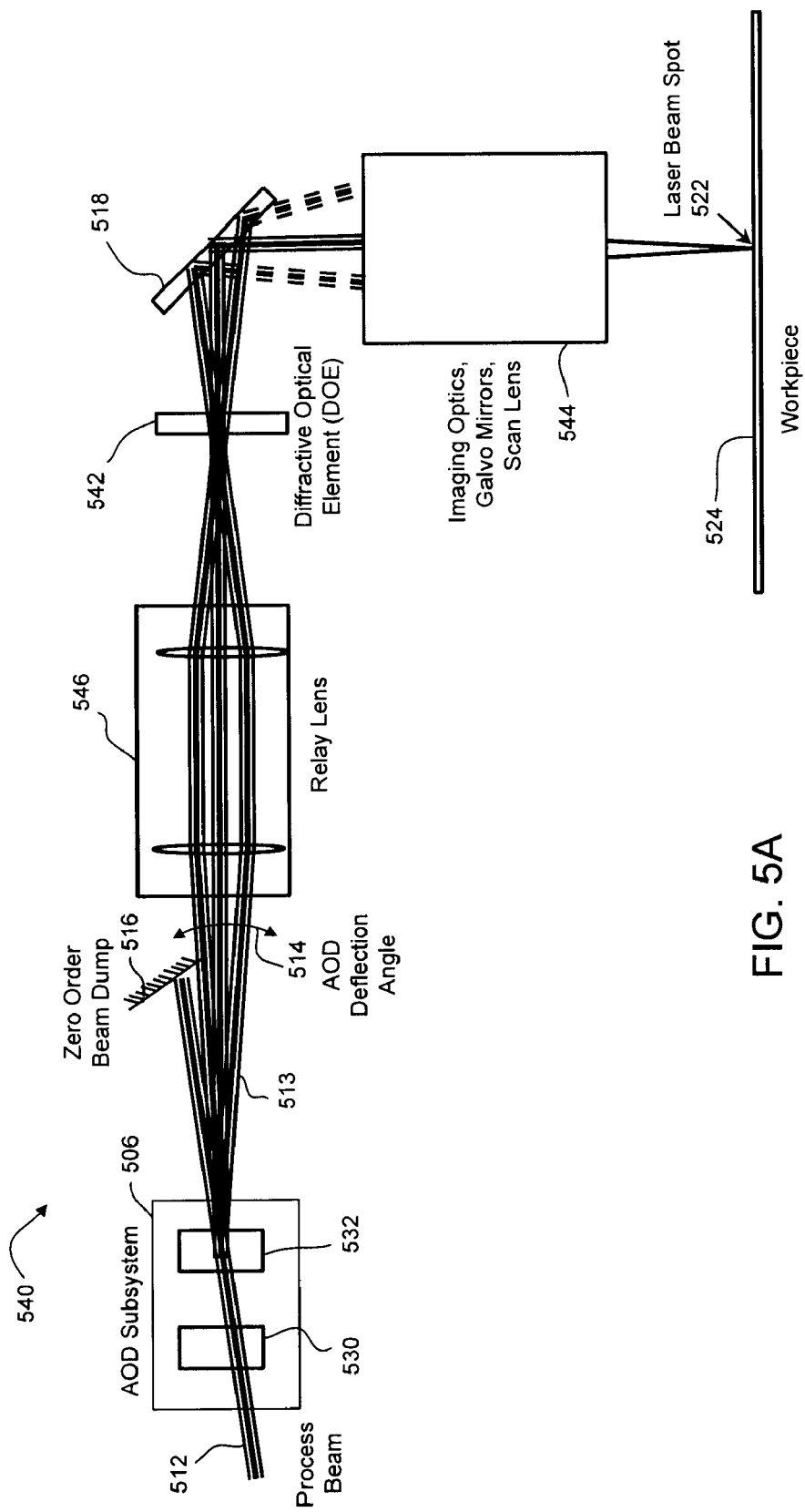
FIG. 5A is a block diagram of a system for beam shaping according to one embodiment.

In addition to deflection of Gaussian beams, certain embodiments may also deflect beams shaped by traditional beam shaping technologies including, for example, diffractive optical elements (DOEs). For example, FIG. 5A is a block diagram of a system 540 for beam shaping according to one embodiment. The system 540 includes the AOD subsystem 506 (with the first AOD 530 and the second AOD 532), the zero order beam dump 516, and mirror 518 shown in FIG. 5. The system 540 further includes a diffractive optical element (DOE) 542 for beam shaping and optical elements 544

(e.g., imaging optics, galvo mirrors, and scan lens). For illustrative purposes, the first order beam 513 in FIG. 5A is shown over a range of AOD deflection angles 514. In embodiment illustrated in FIG. 5A, the first order beam 513 deflected by the AOD subsystem 506 is relayed to the DOE 542 through a relay lens 546 (imaging the beam's pivot point on the DOE 542) to keep the first order beam 513 centered on the DOE's aperture regardless of the AOD deflection angle 514 imparted by the AOD subsystem 506. The DOE 542 may then shape the beam intensity by imparting additional wavefront phase distortion (as is typical for such beam shaping DOEs). This approach may be beneficial in situations where larger, shaped beams may be deflected and abutted to form a more uniform dithered fluence profile with, for example, square intensity profiles. This approach may also be beneficial in situations where a small number of laser pulses is adequate to form a desired feature (for example, a microvia drilled in a dielectric material). In this case, a rastered application of Gaussian pulses may be less efficient relative to applying a shaped intensity profile, yet high-speed AOD deflection may be desirable for high-speed control of the shaped intensity process spot position.

In other embodiments, a similar relay lens configuration may be used to tailor the deflection of the AOD-deflected beam at the scan lens. This may be desirable for at least two reasons. First, it may be desirable to relay the pivot point of the beam to the galvo scan mirrors (eliminating beam lateral deflection) to (a) keep the beam centered in the clear aperture of the galvo mirrors and scan lens to avoid beam clipping, and (b) avoid displacing the beam from the center of the scan lens entrance pupil, since such displacement may produce a sloped beam at the worksurface. Second, it may be desirable to impart a lateral beam deflection at the scan lens in order to intentionally produce a beam slope at the work surface. A sloped beam may be advantageous in certain Gaussian laser drilling applications to create a steeper sidewall in processed features (for example, microvia drilling).

Figure 5B:
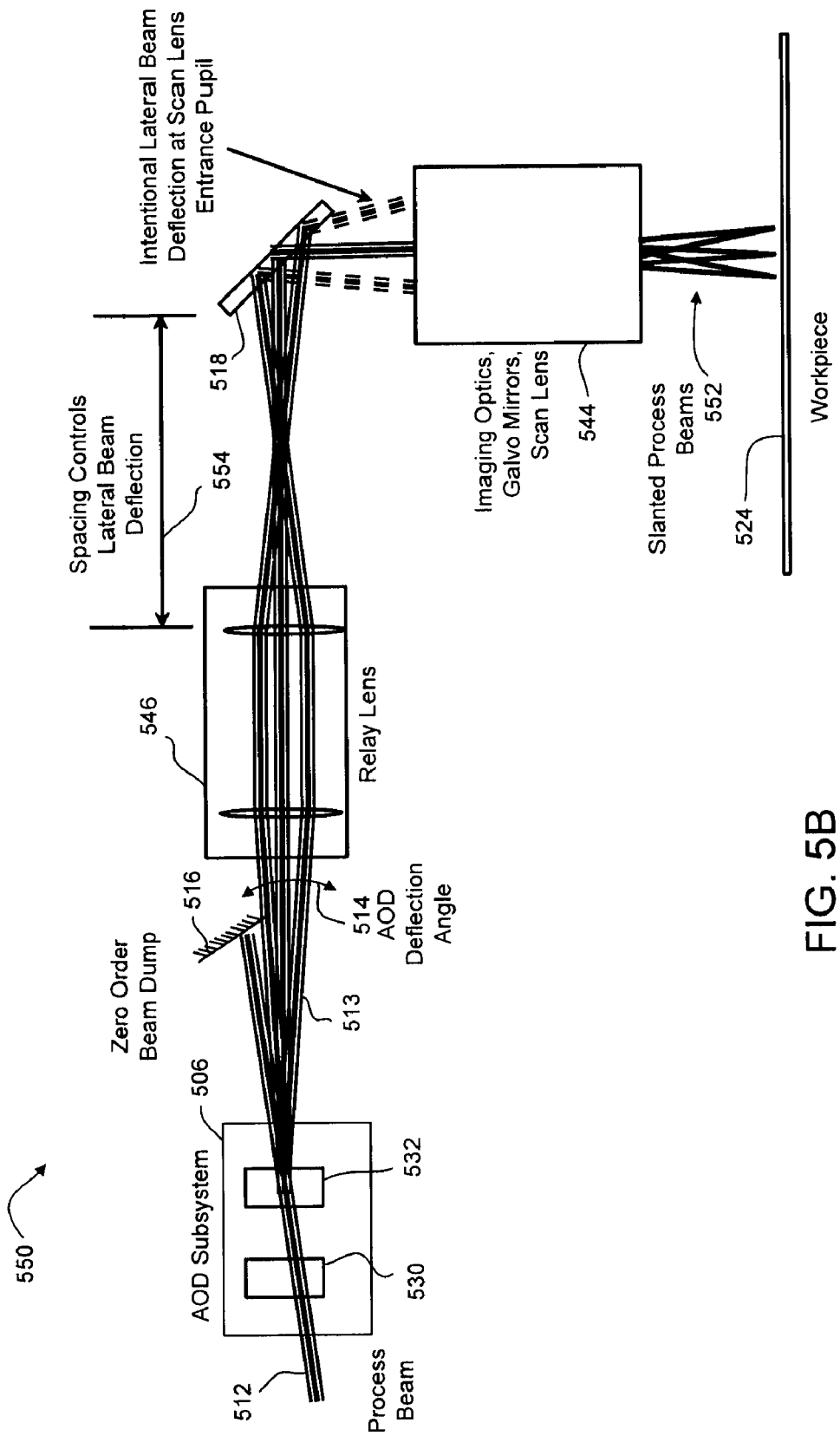
FIG. 5B is a block diagram of a system providing slanted process beams according to one embodiment.

FIG. 5B is a block diagram of a system 550 providing slanted process beams 552 according to one embodiment. The system 550 includes the AOD subsystem 506 (with the first AOD 530 and the second AOD 532), the zero order beam dump 516, and mirror 518 shown in FIG. 5. The system 550 further includes a relay lens 546 and optical elements 544 (e.g., imaging optics, galvo mirrors, and scan lens). For illustrative purposes, the first order beam 513 in FIG. 5B is shown over a range of AOD deflection angles 514. As shown in FIG. 5B, by properly designing and spacing 554 the relay lens 546 from the scan lens (e.g., from the scan lens 520 shown in FIG. 5), the first order beam 513 deflected by the AOD subsystem 506 can also be laterally deflected to create the sloped beam 552 at the surface of the workpiece 524. The amount of beam slope for a given deflection of the process spot at the workpiece 524 may be controlled by either (a) using the AODs 530, 532 to substantially create the lateral spot deflection at the workpiece 524, and varying the relay lens 546 optics and spacing 554 to the scan lens (e.g., scan lens 520), or (b) coordinate the galvos (e.g., the galvos 533, 535 shown in FIG. 5) and AODs 530, 532 such that a arbitrary lateral beam deflection at the scan lens (and thus an arbitrary beam slope at the workpiece 524) may be imparted independently from the desired lateral spot deflection at the workpiece 524.

Further details of shaping techniques are disclosed below in the section labeled "Example AOD Control Embodiments."

While beam dithering may be very effective and flexible for producing a desired fluence profile, an alternative (but sometimes more restrictive) approach to dithering includes varying the focus of the laser beam spot 522 by applying a chirp waveform to at least one of the AODs 530, 532. With a chirp waveform, the instantaneous frequency of the acoustic wave varies linearly within the optical process beam 512 passing through the AOD's crystal. The linear variation of the instantaneous frequency of the acoustic wave has the effect of applying a single-axis (astigmatic) focusing term to the process beam 512, rather than displacing the laser beam spot 522 in discrete steps. By applying chirp waveforms to both AODs 530, 532, according to certain embodiments, the laser beam spot 522 can be symmetrically defocused, thus increasing the spot size at the workpiece 524. This approach may be useful, for example, in the case of lower repetition rate lasers where the pulse repetition frequency may not be high enough to provide good overlap of pulses at the workpiece 524 to avoid intensity variation when widening the trench 528.

IV. Rastering

Another operational mode that may be used with the AOD subsystem 506 includes rastering a two-dimensional pattern very rapidly with the AODs 530, 532. One use of rastering includes spatially shaping the intensity profile of the process beam 512 to create desired features at the workpiece 524, such as microvias. The AODs 530, 532 control both spot position and intensity weighting, which enables the creation of any desired intensity profile. In addition, it may be beneficial to vary the dwell time of the laser beam spot 522 at each location for process operations using high intensity, such as copper drilling.

Using rastering provides several benefits over the traditional "shaped optics" approach. Some benefits include, but are not limited to: arbitrary selection of process spot diameter (within the AOD range) or shape (e.g., round, square, rectangular, oval, or other shape); cost reduction due to elimination of shaping optics, and/or Gaussian or shaped mode change optics; ability to process features with the high-intensity Gaussian beam (e.g., using spiral, trepan, or other patterns), at very high speed, without dynamic constraints due to galvo beam positioning; compensation for beam distortion (e.g., elliptical spots) by modifying the raster pattern appropriately; and/or tailoring of the spatial intensity distribution on-the-fly to optimize or improve characteristics such as taper and/or bottom quality.

Several options are available to design the raster pattern (spot position and amplitude). One embodiment includes filling in an area with an array of spot positions. This embodiment, however, may provide little control over the final cumulative fluence profile over the area. For example, the definition of the fluence profile at the edges of the rastered area may not have the desired "slope" (e.g., change in fluence vs. position) for via formation or intersection processing.

In another embodiment, the fluence profile is explicitly defined and the raster pattern is selected to best fit the defined profile. This has an advantage of creating customized fluence distributions, for example, with variable fluence levels throughout the raster area to vary depth, or with specifically shaped sidewalls at the edges of the raster area. This embodiment may be useful, for example, when combining fluences of intersecting traces and/or when drilling vias with customized sidewall taper.

Figure 6:
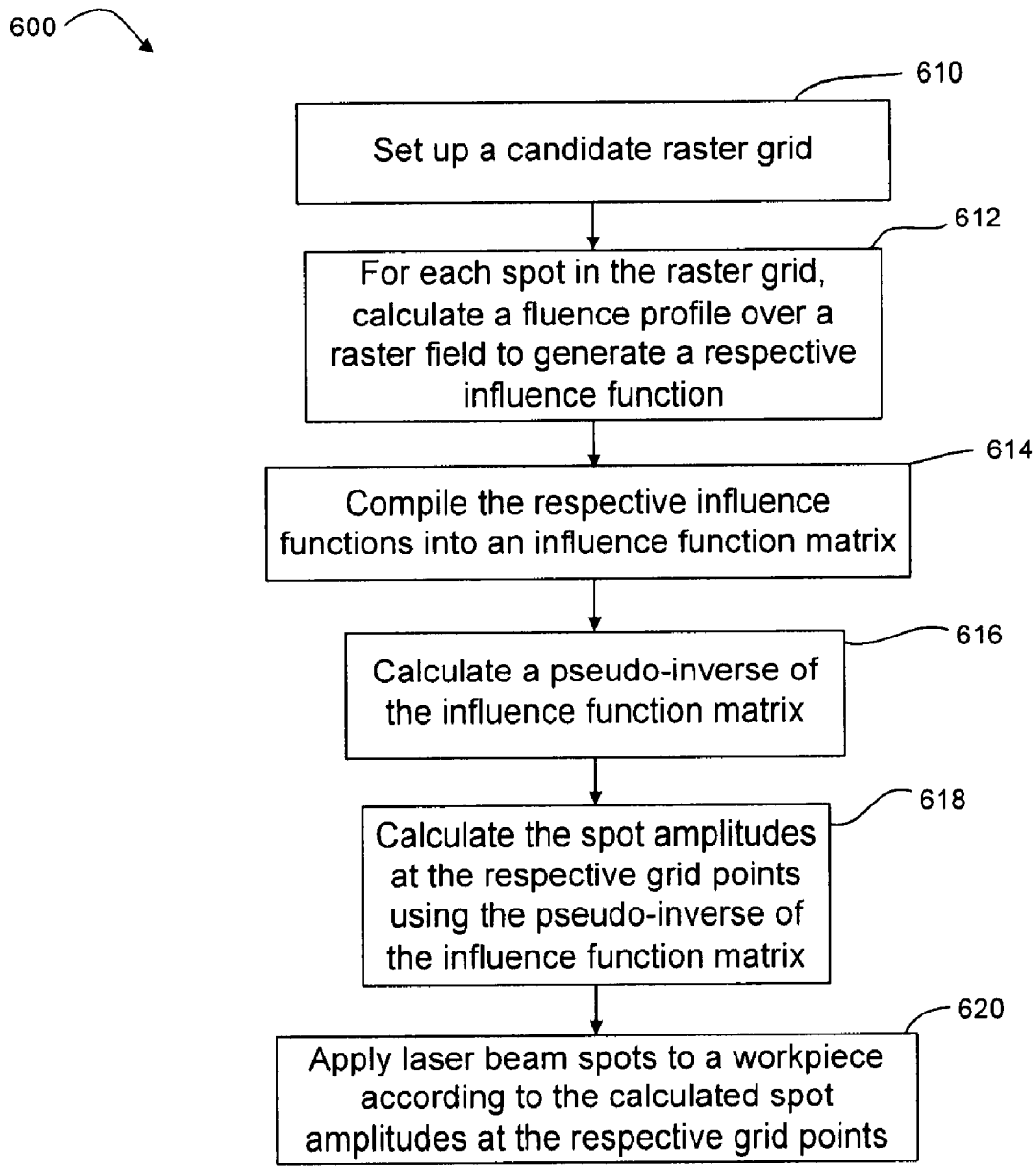
FIG. 6 is a flowchart of a method using a least-squares optimization routine to determine a set of spot amplitudes over a grid of raster points according to one embodiment.

FIG. 6 is a flowchart of a method 600 using a least-squares optimization routine to determine a set of spot amplitudes over a grid of raster points according to one embodiment. As shown in FIG. 6, the method 600 includes setting up 610 a candidate raster grid. For each spot in the raster grid, the method 600 includes calculating 612 a fluence profile over a raster field to generate a respective "influence function." The method 600 further includes compiling 614 the influence functions into an influence function matrix, calculating 616 the pseudo-inverse of the influence function matrix (e.g., using a singular value decomposition (SVD) algorithm), and calculating 618 the spot amplitudes at the respective grid points using the pseudo-inverse of the influence function matrix. The method 600 may further include applying 620 laser beam spots to a workpiece according to the calculated spot amplitudes at the respective raster points.

Example equations describing the method shown in FIG. 6 are outlined below. The example equations assume a raster pattern, defined in XY coordinates [xr, yr], containing Nr points. Applying a set of raster amplitudes (Zr) produces a desired fluence surface (Zs), which may be evaluated at a set of XY coordinates [xe, ye] containing Ne points. The influence matrix H is defined by:

$$Ze = H*Zr, \text{ is } (Ne \times Nr).$$

An operation to create the influence matrix H includes calculating the fluence of a single process spot located at one [xr, yr] point, evaluated over each [xe, ye] point. If the Zr and Ze matrices are "vectorized" for each evaluation, then Zr is (Nr×1) and Ze is (Ne×1). The procedure may be repeated for each [xr, yr] raster point, for a total of Nr evaluations. Appending all results (Zr and Ze) into matrices creates a Zr diagonal matrix of size (Nr×Nr), and a Ze matrix of size (Ne x Nr). Normalizing the results by the applied amplitude of each spot results in an identity matrix for Zr. The influence matrix H is then the (normalized) Ze matrix.

Given the influence matrix H, the desired actuator command vector Zr used to produce the desired surface fluence zDes may be given by:

$$Zs = Hinv*Zr.$$

Hinv can be calculated through an SVD decomposition, with the number of modes in Hinv limited to avoid excessive noise effects. Because the identification of H (and Hinv) may be approximate, the calculation of Zr can be performed in a closed loop mode, with a tuning gain applied:

$$Zr(k+1) = Zr(k) - k\text{Alpha}*Hinv*(z\text{Des} - Zs),$$

with Zs calculated in each iteration from a model or measured system data.

Figure 7A:
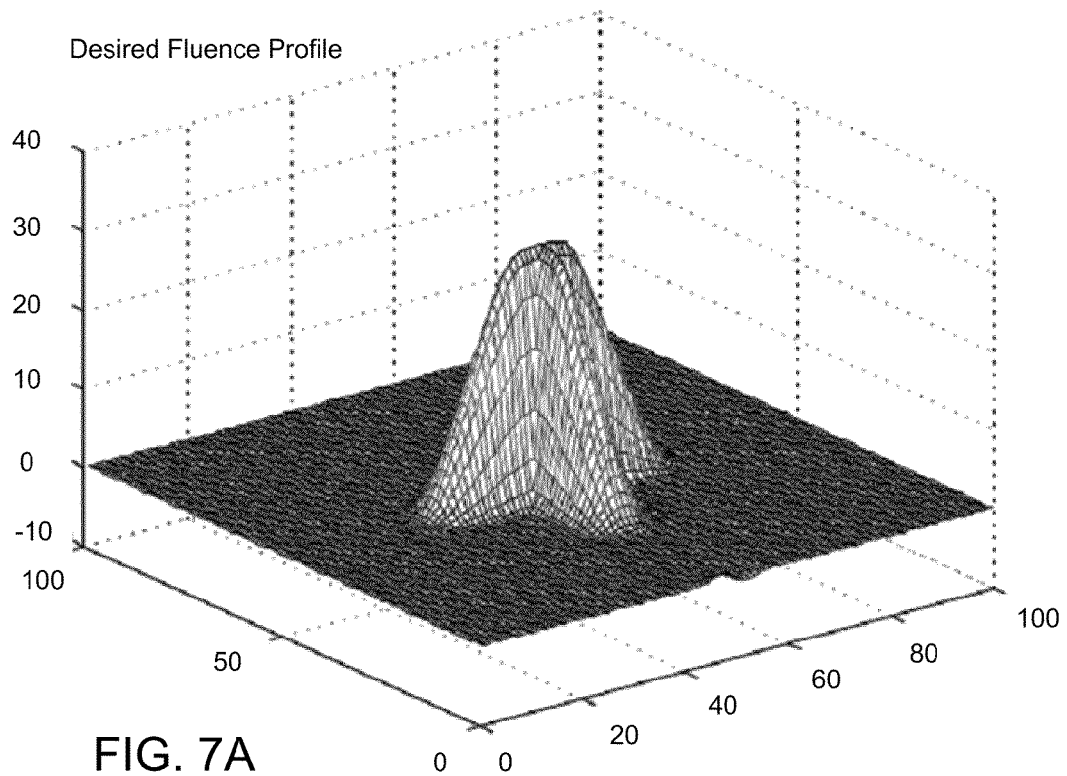
FIG. 7A graphically represents a desired fluence profile according to one embodiment.
Figure 7B:
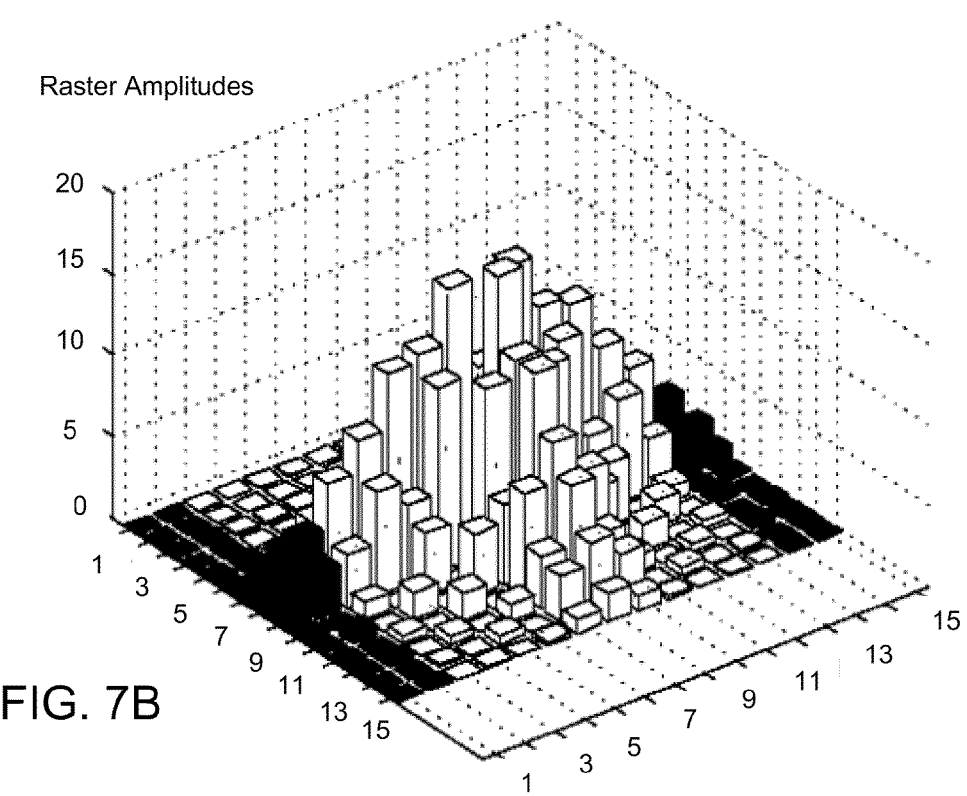
FIG. 7B graphically represents optimized raster amplitudes corresponding to the desired fluence profile of FIG. 7A according to one embodiment.

While the method 600 of FIG. 6 and the example equations described above may be fairly straightforward, the method 600 can be sensitive to the selection of the raster grid and the method of calculating the pseudo-inverse. However, the method 600 can provide an acceptable approximation to the desired fluence profile within the limitations of the spatial characteristics of the fundamental laser beam process spot, which may impose a fundamental limit on the resolution at any edge of the raster pattern. FIG. 7A graphically represents a desired fluence profile and FIG. 7B graphically represents corresponding optimized raster amplitudes determined according to the method 600 of FIG. 6 and the example equations described above.

A related approach, according to another embodiment, involves optimizing the raster pattern using a gradient descent method. In this embodiment, an objective function (e.g., the fit to a desired fluence profile) is defined. The optimization process determines the local objective function gradient (the incremental change in the function given incremental changes in the fluence applied to each raster grid location), and uses the gradient in an algorithm to search for the optimal vector of raster spot amplitudes.

Both approaches (SVD and gradient descent) can be performed either in simulation, or in a system. In the system, the actual fluence distribution resulting from a given raster pattern (as measured by a metrology camera), can be used to quantify performance. Either optimization method can then be applied to optimize the fluence distribution, a process that avoids or reduces modeling errors and accounts for tolerances in the system such as spot size and distortion, AOD linearization error, and/or optical alignment.

Of course, other optimization methods may be substituted for the algorithms mentioned above.

V. Intersection Formation

Certain embodiments include the formation of intersecting processed features (e.g., trenches, pads, vias, and other features), with controlled variation in the depth of the features at the intersection. For example, it may be desired to control electrical characteristics such as impedance (to maintain high-speed signal integrity), or dielectric breakdown (which may be sensitive to the gap between the plated trench and an underlying conductive layer), or to control plating quality.

Intersection processing can become quite difficult because the ablation of the workpiece dielectric may be proportional to the cumulative applied fluence when, for example, the process beam fluence is well above the ablation threshold of the material. In this situation, processing two intersecting features by simply crossing the features results in "double exposure," with close to 100% depth variation at the point of double exposure.

To avoid or reduce this problem, the system 500 discussed above with respect to FIG. 5 may be used to "blend" the fluences of the two features in the intersection region to reduce or avoid double exposure. For example, if the AOD subsystem 506 is used to process one trench feature with a wide "slope" of fluence at its sidewall, and to process the intersecting trench feature with a matching fluence "slope" at its endpoint, the two fluence distributions combine to produce a nominally flat fluence field at the intersection. Thus, the AOD subsystem 506 may be used to create a depth-controlled intersection.

The creation of a fluence slope provides other benefits, such as a minimization of depth variation due to beam positioning tolerances. With a steep fluence slope in the intersection region, small variations in beam position (e.g., on the order of about 1 μm to about 5 μm) during the ablation of the intersecting features can cause significant depth variation. By creating a gradual slope in fluence, the beam positioning errors produce acceptable depth variation (e.g., less than about 10% to about 15% of the nominal depth).

The creation of a fluence slope may be implemented as the intersecting features are processed by changing the fluence slopes and/or widths on-the-fly. In another embodiment, the trench features are terminated outside of the intersection (with appropriate fluence slopes), followed by a rastering of the remainder of the intersection volume. This embodiment has several advantages including, for example: less sensitivity to the type of intersection (e.g., angles of the intersecting trenches, multiple trenches intersecting at a single point, intersections of curved trenches); minimized extra line width used to create side fluence slopes, which can force undesirable variations in the spacing between adjacent trenches; and/or the ability to customize the raster pattern to optimize characteristics of the intersection. Customizing the raster pattern may be useful when processing arbitrary shapes at the intersection, such as circular pads with multiple intersecting traces.

Additional details of intersection processing are disclosed herein in the section labeled "Example Intersection Processing Embodiments."

VI. Galvo Error Correction

One source of repeatability error (which may limit the ability to machine intersections with good depth control, as described above) may be the positioning error of the galvo subsystem 508 shown in FIG. 5. These errors may be due to sensor noise and tracking error. Each galvo mirror 533, 535 in the galvo subsystem 508 may be associated with a feedback sensor (not shown) to control mirror movements using respective galvo servos (not shown). Sensor noise effects can occur when the galvo servo tracks the feedback sensor noise within the servo's bandwidth, resulting in physical beam motion. This error excitation may also be amplified by the closed-loop response of the galvo, which amplifies some portion of the frequency spectrum. Sensor noise effects may produce beam errors, for example, from about 0.1 µm root-mean-squared (RMS) to about 5 µm RMS, depending on the particular optical and servo design.

The sensor noise effects may occur at all times, regardless of the commanded beam trajectory. Tracking error, however, occurs when the galvos are commanded to follow a dynamically aggressive beam trajectory (containing large acceleration or high-frequency commands). The inability of the galvo servo to track the commands leads to a tracking error and a resulting loss of repeatability. Tracking errors may be the result of, for example, linear servo response performance and/or non-linear galvo behavior (such as bearing friction or magnetic hysteresis).

Figure 8:
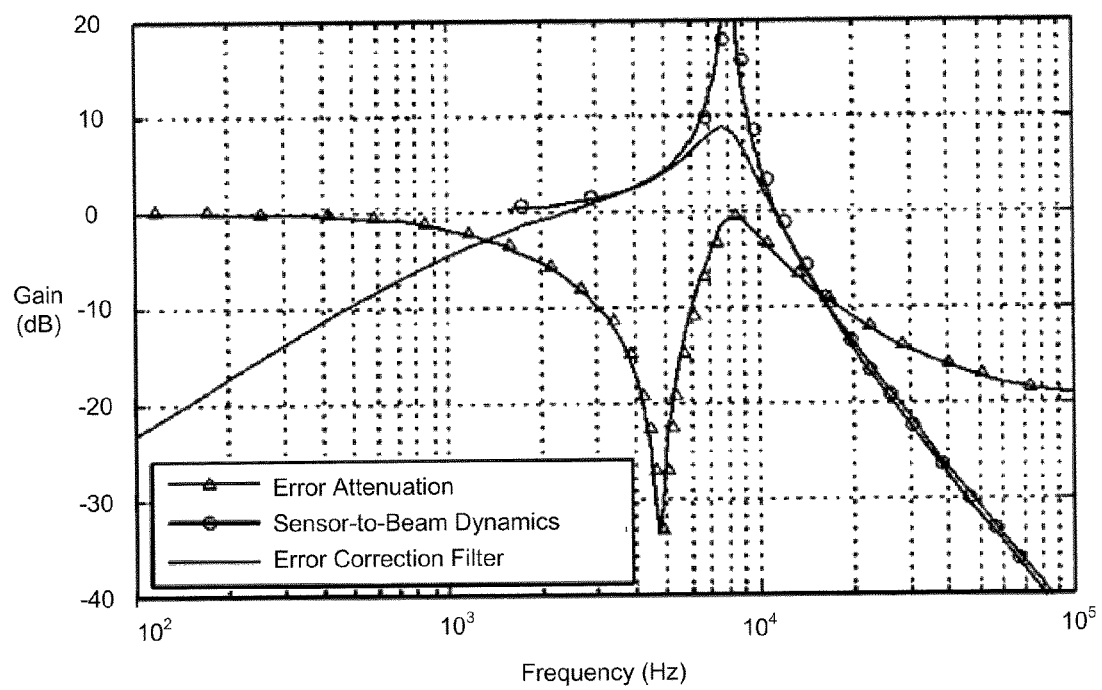
FIG. 8 graphically represents curves associated with an example AOD galvo error correction filter according to one embodiment.

To reduce both the sensor noise error and tracking error sources, according to one embodiment, the deflection capabilities of the AOD subsystem 506 are used to correct for galvo errors, as indicated by the position sensor feedback. The sensor reading includes sensor noise, which may be filtered out above a reasonable bandwidth in order to reduce or avoid adding undesirable beam motion in response to this noise. In one embodiment, filtering substantially matches both phase and gain of the transfer function between galvo position sensor and beam displacement (the "beam transfer function", or BTF) within a bandwidth of interest, while filtering higher frequencies. In certain embodiments, the BTF is strongly influenced by dynamics between the position sensor and the galvo mirror, often well modeled by a lightly damped second order pole. Other factors that affect phase matching, such as the time delays due to signal filtering and data communication, may be included in the design of the error correction filter. FIG. 8 graphically illustrates one example embodiment of an AOD error correction filter that provides a compromise between the conflicting requirements of phase and gain matching below about 10 kHz, and sensor noise filtering above about 10 kHz.

Sensor noise rejection may also be accomplished through alternatives such as estimation (e.g., Kalman filtering), at the risk of reduced performance in some embodiments due to unmodeled dynamics or non-linear behavior.

VII. PSD Mirror Sensing for Beam Positioning Accuracy Improvement

In certain embodiments, AOD error correction is enhanced using external sensors that detect the actual galvo mirror position. In certain galvo-based beam positioning systems, an angular position sensor is built into the galvo to sense mirror angle. Sensors can be located at the far end of the galvo shaft (away from the mirror), while others are located at the shaft end near the mirror.

When the angular position sensor is located at the far end of the galvo shaft away from the mirror, the sensor detects shaft rotation. However, shaft angular deflection can cause the mirror to have a different deflection angle. This sensor placement has some advantages in providing the ability to increase servo loop bandwidth because it does not respond to the mirror resonance.

When the angular position sensor is located at the shaft end near the mirror, the sensor detects angular deflection of the shaft nearer to the mirror. This sensor placement more accurately measures the true mirror angle. However, the sensor may still be subject to error when the mirror itself flexes relative to the shaft at the sensor. In addition, with this sensor placement the resonance of the shaft and mirror appear in the galvo frequency response (from motor drive to sensor output), complicating the galvo servo design and limiting its performance.

In addition, neither sensor placement can measure mirror modes not related to shaft angle. One mode includes that of a "flapping" mirror, in which the mirror plane rotates about an axis perpendicular to the rotating shaft. This mode may be a limitation on the performance of high-speed galvo deflection systems.

A further issue with galvo rotational sensors includes their noise performance. Due to the small package size of the galvos, and a desire to minimize the size (and rotational inertia) of the position sensors, the electrical noise present in the sensor circuitry translates to a significant effective angular noise, which may degrade galvo servo positioning performance. For example, this noise may equate to about 0.1 microradian (µRad) RMS to about 5 µRad RMS within a 10 kHz bandwidth.

In one embodiment, a different sensor may be selected that: detects the true angular position of the mirrors, without shaft deflection effects; detects all modes of mirror motion that affect beam position accuracy; and produces an angular measurement with low noise levels, such that the measurement can be used by the galvo servo loop, or other devices, to correct for the sensed error.

Figure 9:
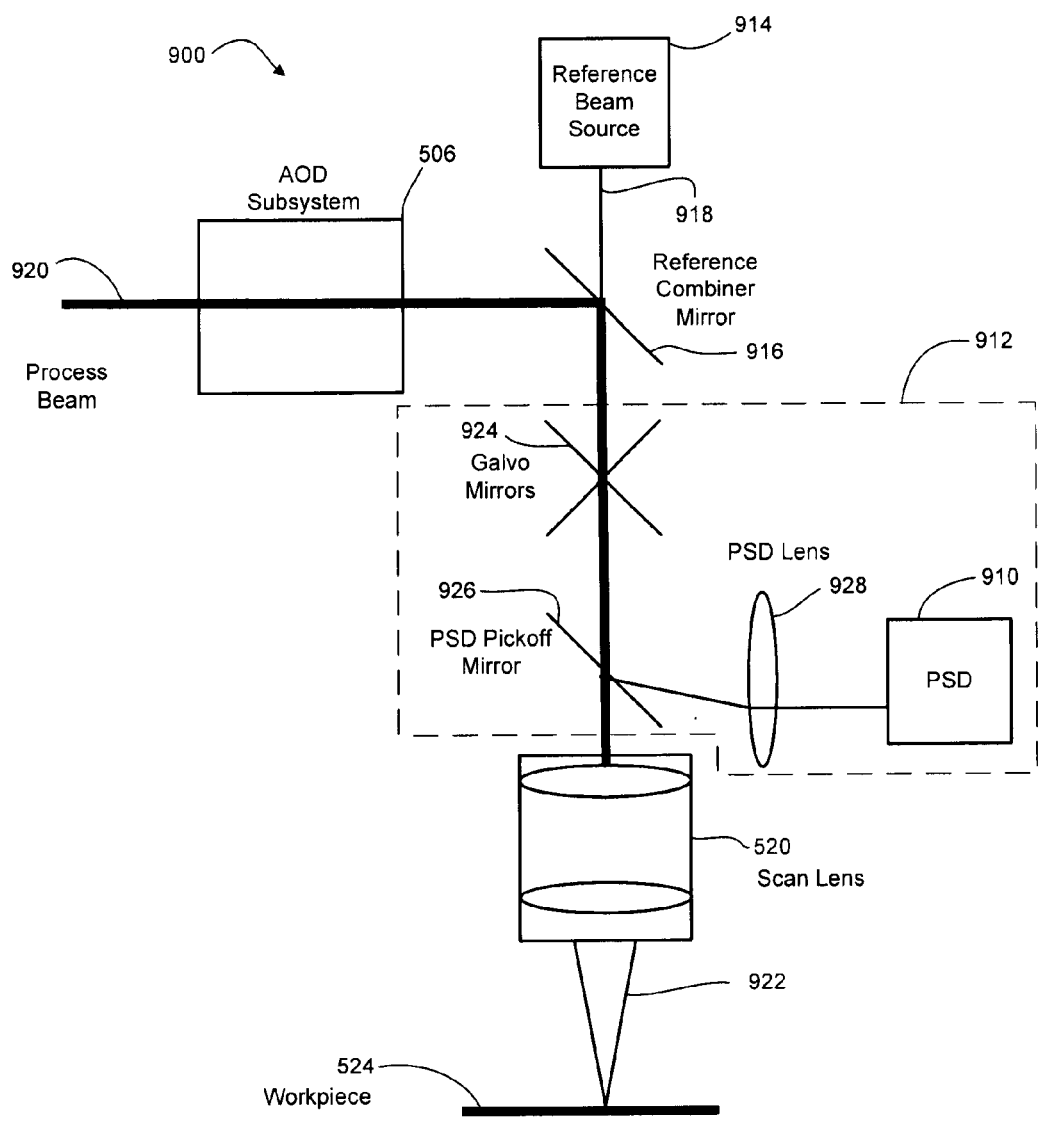
FIG. 9 is a block diagram of a laser processing system including an auxiliary sensor in a galvo subsystem according to one embodiment.

To correct for errors in the actual galvo mirror position, according to certain embodiments, the galvo subsystem 508 shown in FIG. 5 includes an auxiliary sensor (not shown in FIG. 5) that provides feedback to hold the galvo mirrors in relation to the scan lens 520. For example, FIG. 9 is a block diagram of a laser processing system 900 including an auxiliary sensor 910 in a galvo subsystem 912 according to one embodiment. The auxiliary sensor 910 in this example includes a position sensing diode (PSD) and is referred to herein as the PSD 910. The laser processing system 900 also includes an AOD subsystem 506, a scan lens 520, a reference beam source 914, and a reference combiner mirror 916. The AOD subsystem 506 and scan lens 520 are described above with reference to FIG. 5 for providing a focused process beam 922 to a surface of a workpiece 524.

The reference combiner mirror 916 combines a reference beam 918 from the reference beam source 914 and a process beam 920 from the AOD subsystem 506 for input to the galvo subsystem 912. The reference beam combiner 916 may comprise, for example, a dichroic mirror, a polarizing beam-splitting mirror, or other similar device for combining laser beams to provide a reference beam with stable power and pointing angle. The use of the processing beam 920 from the AOD subsystem 506 may be possible during PSD sensing operation (but not required), if the processing beam's position and power are sufficiently stable for the particular application.

In addition to the PSD 910, the galvo subsystem 912 includes galvo mirrors 924, a PSD pickoff mirror 926, and a PSD lens 928. The reference beam 918 reflects off the galvo mirrors 924 (along with the main processing beam 920). The PSD pickoff mirror (e.g., a splitting mirror) picks off a deflected reference beam (e.g., deflected by the galvo mirrors 924), and directs the deflected reference beam to the PSD for detection.

The PSD lens 928 (e.g., a focusing lens) may optionally be inserted in the measurement path such that only angular motion of the deflected reference beam is translated to XY spot deflection on the PSD 910, with lateral beam motion converted to a beam angle at the PSD 910, and thus not measured in the PSD XY plane. In certain embodiments, the PSD lens 928 includes a compact telephoto lens with a long effective focal length, to amplify the spot motion at the PSD plane. In certain such embodiments, the PSD lens 928 is located such that the front focal point is located at the scan lens entrance pupil. It may be possible to omit the PSD lens 928, in certain embodiments, if lateral beam motion is not a concern, and the scaling of the beam motion on the PSD 910 is adequate for the particular application.

The independent reference beam 918 and the PSD 910 can be selected such that the beam power, in combination with the PSD optical sensitivity, provide adequately low noise. A dominant noise source in PSD measurements may be "shot noise," or the noise produced by quantization of charge carriers (individual electrons) in the output current. The signal-to-noise ratio (SNR) may be proportional to the square root of current. By raising the output current to a high level, the SNR may be improved, and low-noise angle measurement may be possible.

Once the PSD sensing is in place, the output of the PSD 910 vs. the position of the focused process beam 922 at the workpiece can be easily calibrated. Given a calibrated PSD 910, beam positioning can be improved in several ways. For example, the PSD 910 can be used as the position feedback sensor for the galvo servos. This may be complicated by the fact that it creates a cross-coupled system, complicating the dynamics of the feedback system. In addition, the non-rotational mirror modes ("flapping" and other modes) may be difficult to accommodate in the servo loop. Dynamic estimators (e.g., Kalman filters, Luenberger observers, or other estimators) can be used to separate dynamic modes and improve the servo loop design.

In addition, or in other embodiments, the PSD 910 can be used for limited error correction by the galvo subsystem 912 itself. For example, mirror cross-axis modes can be corrected by the galvos, if their frequency content is within the galvo servo bandwidth. In addition, low-frequency noise error in the built-in galvo sensors (not shown) can be rejected by blending feedback from the PSD 910 (at low frequency) and the built-in sensor (at higher frequencies).

In addition, or in other embodiments, the PSD position reading can be used for open-loop error correction by a separate device, such as an AOD included in the beam path. This may be a useful operational mode because it separates the galvo dynamics from the error correction system. Using a reference beam separate from the main process beam (which is deflected by the AOD subsystem 506, and thus sensed by the PSD 910) allows the AOD error correction to operate in an "open loop" mode, in which the AOD error correction does not affect the PSD beam position output. This can simplify the error correction algorithm significantly. Both noise and mirror deflection modes are easily corrected in such an embodiment.

If the process beam 920 is also used as the PSD reference beam 918, similar AOD error correction may still be possible, with the AOD subsystem 506 forming a closed error correction loop. In this case, the PSD reading is analyzed to remove any intentional AOD deflection commands (such as dithering, rastering, and/or high-dynamic beam positioning) because intentional commands are sensed by the PSD 910.

In certain embodiments, it may be useful to include a first PSD sensor that senses a separate reference beam angle, and a second PSD (not shown) that senses the process beam angle, to combine the benefits of the above embodiments. For example, a second PSD may be used for diagnostic measurement and process quality monitoring.

VIII. Throughput Improvements: AOD/Galvo Coordination and Tertiary Profiling

Figure 10:
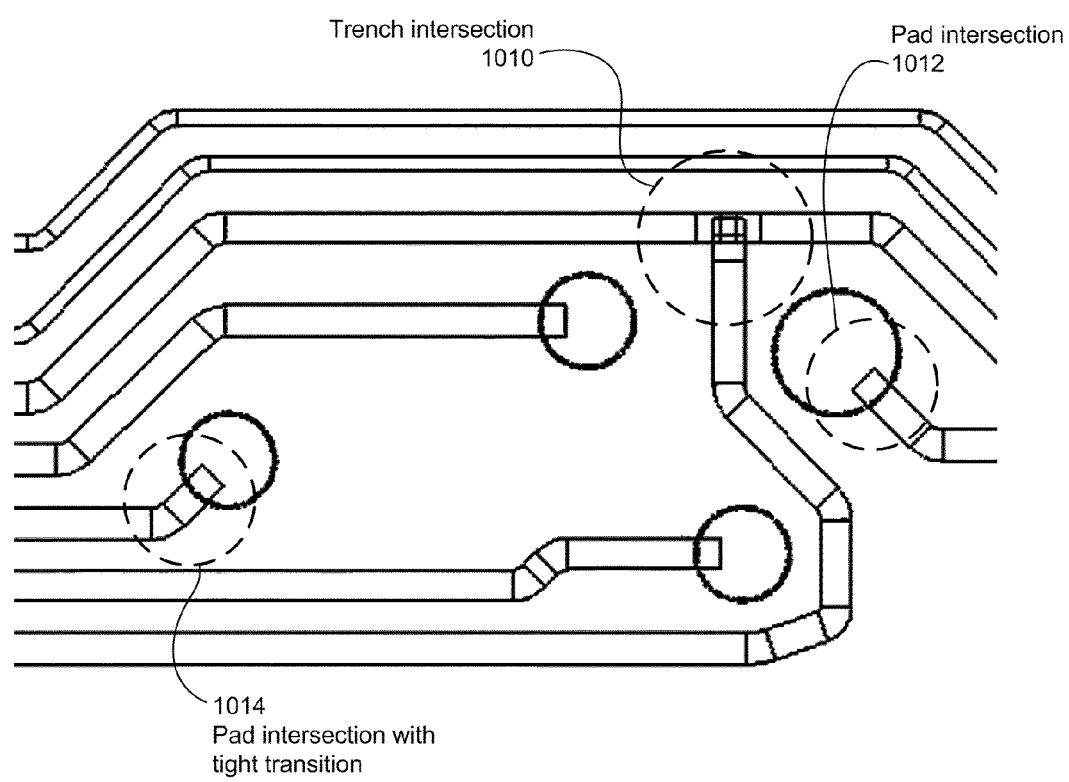
FIG. 10 is a schematic illustrating example trench patterns processed for laser direct ablation according to certain embodiments.

Certain laser processing applications, such as laser direct ablation (LDA), ablate features at high process beam velocities (e.g., velocities in a range between about 0.2 m/s and about 5 m/s) to achieve high throughput. One challenge of implementing high-velocity processing may be the dynamic limitations of the galvo beam positioning systems used to control the process beam position. During processing of some features, such as short arc segments, the beam positioner accelerates to change the beam velocity trajectory. LDA applications, for example, may require processing of a feature with a tight turn radius on the order of tens of microns or less with a desired repeatability (within the galvo field) of about 1 µm. FIG. 10 is a schematic illustrating example trench patterns processed for an LDA application according to certain embodiments. The embodiments disclosed herein provide for high speed processing of trench intersections 1010, pad intersections 1012, pad intersections with tight transitions 1014, and other features associated with LDA processing.

As process beam velocity increases or arc segments become shorter, the acceleration occurs over shorter time periods during which the beam positioner uses higher bandwidth control. This may eventually become a limitation in the ability to reach high velocities.

Figure 11:
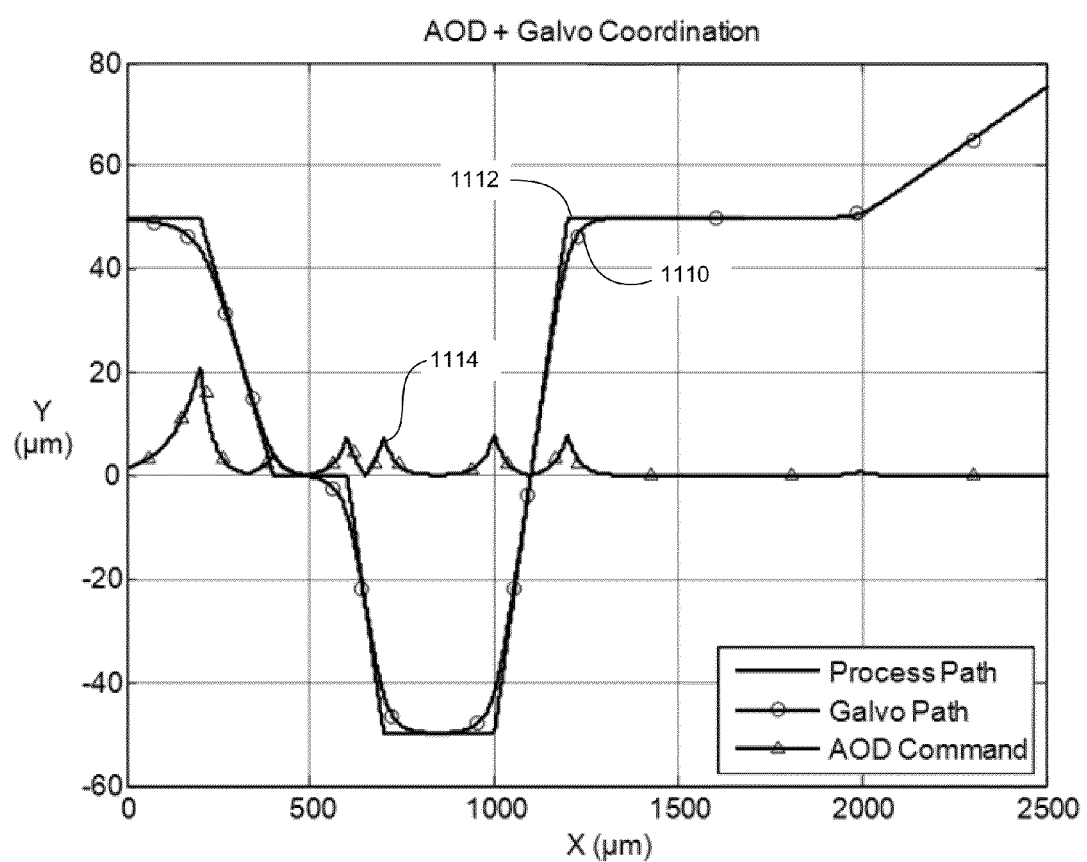
FIG. 11 graphically represents curves associated with AOD and galvo coordination according to one embodiment.

Referring again to FIG. 5, this limitation can be avoided by performing the high-bandwidth portion of beam trajectory control using a high speed deflector such as the AOD subsystem 506. In this approach, the galvo trajectory can be designed to approximately follow the desired processing trajectory 526, while remaining within the dynamic constraints (e.g., acceleration and/or bandwidth) of the galvo subsystem 508. For example, FIG. 11 graphically represents curves associated with AOD and galvo coordination according to one embodiment. As shown in FIG. 11, the galvo path 1110 may not be able to precisely follow a desired process path 1112, resulting in a beam trajectory error. The beam trajectory error can be removed by using the AOD subsystem 506 to additionally deflect the process beam 512. For example, FIG. 11 shows an AOD command signal 1114 in relation to the galvo path 1110 and process path 1112. Because the two trajectories (galvo and process beam) are known in advance, the AOD deflection trajectory can be calculated and verified that it satisfies the AOD's constraints (e.g., range and maximum normalized power over this range). The galvo trajectory can be tailored such that the residual error does not violate the AOD's constraints. This may be an iterative process; for example, the galvo velocity may be reduced in certain portions of the tool path such that the galvo can more closely track the selected trajectory and thus keep the resulting trajectory error within the AOD range limits.

Another embodiment includes "passively" correcting for galvo tracking error using the AOD subsystem 506, as described above. In this embodiment, the selected processing trajectory 526 is planned without explicit constraints, and the galvo subsystem 508 attempts to follow this path, with any resulting tracking error corrected with the AOD subsystem 506. Limitations to this approach may include excitation of undesired dynamics in the galvo (e.g., mirror resonances) and the risk that the performance of AOD error correction is not sufficiently adequate to reduce tracking error so as to meet the overall beam positioning requirements for a particular application.

In certain embodiments, AOD correction of galvo error can be used with separately generated beam and galvo trajectories to remove residual galvo tracking error. The AOD operation described in any of the above embodiments can be applied while simultaneously dithering or defocusing the beam to control effective spot size.

Another limitation to throughput can be the laser power available to process different portions of a particular pattern. For a given material, the process dosage (power divided by velocity) may be a function of the cross-sectional area of the ablated feature. If the system is using the maximum available laser power, the process beam velocity may be determined by dosage (velocity=power/dosage). It may be desirable to maintain the highest possible velocity, despite changes in dosage, to maintain high throughput. In some cases, this may be difficult due to rapid changes in the dosage. For example, it may be difficult to obtain a high velocity when a relatively thin trench widens by about five times (5×) to form a large-area feature. In this case, if the beam velocity remained constant over the length of this feature set, the velocity may be constrained by the high dosage used at the expanded area. This may unnecessarily slow down the beam velocity along the thinner trench. Rapid acceleration and deceleration of the main beam positioner (galvos) may be undesirable, especially for rapid transitions, due to the dynamic limitations of the galvos.

Figure 12:
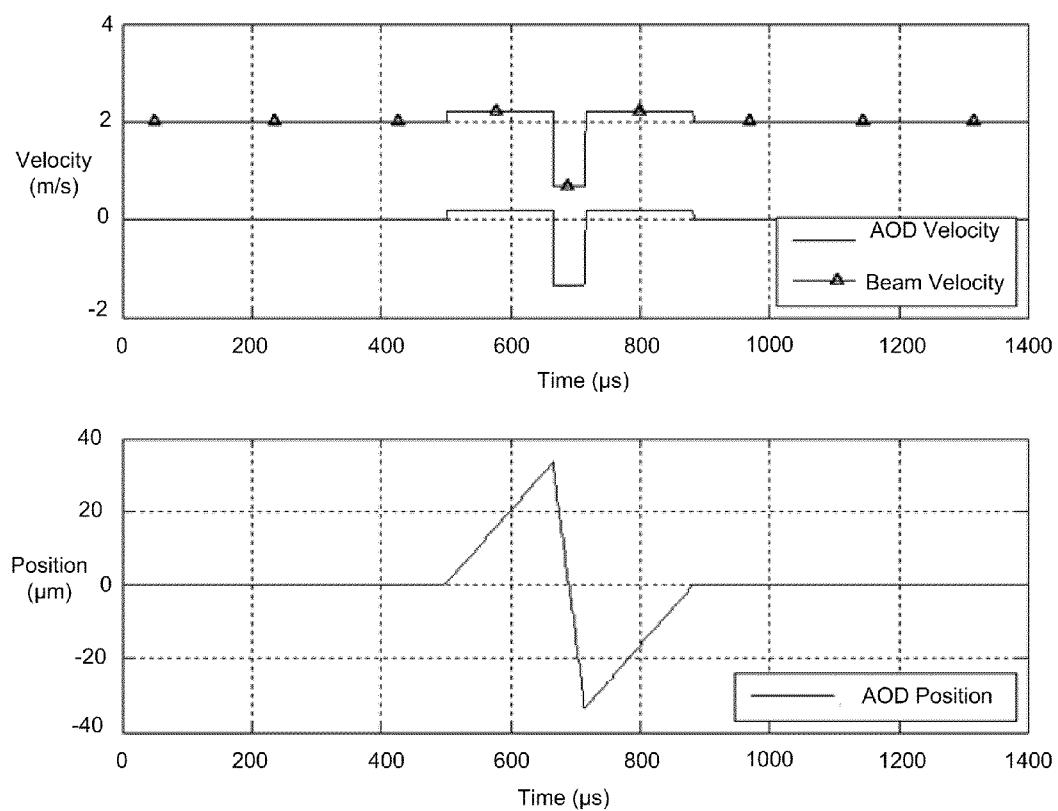
FIG. 12 graphically represents curves associated with AOD velocity compensation according to one embodiment.

To avoid or reduce rapid acceleration and deceleration of the main beam positioner, according to one embodiment, the available AOD field produces a lower beam velocity over a short segment. For example, assume a trench feature may be processed at a velocity of about 2 m/s, and the expanded feature, with a length of 100 μm, may be processed three times (3×) slower (due to a 3× higher specified dosage). If the galvo velocity of 2 m/s is unchanged, the beam nominally passes over the wide feature in about 50 μs. However, the beam processes the feature at a beam velocity of about ⅔=0.67 m/s (to maintain proper dosage). Thus the relative velocity of the AOD deflection is about 2−0.67=1.33 m/s, which may be applied for about 50 μs, resulting in an AOD deflection of about 67 μm (+/−about 33 μm). By avoiding velocity limitations in the entire section due to the wide features, this example embodiment effectively increases the local process speed by about 3×. FIG. 12, for example, illustrates the velocity trajectories during such a period. FIG. 12 graphically represents curves associated with AOD velocity compensation at a wide feature or other feature that uses a high dosage. In anticipation of the wide feature, the beam velocity speeds up locally and the AOD position shifts. Upon reaching the wide feature, the beam velocity is reduced and the AOD position slews across its field to compensate for the slow down. After processing the wide feature, the beam velocity recovers its speed and the AOD position returns to its neutral position.

In addition, or in another embodiment, the mean velocity of the beam can be dynamically varied (modulated) while maintaining constant dosage (power/velocity). In certain such embodiments, the AOD subsystem 506 modulates the process beam power as a function of the instantaneous galvo velocity. The power modulation provides the capability to slow down the galvo mirrors 533, 535 to process sections of the workpiece 524 with more restrictive dynamic requirements (e.g., rapid and frequent changes in the orientation of the ablated feature) or speed up the galvo mirrors 533, 535 in sections with relaxed dynamic requirements (e.g., straight sections or sections with very gradual changes in orientation). Without real-time AOD power control, such capabilities are not possible, leading to loss of throughput.

Another opportunity for throughput improvement occurs when processing parallel line segments (e.g., adjacent trenches). In certain such embodiments, the AOD subsystem 506 can toggle the process beam 512 between the two lines, at a sufficiently fast rate (e.g., around 1 μs) such that the two lines appear to be processed simultaneously. For two lines of equal dimension, requiring an equal dosage, parallel processing doubles the required laser power. In a power-limited system, this may require the velocity to be reduced by about 50%, limiting the throughput advantage. However, it may eliminate setup moves for the two lines and reduce the velocity-dependent dynamic constraints that may otherwise prevent the use of full velocity. In systems without such power limits, parallel line processing may double throughput for that section. In addition, in both cases, parallel processing of such lines improves line-line spacing control (which is controlled by the repeatability of the AOD subsystem 506), which is a benefit in some applications to control line impedance.

When the lines turn a corner, the path length of the two lines differ depending on the turn radius, turn angle, and line separation. In certain such embodiments, the effective beam velocities of the two lines can be adjusted to account for the different path lengths of the two line segments. The power (dosage*velocity) may then be modulated by the AOD subsystem 506 as processing switches between the two lines. The same approach can be extended to multiple lines, as long as the line set fits within the available AOD field and sufficient process beam power is available to produce an adequately high velocity.

Processing multiple lines at the same time may be complicated when the multiple lines do not remain parallel over their entire respective paths. In certain such embodiments, the appropriate region can be processed in parallel, and a transition region applied to the end of the regions (e.g., sloped fluence), as in the technique used for intersection processing. The remaining section can then be processed and joined at the termination with a similarly transitioned region. In this way, the use of parallel processing can be maximized to enhance throughput.

Figure 13:
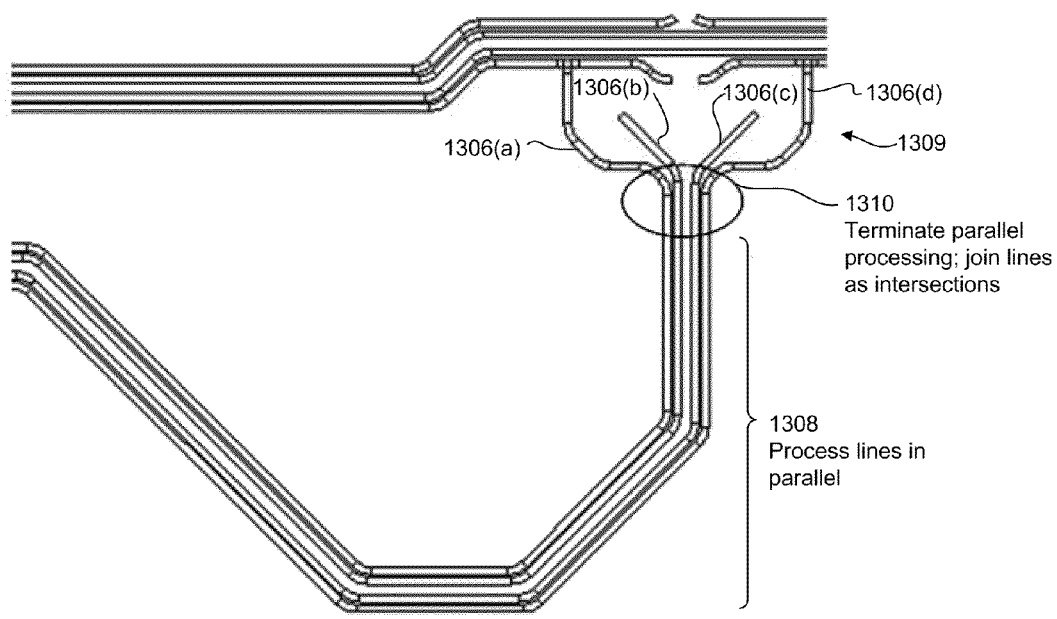
FIG. 13 schematically represents parallel processing and region joining according to one embodiment.

FIG. 13 schematically represents parallel processing and region joining according to one embodiment. FIG. 13 illustrates a plurality of lines 1306(a), 1306(b), 1306(c), 1306(d) (referred to collectively as lines 1306) that run parallel to one another in a first region 1308 and diverge from one another in a second region 1309. In other words, the lines 1306 have parallel portions in the first region 1308 and diverging portions in the second region 1309. FIG. 13 illustrates a transition region 1310 where the lines 1306 change from the parallel portions to the diverging portions.

To process the lines 1306 using dithering in the first region 1308, the AOD subsystem 506 moves the laser beam spot position back and forth between the parallel portions of the lines 1306 such that the laser beam processes the parallel portions in a single pass along the mutual processing trajectory in the first region 1308. The AOD subsystem 506 adjusts the effective beam processing velocities between the parallel portions to account for turns along the processing trajectory that result in different path lengths corresponding to the respective parallel portions. The AOD subsystem 506 also modulates the power of the laser beam based on the adjusted effective beam processing velocities to maintain desired processing dosages for each of the parallel portions. Upon arriving at the transition region 1310, the AOD subsystem 506 selectively shapes the parallel portions of three of the lines 1306(a), 1306(b), 1306(c) and, while continuing to process the line 1306(d) along its processing trajectory, terminates processing of the three shaped lines 1306(a), 1306(b), 1306(c) in the transition region 1310. The shaping allows the terminated lines 1306(a) 1306(b), 1306(c) to be intersected (by their respective diverging portions), at a later point in time, while maintaining a desired depth at the respective intersections. After processing the diverging portion of the line 1306(d), the diverging portions of the lines 1306(a), 1306(b, 1306(c) are sequentially processed along their respective diverging processing trajectories in the second region 1309.

Figure 14:
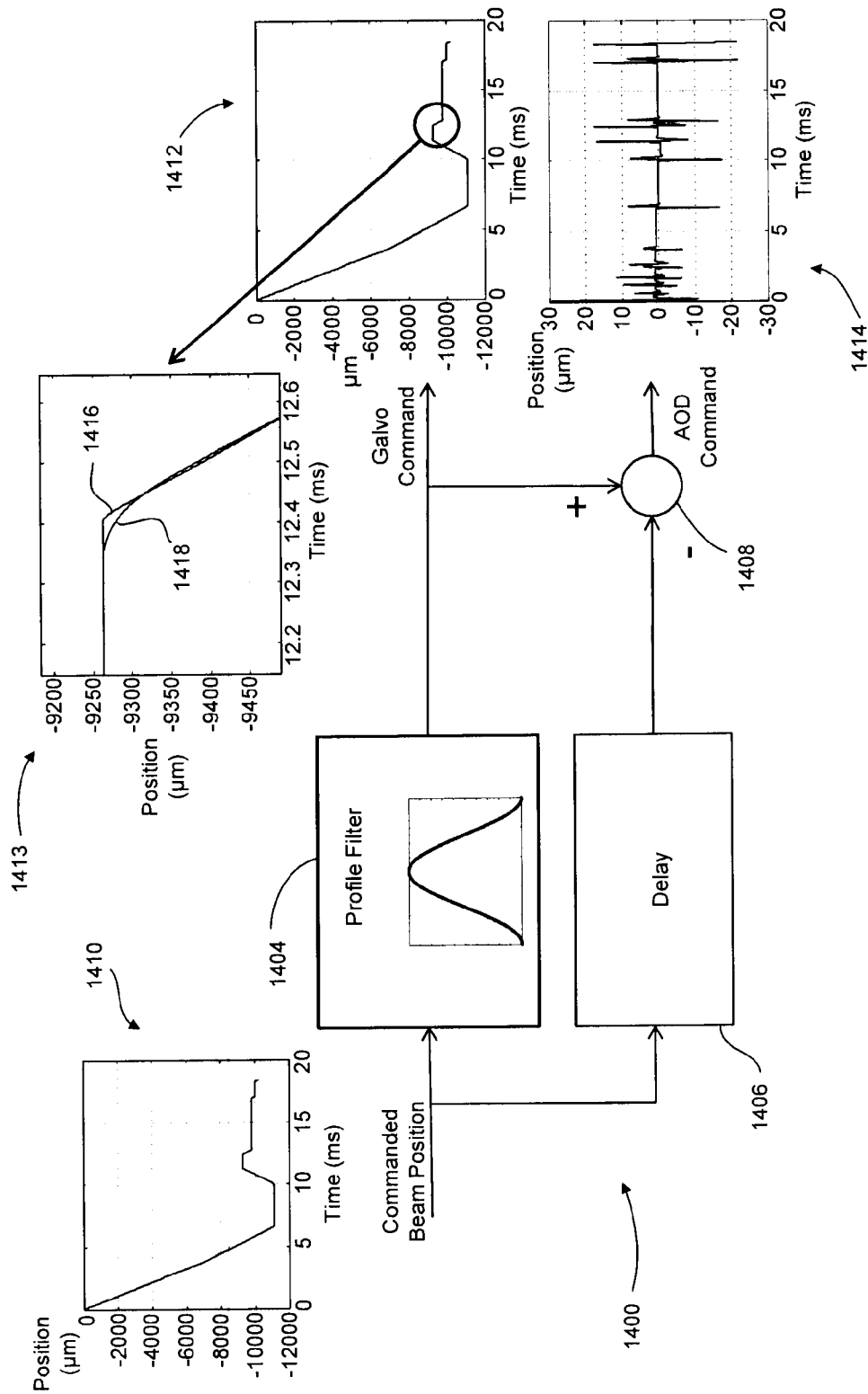
FIG. 14 schematically illustrates a tertiary profiling subsystem according to one embodiment.

FIG. 14 schematically illustrates a tertiary profiling subsystem 1400 according to one embodiment. Tertiary profiling refers to using the AOD subsystem 506 as a tertiary positioner (e.g., in addition to XY stages and the galvo subsystem 508). An example laser beam tertiary positioner is described in U.S. Pat. No. 6,706,999, which is assigned to the assignee of the present disclosure, and which is hereby incorporated by reference herein in its entirety. Tertiary profiling using the AOD subsystem 506, as disclosed herein, allows for profiling the beam path at high speed (e.g., using updates at about 1 µs to provide timing resolution) wherein AOD commands are issued on discrete timing boundaries. The tertiary profiling subsystem 1400 includes a profiling filter 1404, delay element 1406, and a subtractor 1408.

FIG. 14 illustrates an example beam profile 1410 corresponding to a trench that is desired to be cut into a workpiece. The example beam profile 1410 includes sharp turns that may be difficult to track at high velocities using the galvo subsystem 508. The example beam profile 1410 is provided (as a commanded beam position signal) to the profiling filter 1404 and the delay element 1406. The profiling filter 1404 comprises a low-pass filter that filters out high frequency content that may be difficult for the galvo subsystem 508 to track. The output of the profiling filter 1404 may be used as a galvo command (galvo control signal), as shown by position profile 1412. FIG. 14 illustrates an enlarged portion 1413 of the position profile 1412, which shows a commanded position 1416 with respect to an actual position 1418 provided by the galvo subsystem 508. The AOD subsystem 506 is used to correct for the difference between the commanded position 1416 and the actual position 1418.

In the illustrated embodiment, the profiling filter 1404 comprises a finite impulse response (FIR) filter. FIR filters naturally have a constant delay for signals in any frequency range. An artisan will recognize from the disclosure herein, however, that other types of filters may also be used. The delay element 1406 delays the example beam profile 1410 by approximately the same amount of delay introduced by the profiling filter 1404. The subtractor 1408 subtracts the output of the profiling filter 1404 from the output of the delay element 1406 to get the high frequency content that was removed from the galvo command. The high frequency content output by the subtractor 1408 may then be used as an AOD command signal for controlling the AOD subsystem 506. FIG. 14 illustrates an example AOD position command profile 1414. Although not shown, differentials may be used on the position command profile 1414 to calculate corresponding velocity and acceleration command profiles.

Figure 15A:
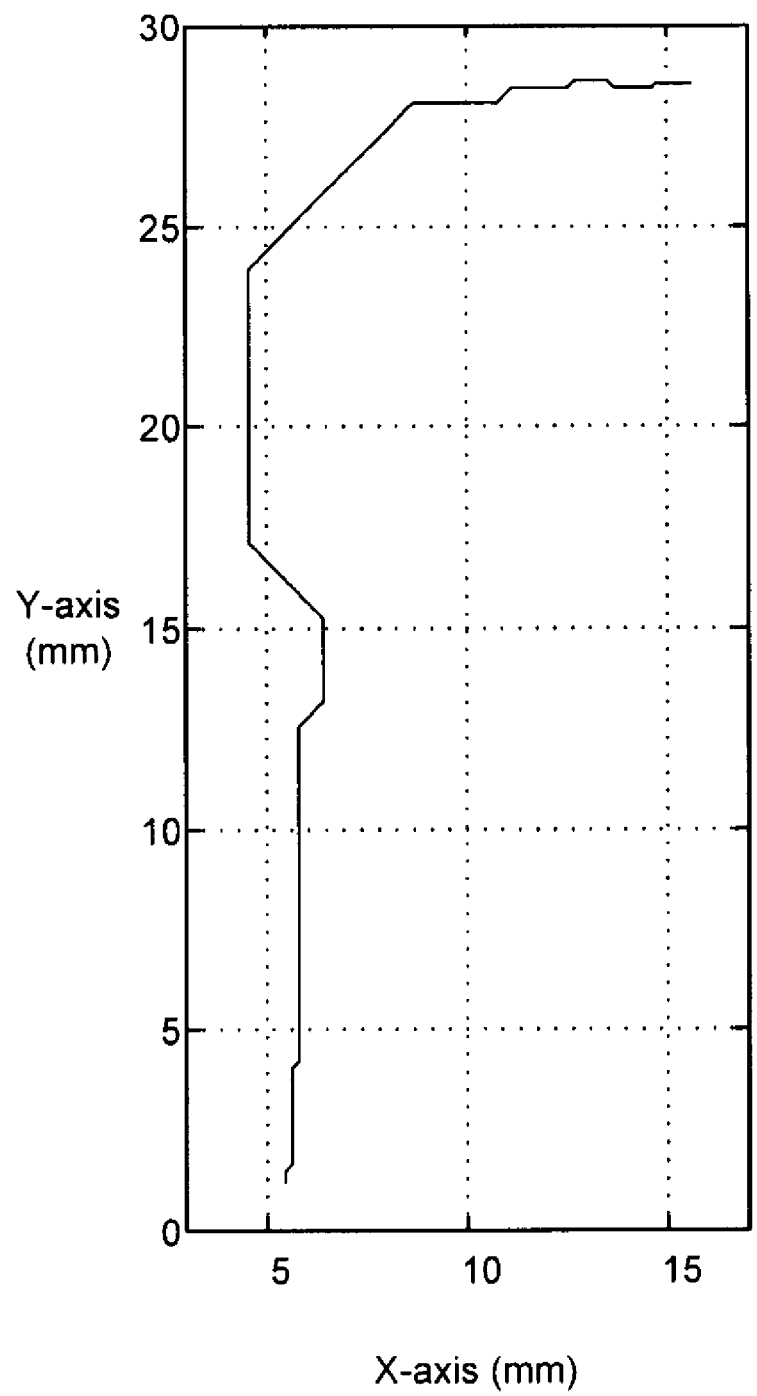
FIGS. 15A, 15B, 15C, 15D, and 15E illustrate signals produced and/or used by the tertiary profiling subsystem shown in FIG. 14 according to one embodiment.
Figure 15B:
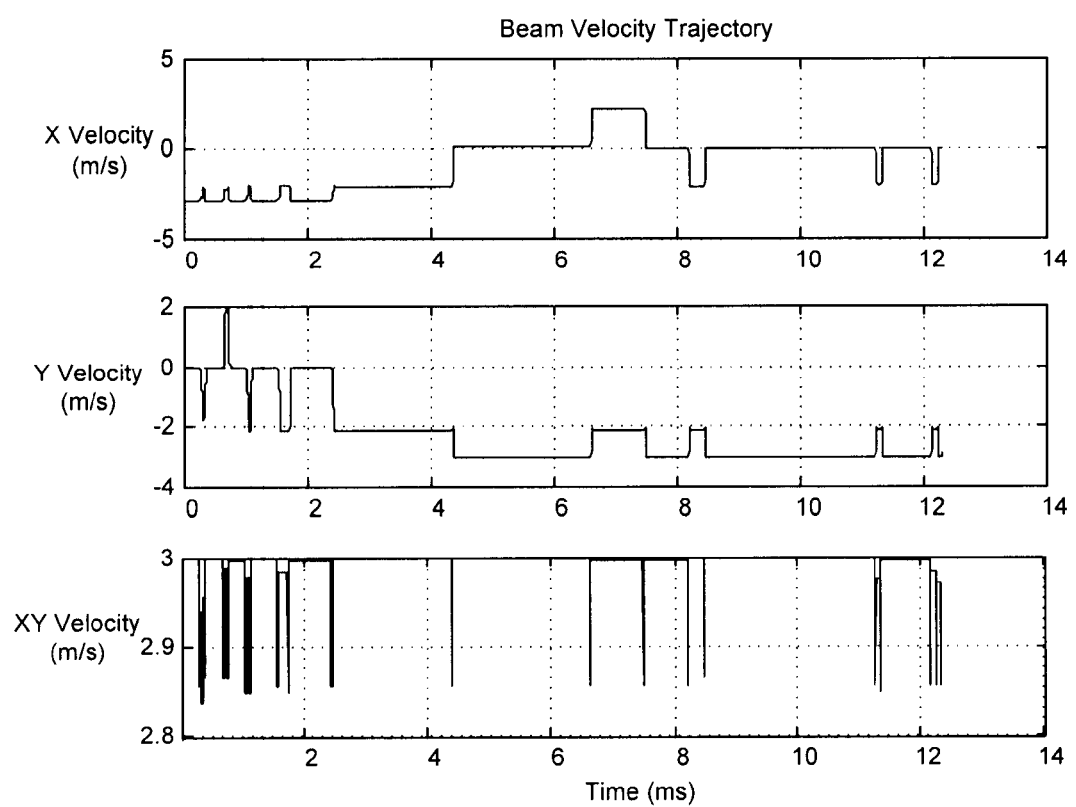
Figure 15C:
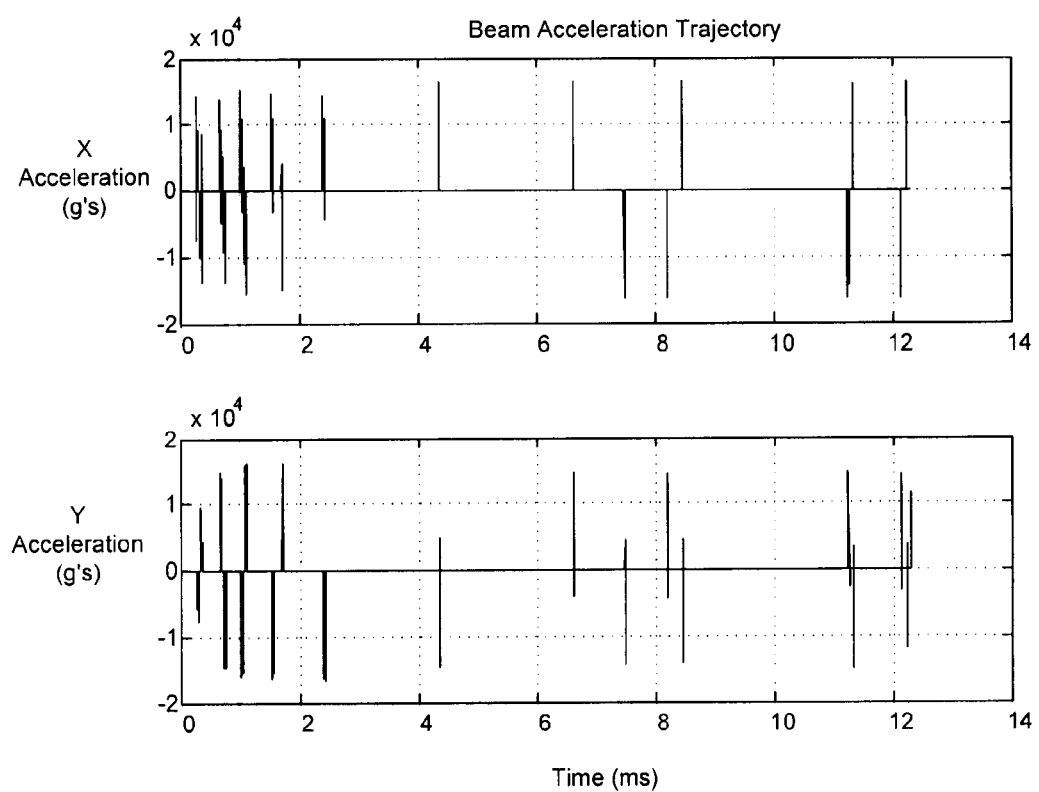
Figure 15D:
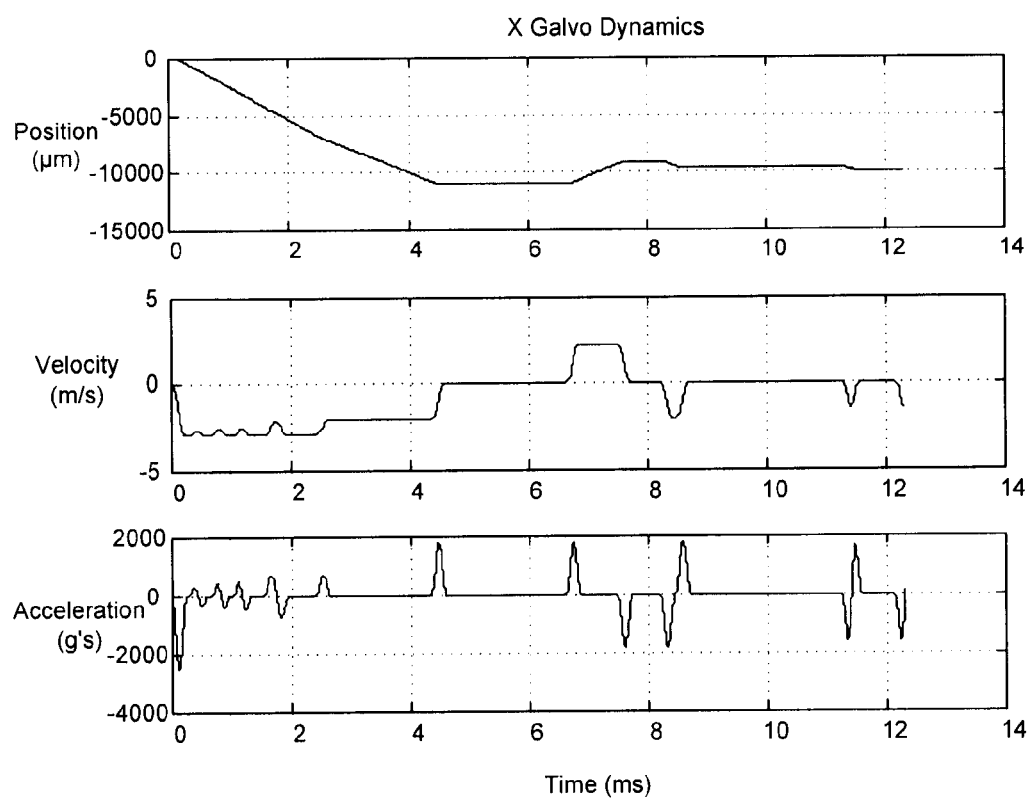
Figure 15E:
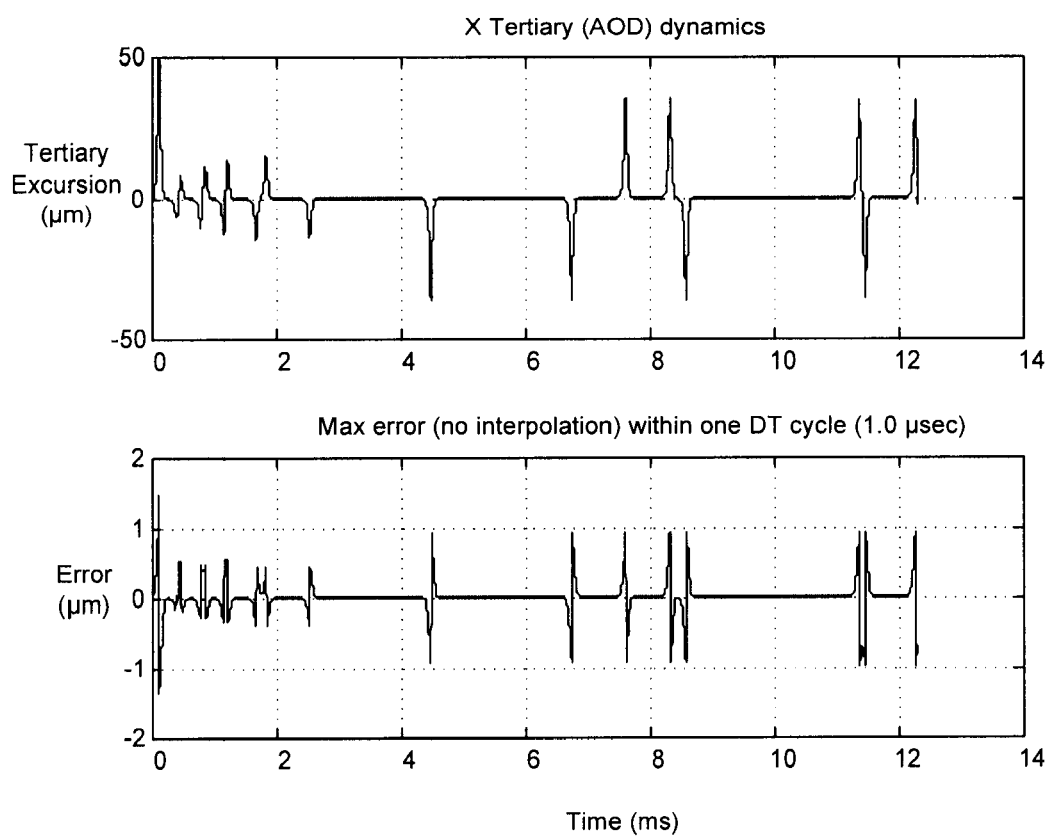

By way of further example, and not by limitation, FIGS. 15A, 15B, 15C, 15D, and 15E illustrate signals produced and/or used by the tertiary profiling subsystem 1400 shown in FIG. 14 according to one embodiment. FIG. 15A illustrates an example beam profile input to the tertiary profiling subsystem 1400. FIG. 15B graphically illustrates X, Y, and XY beam velocity trajectories corresponding to the example beam profile of FIG. 15A. FIG. 15C graphically illustrates X and Y beam acceleration trajectories corresponding to the example beam profile of FIG. 15A. FIG. 15D illustrates example galvo dynamics, including commanded position, velocity, and acceleration signals. FIG. 15E illustrates example tertiary (AOD) dynamics, including commanded excursion and error signals.

Figure 16A:
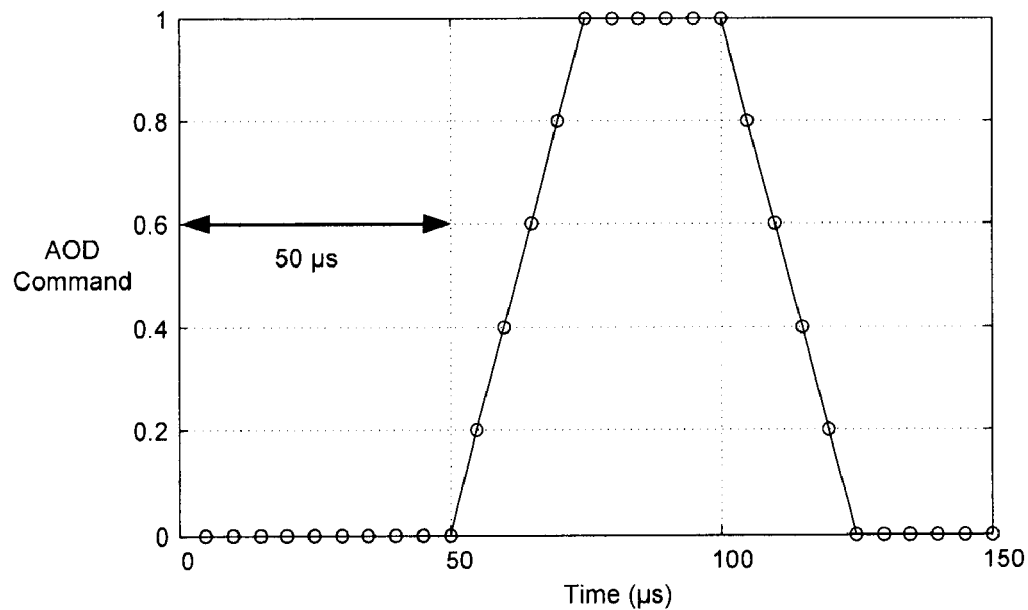
FIGS. 16A, 16B, and 16C illustrate example AOD command sequences according to certain embodiments.
Figure 16B:
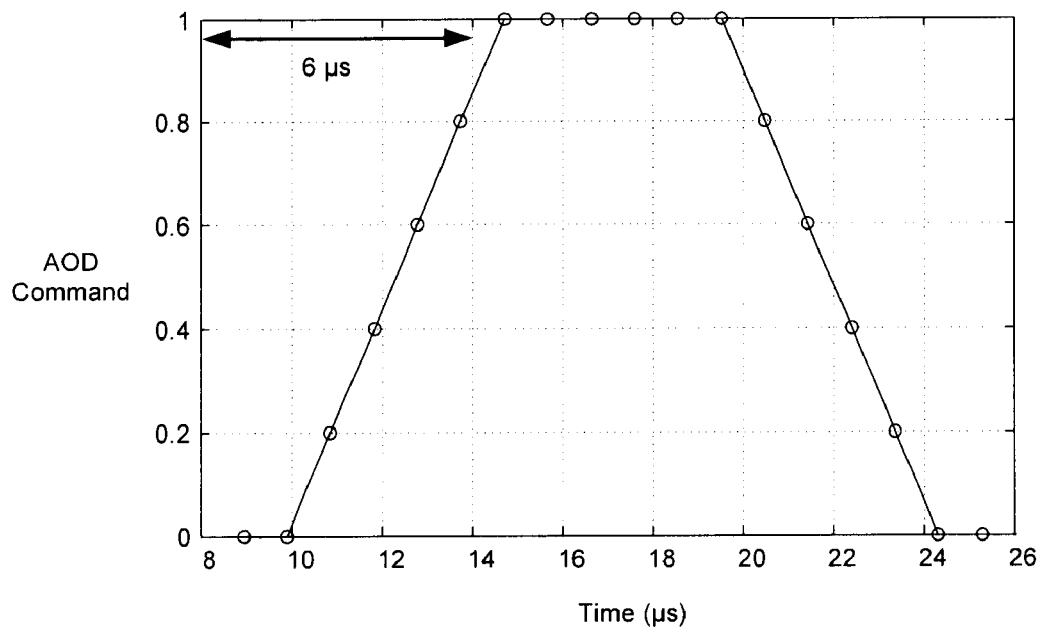
Figure 16C:
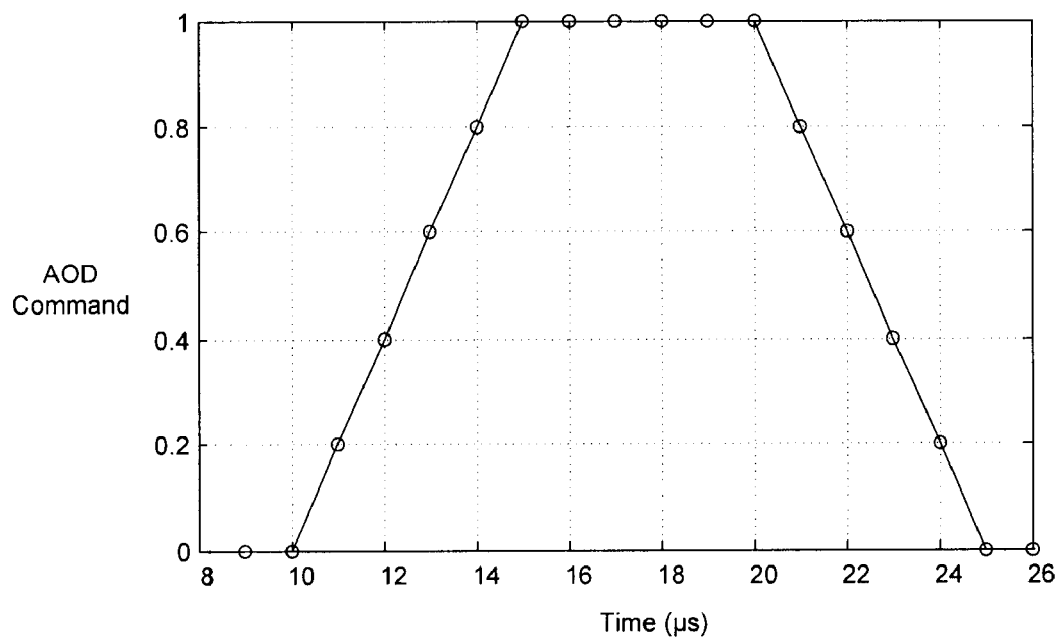

FIGS. 16A, 16B, and 16C illustrate example AOD command sequences according to certain embodiments. In FIG. 16A, the AOD command sequence updates the AOD at about 5 µs intervals, which are aligned to 5 µs boundaries. Such an embodiment may be sufficient for low speed processing (e.g., processing at about 200 mm/s). In FIG. 16B, a high speed AOD command sequence updates an AOD at approximately 1 µs intervals that are not aligned to timing boundaries. Arbitrary timing (with updates unaligned to any timing boundaries) may be difficult to implement in some embodiments. For example, intersection processing may require that AOD transitions occur with about 1 µs resolution, at a high speed of about 2 m/s to about 3 m/s. To satisfy such requirements, arbitrary layouts processed at constant velocity may use variable, sub-microsecond timing resolution. Further, variable velocity processing may be desirable to: provide high velocity for narrow trenches for increased throughput; provide lower velocity for wide trenches to maintain fluence; to slow down (or pause) over rastered areas to raster inline (e.g., to reduce or eliminate return moves); and/or to slow down if necessary to improve galvo tracking and to keep the AOD within its bounds.

In one embodiment, timing is provided by position-based AOD commands and an arbitrary beam trajectory. In such an embodiment, triggering is based on XY position. Thus, for a non-linear beam positioner trajectory, the trigger is based on the X axis or Y axis, depending on the feature location. This embodiment may have increased field programmable array (FPGA) data processing requirements due to streaming first-in-first-out (FIFO) trigger data as the workpiece is processed, realtime position command data (both X and Y), and wide dynamic range used during processing (e.g., high resolution over full field). This embodiment may also use command triggering that does not provide for variable velocity processing.

In another embodiment, timing is provided by time-based AOD commands and a modified beam trajectory. This embodiment may limit AOD command transitions to segment boundaries, wherein segments may be subdivided as required to include AOD commands. This embodiment aligns segments to position (not time) boundaries, which uncouples processing geometry from beam velocity. This embodiment also adjusts segment velocities such that boundaries are hit at regular time intervals, which provides: flexible, variable process velocity; velocity variation that is easily implemented with the tertiary beam positioner; and reasonable restrictions on AOD transition spacing to constrain velocity variation. This approach may be advantageous, for example, in pulsed laser systems, which may require laser pulsing control on discrete, predictable time boundaries.

Figure 17A:
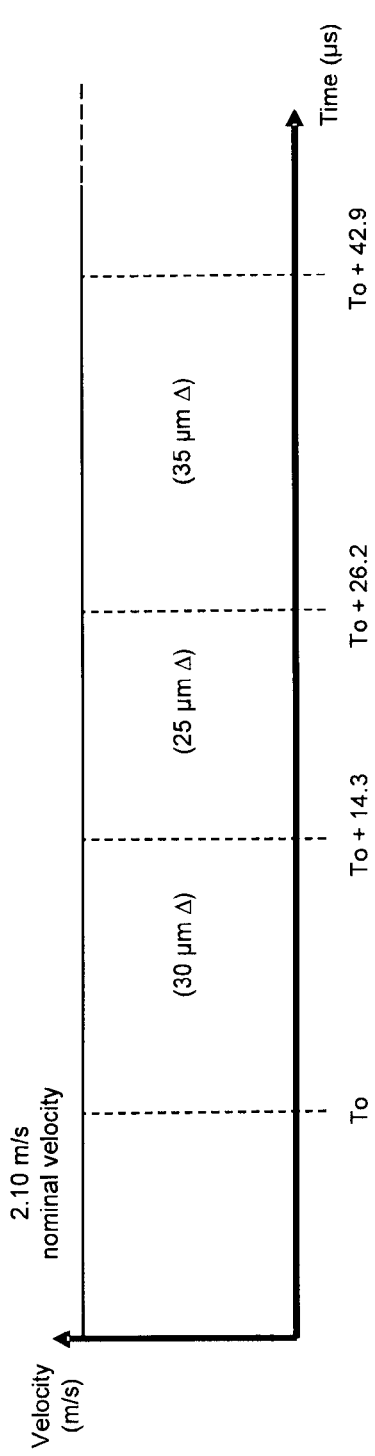
FIG. 17A and 17B graphically illustrate examples of velocity modulation according to certain embodiments.
Figure 17B:
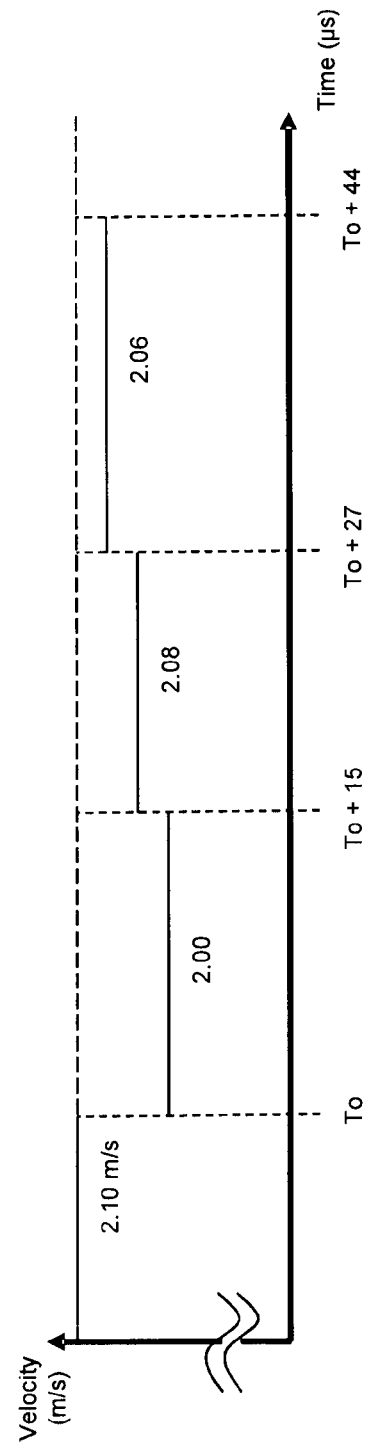

In FIG. 16C, AOD updates occur at 1 µs intervals and are aligned to discrete, deterministic 1 µs boundaries. Feature positions, however, may be arbitrarily located in the toolpath. To align arbitrarily located features in time, the velocity between features is predetermined. Thus, in certain such embodiments, velocity modulation is used from segment to segment between features. FIGS. 17A and 17B graphically illustrate examples of velocity modulation according to certain embodiments. In FIG. 17A, the velocity modulation uses timing based on the position increments corresponding to an optimum process velocity. In FIG. 17B, the velocity modulation adjusts velocity by aligning timing to discrete time increments (same position increments). In certain embodiments, a time delta ($\Delta$) between segment boundaries, nominally equal to Dseg/Vnom (where Dseg=segment length and Vnom=max process velocity) is rounded up to a next discrete timing boundary. During velocity modulation, the dosage may be held constant (e.g., by varying power as velocity changes). A minimum position increment ($\Delta$Pmin) and a maximum timing increment ($\Delta$T) may be selected so as to bound a relative drop in process velocity to Vnom*$\Delta$T/$\Delta$Pmin, where Vnom is a nominal velocity. For example, $\Delta$T may be selected to be 1 µs and $\Delta$Pmin may be selected to be 20 µm to provide a 15% velocity variation at 3 m/s. Because the velocity variation occurs for only a short period of time, it may have little or no effect on throughput.

Figure 18:
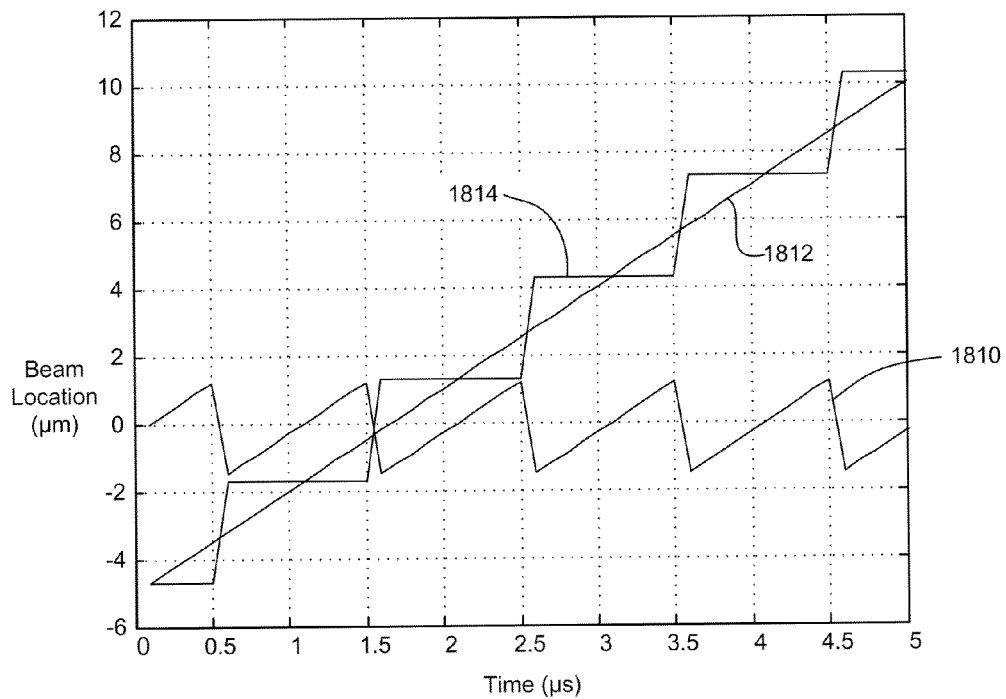
FIG. 18 graphically illustrates a positioning error with respect to a position command signal and a resulting AOD position profile according to one embodiment.

Tertiary profiling may produce a positioning error that results from a discrete AOD update period and an AOD velocity term. For example, FIG. 18 graphically illustrates a positioning error 1810 with respect to a position command signal 1812 and a resulting AOD position profile 1814 according to one embodiment. As shown in FIG. 18, the AOD does not slew between command updates in the same manner as would, for example, a mechanical mirror. Thus, for example, a 1 µs update period at a velocity of 3 m/s may produce a positioning error of about +/−1.5 µm. The update period may be reduced if required to limit this error. Chirping the RF waveform may reduce positioning errors in certain embodiments. FIG. 15E graphically illustrates an example position error.

IX. Beam Pointing Stabilization

In certain laser processing applications that provide good accuracy and/or repeatability, the contribution of angular or translational beam jitter can become a significant portion of the error budget. Jitter may be due to beam motion inherent to the laser source, or due to air turbulence in the beam path (exacerbated by air temperature differentials within the beam path), and/or mechanical vibrations within the optics train. In a laser scanning system, angular errors contribute directly to position errors at the workpiece, when scaled by the scan lens focal length. Beam translational errors indirectly contribute to workpiece errors by producing an (uncompensated) beam angle at the workpiece; this angle, scaled by any Z height variation of the workpiece surface, produces XY beam positioning errors on the workpiece.

A system equipped with AOD deflection capabilities, such as the system 500 shown in FIG. 5, can correct for beam jitter, with little or no additional actuation cost. By placing a sensor (not shown) along the optical path (e.g., near the scan lens 520), feedback control can command an AOD deflection so as to keep the beam correctly positioned into the scan lens 520, which may improve beam position accuracy and repeatability. The frequency content of many beam jitter sources may be relatively low (e.g., less than about 10 Hz for air turbulence and less than about 500 Hz for mechanical vibration) and thus easily correctable by the AOD subsystem 506. A limiting factor in this approach may be the noise content of the sensor used to detect beam angle and translation.

The intentional deflection of the AOD (commanded to produce a selected workpiece trajectory) may be accounted for when making measurements. For example, in an optical train in which relay optics are not used to transmit the AOD-deflected beam to the scan lens 520, the AOD's deflection angle, when scaled by the beam path length from the AOD subsystem 506 to the scan lens 520, produces a translational offset at the scan lens 520. A simple calibration allows this to be removed from the measurement before jitter correction. The calibration can be performed as a function of path length from the AOD subsystem 506 to the scan lens 520, if necessary. In general, however, if the process beam is focused on the sensor, no such compensation may be required because lateral beam motion will not affect spot position at the sensor.

Note also that jitter correction can correct for undesirable side effects from AOD operation, such as thermal drift of the beam due to AOD heating, which may occur for high-powered AOD devices.

X. Process Improvements: Duty Cycle

In some embodiments, the AOD subsystem 506 enables laser/material interaction process improvements. In one example, the cross-sectional area of a trench cut into a dielectric material is sensitive to the "dosage" (process beam power divided by beam velocity) applied to the workpiece. For best or improved performance in some applications, the applied dosage may be kept much higher than the ablation threshold of the material in order to avoid heat affected zone (HAZ) effects, such as melting or charring. At low velocities, which may be used in some situations due to constraints imposed by beam positioner dynamics or laser power, the applied dosage may begin to produce undesirable HAZ effects. Thus, to avoid or reduce HAZ effects according to one embodiment, the AOD subsystem 506 modulates the power duty cycle of the process beam 512, such that high peak power is maintained while reducing the average power to the level of that used for the particular operating condition. For example, when moving the process beam 512 at about 100 mm/s, modulating the beam with a duty cycle of about 10% (about 1 µs on, 9 µs off) produces an acceptably small "bite size" (incremental process length per pulse interval) of about 1 µm, while increasing peak power by about ten times (10×) relative to an attenuated 100% duty cycle beam. As with the jitter correction outlined above, this capability may be added with little or no additional cost.

XI. Process Improvements: Plume Avoidance

AOD operation may also provide the capability to reduce or avoid plume effects during ablation of target material on or within the workpiece. Material ablated from a workpiece, which may be ejected as a plasma, gas, or particulate debris, can affect the quality of the process beam spot through, for example, wavefront distortion, power attenuation, and/or pointing effects. To mitigate plume effects according to one embodiment, the position of the process spot is switched during processing such that each spot is unaffected by the plume effects of the previous spot. If the process spot position can be switched between N positions (with all spots lying along the selected process trajectory) over the available AOD field distance (Daod), when running at a process velocity V, the plume of the forward process spot dissipates for Daod/V/N seconds before it affects the next spot. For example, when the position N=5, Daod=50 µm, and V=2 m/s, the plume of the forward process spot may have about 5 µs to dissipate before it affects the next spot. When the process trajectory includes curved segments, the positions of the distributed spots may be adjusted to remain on the selected trajectory.

XII. Through-the-Lens Viewing

In laser processing machines, the processing beams are aligned to workpiece features. The alignment may be performed by identifying a workpiece alignment fiducial (e.g., an alignment target) with an alignment camera, and then mapping the camera field of view to the process beam position through calibration. Speed and efficiency may be reduced because this uses a two-step process (involving laser-to-camera calibration error, and camera fiducial identification error), and because the camera and scan lens are separated from each other, which adds another uncertainty due to positioning stage repeatability and accuracy.

In certain embodiments, it is more desirable to use through-the-lens viewing to capture both the process beam and the workpiece view in one image, which enables measurement of the relative position between the beam and a fiducial target. This may be accomplished by designing the scan lens 520 shown in FIG. 5 to operate at two wavelengths (a process wavelength and a vision wavelength). Compromises may sometimes be made in the scan lens design in order to accommodate both the process wavelength and the vision wavelength. One embodiment overcomes this compromise by illuminating the workpiece 524 with the process beam wavelength when imaging the fiducial.

Figure 19:
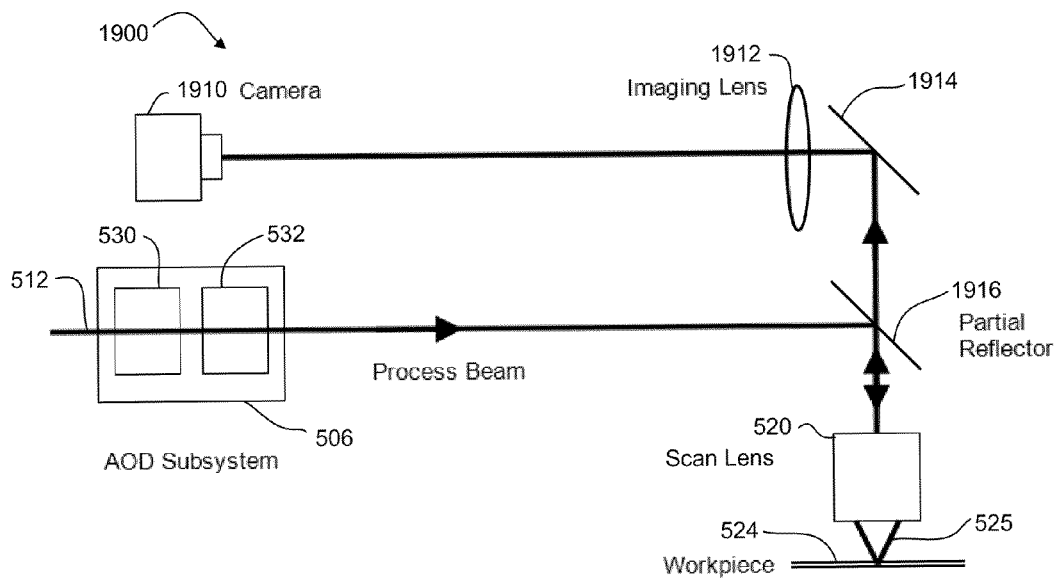
FIG. 19 is a block diagram of a system for through-the-lens viewing using an AOD subsystem for raster illumination according to one embodiment.

For example, FIG. 19 is a block diagram of a system 1900 for through-the-lens viewing using an AOD subsystem 506 for raster illumination according to one embodiment. The system 1900 also includes a camera 1910, an imaging lens 1912, a mirror 1914, a partial reflector 1916, and a scan lens 520. As discussed above with respect to FIG. 5, the AOD subsystem 506 includes AODs 530, 532 for deflecting a process beam 512 provided to the scan lens 520, which provides a focused laser beam 525 to a workpiece 524. It may be difficult to find an illumination source with the same wavelength as the process beam 512, and using a different wavelength (even within a few nanometers) may degrade the inspection resolution.

Instead, a portion of the process beam 512 can be split off and used to illuminate the workpiece 524. This can be performed with beam splitters and diffusers or other defocusing elements, which may add additional optical components, alignment, and complexity. Thus, in the embodiment shown in FIG. 19, the AOD subsystem 506 is used to illuminate the workpiece 524 using a raster pattern that fills a region on the workpiece 524 with uniform fluence, and includes one reference spot of higher intensity to use as a reference for the alignment of the process beam to the workpiece 524. The partial reflector 1916 picks off light reflected from the workpiece 524, the mirror 1914 redirects the reflected light through the imaging lens 1912 to focus the image at the camera 1910. Adding the optical path to pick off and re-image light reflected off the workpiece 524 into the scan lens 520 allows the camera 1910 to image the workpiece 524 and reference spot and determine the relative alignment of beam to fiducial.

The embodiment shown in FIG. 19 can also provide the capability of determining the correct scan lens Z height adjustment to maintain spot focus (minimizing the spot size in the alignment camera). Recording the re-imaged spot size at three to five separate lens Z heights may provide enough information to derive the optimum spot position after a curve fit to expected spot size growth vs. Z height.

This alignment technique can provide very good beam-to-fiducial alignment accuracy (e.g., less than about 10% of the spot size). This can provide the capability to quickly align two separate scan field areas on a workpiece because the XY position on the workpiece may be the same for processing and alignment. By aligning the spot of one scan field to a processed feature of an adjacent scan field, the two process fields may be separately processed yet joined together with high accuracy.

An additional feature of through-the-lens viewing is the ability to map beam positioning errors over the surface of the part to be processed. One challenge of processing a part over such a large field is that the beam may be non-telecentric (e.g., the beam angle at the workpiece may be non-zero or off normal), and varying over the field. This angle, multiplied by any Z height variation, produces an XY positioning error. Telecentric angles for large-field scan lenses may be up to about 15 degrees. Workpiece surface variation may be about +/−100 µm. Thus, the combination of telecentric angles and workpiece surface variation may produce XY errors of up to about +/−26 µm (relative to, e.g., an error budget in a range between about 10 µm and about 20 µm). By using through-the-lens viewing to record these position offsets at several points in the field (enough samples to accurately map the Z terrain of the part over the process field), the telecentric errors can be removed. A set of reference fiducials on the workpiece may be used such that the location of the process spot, relative to the fiducials, may be accurately measured (to within a few microns). Absolute measurement of spot position in a through-the-lens setup may be difficult. Spot position measurements, however, may be performed during alignment or in real-time during part processing.

In one embodiment, a method includes aligning a processing laser beam to workpiece features. The processing laser beam includes a predetermined wavelength for processing the workpiece features. The method includes propagating the processing laser beam along a propagation path through a scan lens to a workpiece. The method further includes manipulating the processing laser beam so as to illuminate, through the scan lens, a selected region of the workpiece comprising an alignment target with the manipulated processing laser beam at the predetermined wavelength, wherein the selected region is larger than a reference laser beam spot of the processing laser beam provided through the scan lens. The method further includes directing at least a portion of a reflection of the manipulated processing laser beam back through the scan lens to a camera for imaging the selected region of the workpiece and, based on an image of the selected region captured by the camera, determining a position of the reference laser beam spot relative to the alignment target.

In one embodiment, a laser processing system is provided for aligning a processing laser beam to workpiece features. The processing laser beam comprising a predetermined wavelength for processing the workpiece features. The system includes a laser source for providing the processing laser beam, a scan lens to focus the processing laser beam at a laser beam spot on or in the workpiece, and an AOD subsystem. The AOD subsystem generates a raster pattern of laser beam spots that illuminates a selected region of the workpiece, through the scan lens, with a uniform fluence, wherein the selected region includes an alignment target. The AOD subsystem further provides, through the scan lens, the reference laser beam spot within the selected region, wherein the reference laser beam spot is at a higher intensity than that of the raster pattern of laser beam spots. The system also includes optical elements to direct at least a portion of a reflection of the processing laser beam from the selected region back through the scan lens, and a camera for imaging the selected region of the workpiece. The image of the selected region is used to determine a position of the reference laser beam spot relative to the alignment target.

In certain embodiments the optical elements include a partial reflector for receiving the reflection of the processing laser beam from the selected region through the scan lens, and an imaging lens for receiving at least a portion of the reflection of the processing laser beam from the partial reflector and focusing the at least a portion of the reflection onto an aperture of the camera.

In certain embodiments, the system further includes a controller for calculating a positioning error based on the determined position of the reference laser beam spot relative to the alignment target. Based on the calculated positioning error, the controller commands the AOD subsystem to position a processing laser beam spot position relative to a selected workpiece feature. The processing laser beam propagates along the propagation path through the scan lens so as to focus the processing laser beam at the predetermined wavelength at the processing laser beam spot position to process the selected workpiece feature.

XIII. Example AOD Control Embodiments (a) Introduction

This section describes LDA processing using AOD control architecture according to one embodiment, including example equations that determine the AOD deflection commands during processing.

The AOD provides at least two functions: (1) beam position dithering to expand the process beam dimension, and (2) amplitude modulation to enable slope control on ablated features. Slope control is an aspect of attaining acceptable depth variation at feature intersections.

Figure 22:
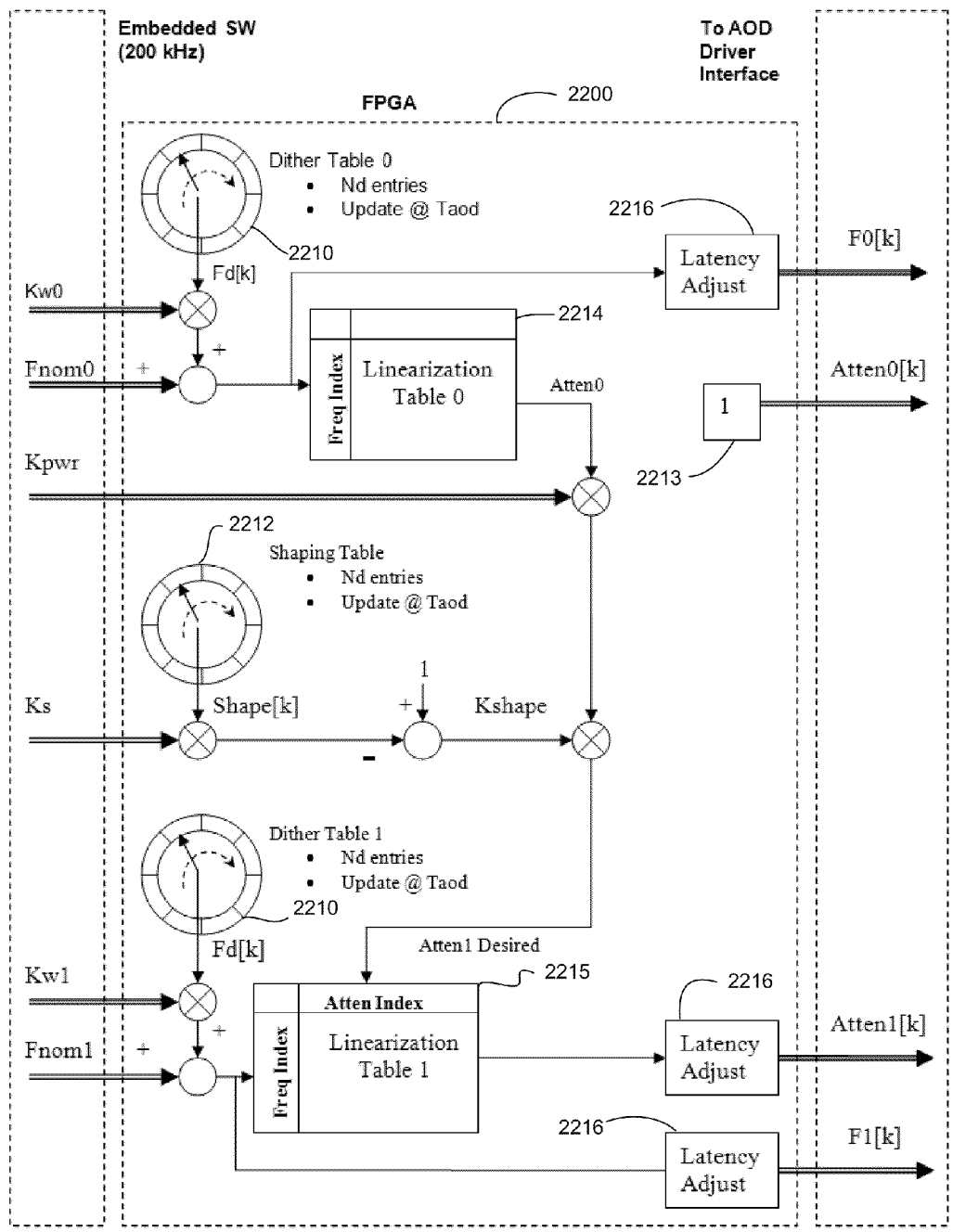
FIG. 22 is a block diagram representing AOD control data flow according to one embodiment.

The AOD frequency and amplitude modulation commands are updated, in this example, through an FPGA. For example, FIG. 22 is a block diagram representing AOD control data flow implemented in an FPGA 2200 according to one embodiment. The nominal update period is about 260 ns. A basic dither table 2210 may be loaded into the FPGA 2200 on a per-application basis. This dither pattern is scaled and split between the two AOD axes dynamically during processing. In addition, an amplitude modulation command controls laser power dynamically.

An artisan will recognize from the disclosure herein that this architecture may be extended to include, for example, sets of different dither waveforms, galvo error correction, and/or profiling assistance.

(b) General Definitions

The XY beam positioning axes are not aligned with the AOD axes (due to the angle of the turn mirror inside the galvo block). Thus the AOD axes in this example are referenced as axis 0 and 1, rather than X and Y.

Dither: The process of rapidly changing the frequency command to one or both AOD axes. The location of the process beam on or in the workpiece is a linear function of the AOD frequency command.

F0: AOD frequency command, axis 0.

F1: AOD frequency command, axis 1.

Fnom: Nominal AOD frequency command for zero deflection (nominally 110 MHz).

Fd[1 ... Nd]: A set of deflection frequencies comprising the "dither table" 2210 described above.

Nd: Number of deflection frequency points.

Kw: Dither width scaling factor. Kw=0 for no dither (nominal process beam).

W0: Nominal width (for an undithered process beam).

Wmax: Maximum width for full AOD deflection.

Lwc: Length of a width-change transition.

Wk: Width at the end of process segment k.

Theta0: Dither angle offset. Routs cut at this angle relative to the system XY axes deflect AOD1 to widen the trench. Angles are defined relative to the X axis, positive CCW.

Vx=X axis velocity.

Vy=Y axis velocity.

Dosage: The basic process parameter that determines trench quality; defined as power/velocity, or W/(m/sec)=(J/sec)/(m/sec)=J/m. During processing, dosage may be defined for the nominal (undithered) processing beam at focus.

(c) AOD Frequency Updates

The following equations describe the process of generating the AOD frequency commands during processing according to an example embodiment. Indices are used for variables that are streamed from the SCC or pulled from data tables, as noted below. Non-indexed variables are calculated or measured. In this example, there are "j" process segments (variable timing) and "k" updates from the FPGA 2200 (nominally 260 ns).

Note that the DSP and FPGA 2200 update periods are nominal and may be adjusted (e.g., in the range of 0.1 to 5.0 μsec), depending on throughput (for the DSP) or AOD driver performance (for the FPGA 2200).

(c-i) Straight Line Processing

For W[j]=width for the current process segment, $$Kw=(W[j]-W0)/(Wmax-W0),$$

$$Theta=a\,tan(Vy/Vx)-Theta0,$$

$$Fo=Fnom+Fd[k]*Kw,$$

$$F0=Fo*\cos(Theta),$$

$$F1=Fo*\sin(Theta).$$

(c-ii) Corner Processing

If the process trajectory changes direction, Vy and Vx change dynamically during the turn segment. The turn is made at (nominally) constant tangential velocity (Vx^2+Vy^2=const). Theta may be interpolated as a function of time, knowing initial and final angles.

The tool path may optionally be constrained to use only smoothed segments, such that corners are continuous and sine-profiled (or an appropriate approximation to sine profiling), especially for wide lines where Kw>0.

(c-iii) Width Change

During a width change, the dither factor Kw is updated in real time.

Let

Tseg=the accumulated time spent processing a width-change segment (a function of time), $$V[j]=V[j-1]=\text{process segment velocity},$$

Lwc=length of width-change process segment.

The real-time width as a function of time may be $$W=W[j-1]+(W[j]-W[j-1])*Tseg/(Lwc/V[j]),$$

and the dither factor Kw may then be $$Kw=(W-W0)/(Wmax-W0).$$

(d) Power Modulation (d-i) Operational Modes

Power modulation in the AOD subsystem accomplishes several objectives, including: beam "shuttering" (on/off); power modulation during processing at moderate update rates (about 0.1 to 5 μs); and power modulation during deflection dithering at high update rates (about 260 to 2000 ns).

Beam "shuttering" in this example is provided through the driver's digital modulation discrete input (DMOD). Power modulation for process control and dithering is provided through the AOD driver's analog modulation input (AMOD).

Shuttering may be used for on/off control to provide substantially full extinction (the analog modulation may leak power even with zero command). This is useful, for example, for mode-locked lasers without Q-switch control.

Process power modulation is intended to maintain the desired dosage (power/velocity ratio) for workpiece features as velocity changes dynamically, or to shape the endwall slopes of features at intersections.

Dithering power modulation serves at least two purposes: (1) to normalize diffraction efficiency as a function of deflection command, and (2) to shape the beam intensity profile as a function of deflection position, which can be used to create controlled slopes at sidewalls. Slope control (specifically, reduced slope angles) improves depth control at the intersections of ablated features.

(d-ii) Process Power Modulation

Power is modulated as function of dosage and velocity. Velocity varies during acceleration and deceleration segments, and dosage may vary in segments that transition between the dosages of two segments with different widths, or to transition to a different depth:

$$Dose=Dose[j-1]+(Dose[j]-Dose[j-1])*Tseg/(Lwc/V[j]).$$

And process power is modulated by the product of dosage and velocity:

$$P=Dose*V.$$

Power may be controlled through attenuation at the AOD. The AOD may be calibrated to linearize its attenuation response. The maximum (unattenuated) power level Pmax may be measured before processing a part. Thus:

$$Atten=P/Pmax.$$

(d-iii) High-Speed Power Modulation ("Shaping")

High-speed amplitude modulation, synchronized with the positioning dither, tailors the intensity in order to profile the sidewall slope control to support accurate intersection processing. This is known as "shaping" the intensity profile of the beam. Note that this modulation should not be confused with the high-speed linearization compensation discussed herein because they may be two separate steps. Due to the desired speed (e.g., an update rate of about 260 ns), high-speed modulation is implemented in FPGA look-up tables (LUT).

A scaling factor, Ks, scales the intensity shaping, similar to the deflection dither described above. The scaling allows shaping to be used only for intersections, thus avoiding or reducing significant power loss during long runs of wide features.

Given

Nd=number of entries in the dither table 2210 (e.g., about 256 entries),

Shape[k]=table 2212 of shaping values (0 to 1; Nd entries),

Ks=shaping scale factor (0 to 1; updated at a 0.1 to 5 µs rate).

The scaling of the shaping table 2212 is then given by:

Kshape=1−Shape[k]*Ks (for k continuously cycling between 1 and Nd).

Note that a Shape[ ] table of all 1's 2213 actually corresponds to zero power (for Ks=1). Thus, the table may be loaded with (1−NomShape), where the user specifies NomShape=1 for full power and 0 for zero power.

(d-iv) AOD Response and Linearization

The power modulation modes described above assume that the amplitude modulation command produces a linear response in beam power. However, the response of the AOD to the amplitude modulation command may be non-linear and, therefore, may be normalized.

Figure 20:
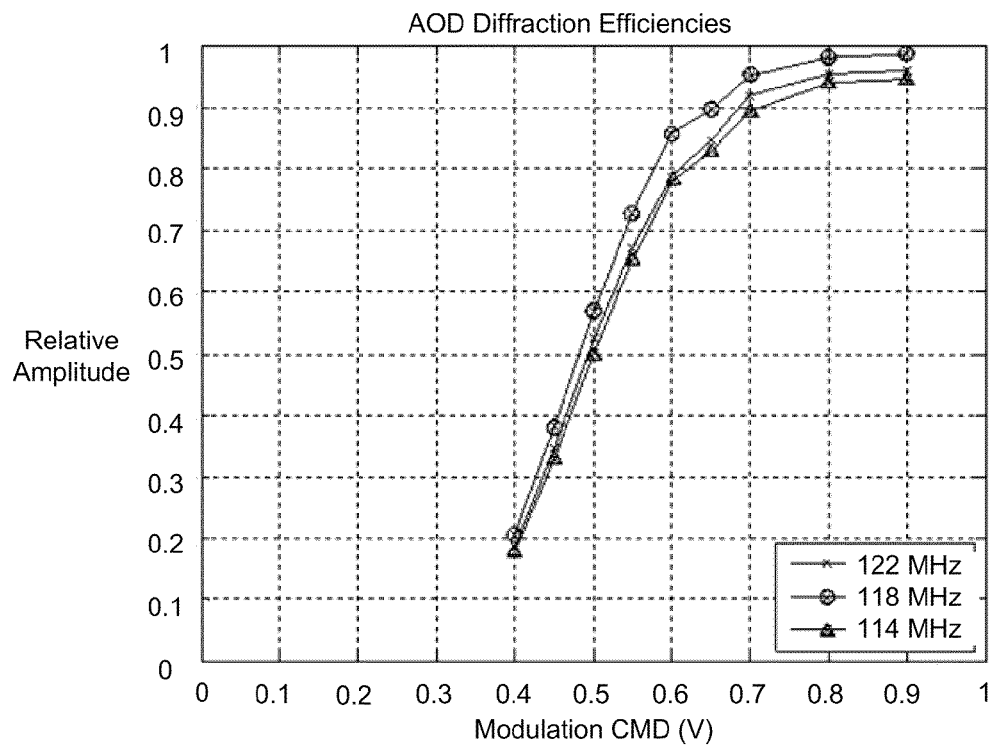
FIG. 20 graphically represents AOD diffraction efficiency curves according to an example embodiment.
Figure 21:
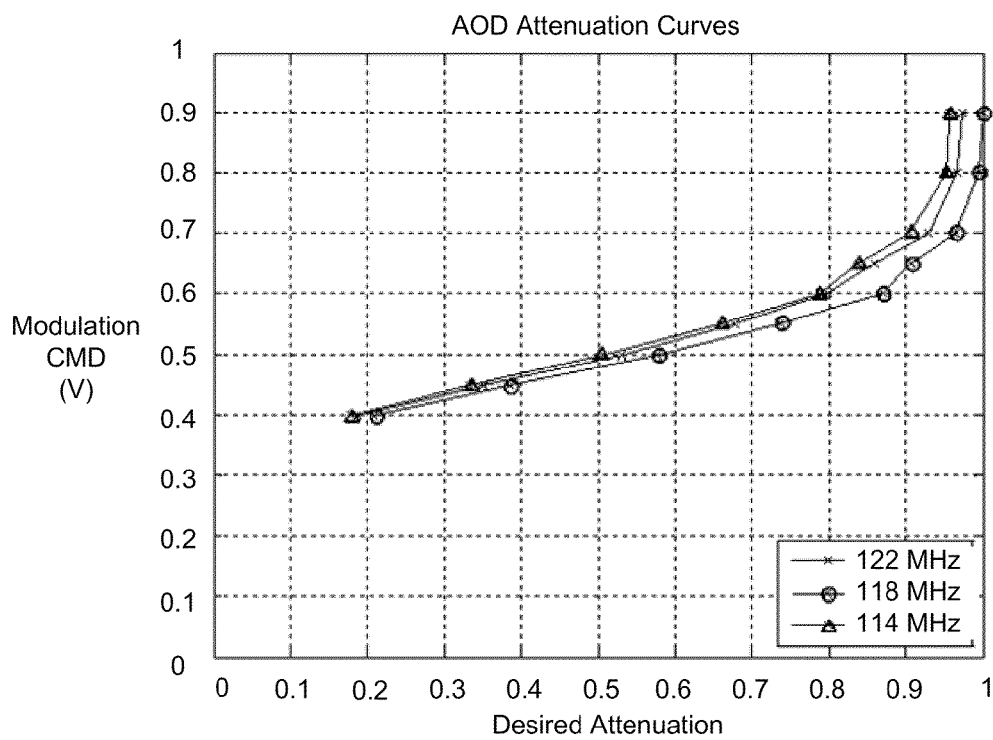
FIG. 21 graphically represents additional AOD linearization curves according to an example embodiment.

The AOD attenuates the output beam power when its RF drive amplitude is varied (with the RF frequency determining deflection amplitude). The attenuation characteristic is approximated by a sine function, with the peak transmission (minimum attenuation) at some value of the amplitude modulation command. This relation is illustrated by a "diffraction efficiency" (DE) curve, similar to that shown in FIGS. 20 and 21. For a single RF frequency (thus fixed deflection angle), this modulation curve may be linearized through a single (LUT).

A complication may arise when different RF frequencies (deflection positions) are used. The peak of the DE curve can occur at a different modulation command, and the DE peak value may vary as a function of RF frequency. While this effect may be minor (e.g., on the order of about 10% to about 20% for small deflection ranges, on the order of 5-10 spot diameters), it may be large enough to be of concern for some processing applications.

To normalize this properly, a unique amplitude modulation correction LUT can be applied for a specific range of frequencies. For certain embodiments, in which the deflection range is moderate (e.g., about three to five spot diameters), eight LUTs are sufficient. A set of LUTs may be used for each AOD axis.

The LUT can provide either a direct mapping to the amplitude modulation command, or a linearization scaling factor. The scale factor implementation can reduce the number of data points and/or the need to interpolate. A scaling implementation is shown in FIG. 22.

Because certain AOD operational modes may use fast (e.g., about 4 MHz) amplitude modulation, the LUT correction may be applied (at the FPGA level) for each frequency command update.

(d-v) Amplitude Modulation Summary

In summary, amplitude modulation may be generated by the product of three attenuation factors: (1) process power, (2) fast amplitude modulation (synchronized with position dithering), and (3) frequency-dependent linearization. The complete power modulation sequence can be described as follows: a process power modulation value (Kpwr) is specified, based on dosage and velocity (power=dosage*velocity) once per process update period; a frequency command is calculated from the dither table 2210 (once per dither update cycle); a high-speed amplitude modulation value (Kshape) is calculated (once per dither update cycle); the desired attenuation command is given by AttenDes=Kpwr*Kshape; and an amplitude modulation command is generated by the linearization LUT, based on the current frequency command and AttenDes.

FIG. 22 illustrates the FPGA AOD control blocks, including the details of position dither, shaping attenuation, low-speed attenuation, and linearization.

Note that, in certain embodiments, only one AOD may be needed to control power. There may be an advantage in keeping the analog modulation command constant for one AOD channel (Ch0) because an AOD operates more predictably in "saturation" or full-scale amplitude modulation. The second AOD (Ch1) controls beam attenuation.

The linearization table 2214 is still used to linearize the optical efficiency of Ch0. The product of the Ch0 attenuation command (Atten0), the global low-speed attenuation command (Kpwr), and the dither attenuation (Kshape) is the Ch1 selected attenuation (Atten1). This is processed by the Ch1 linearization table 2215, creating the Ch1 analog modulation command.

The Ch0 analog modulation command output for Ch0 is held at 1. The linearization table 2214 for Ch0 is then a function of a single parameter (frequency command). The Ch1 linearization table 2215 remains a function of both selected attenuation and frequency command.

(e) Resolution and Timing

The minimum resolution and update rates for the data described above are summarized in the table below. Higher resolution or faster update rates are acceptable. Although not discussed below, if using a laser with a pulse repetition frequency near the dither update frequency, the RF frequency updates may be synchronized with the laser pulse timing.

Latency correction 2216 may be provided to synchronize power control and beam positioning. Coordination tolerances during intersection processing are on the order of about 1 μm to about 2 μm at the workpiece. For processing velocities of about 1 m/s to about 2 m/s, this uses power coordination with a resolution of about 1 μs.

There are at least two areas where this coordination is used. In both cases, the quality of the intersection processing depends on control of the wall slopes of the intersecting trenches.

(e-i) Shaping Amplitude Modulation

A purpose of shaping amplitude modulation is to shape the sidewalls of a trench feature with amplitude modulation synchronized with the dither frequency. Latency sources such as DAC conversion and/or AOD driver response may be accounted for. In one embodiment, the shaping table 2212 is "skewed" relative to the frequency dither table 2210 because the update period for each is less than one microsecond.

(e-ii) Low Speed Amplitude Modulation

A purpose of the amplitude modulation is general process control, e.g., dosage control to maintain the desired feature depth. One case is the power control at the end of an intersecting trench. In this case, the power is quickly attenuated to create a proper endwall slope at the proper position. For endwall slope control to contribute less than about 5% depth variation at intersections, and assuming a 20 μm endwall transition zone, 1 μm positioning accuracy (due to both timing and beam positioner positioning) is used. If processing at about 1 m/s, this uses timing accuracy of less than about 1 μs.

One approach to intersection processing is to run the beam positioner past the intersection at constant velocity (to minimize disturbances to the positioning system), and time the dosage ramp-down such that it transitions at the correct position. Latency effects may be handled by shifting the transition position by (latency*velocity). But this may be risky because any variations in velocity (e.g., increasing up the process velocity) may have a side effect of shifting the transition point. Thus, latency adjustment 2216 is made by adjusting the timing of the dosage control relative to the beam positioner.

Both advance and retard adjustment can be performed by delaying the beam positioner position command in multiples of the command update period (Tupdate), and adjusting a dosage delay parameter for fractional delay times. The fractional delay can be implemented by an FIR filter on the dosage command before it is transmitted to the AOD subsystem. An example of a filter, for a delay less than the update period, is Dout[k]=(1−Cd)*Dcmd[k]+Cd*Dcmd[k−1], where Dout=latency-corrected dosage command to the AOD subsystem, Dcmd=dosage command from the command stream, k=time index, Cd=delay coefficient=delay/Tupdate, The following table summarizes the example parameters and data tables used in the AOD update calculations according to one embodiment.

| Variable | Minimum Update period | Data Source | Resolution (bits) | Array Size | Comment |
|---|---|---|---|---|---|
| Kpwr | 5 μs | Embedded SW | 12 | Scalar | Process power attenuation command |
| Ks | 5 μs | Embedded SW | 12 | Scalar | Shaping amplitude scaling (trench shape) |
| Kw | 5 μs | Embedded SW | 8 | Scalar | Dither position scaling (trench width) |
| Fd | 260 ns | FPGA-table | 8 | 256 × 1 | Dither frequency command |
| Shape | 260 ns | FPGA-table | 12 | 256 × 1 | High Speed Amplitude Modulation (dither amplitude control) |
| Klin | 260 ns | FPGA-table | 12 | 256 × 8 | Amplitude modulation linearization correction |
| Atten Delay | N/A | Loaded once | 8 | Scalar | Synchs amplitude modulation with galvo position |
| Freq Delay | N/A | Loaded once | 8 | Scalar | Synchs position dithering with galvo positioning |
| Fnom | 260 ns | Embedded SW | 8 | Scalar | Center frequency |

XIV. Example Intersection Processing Embodiments (a) Introduction

This section outlines the approach for creating intersecting features during laser processing. This type of processing helps create a functional laser processing system, and may be a challenge in the system design.

A challenge of intersection processing for the ablated features, according to certain embodiments, is due to a desired control of depth variation of about ±10%. Reasons for the depth control tolerance include breakdown voltage (from trace to underlying ground planes), leakage, and impedance variations.

(b) Basic Approach

The depth of an ablated feature is roughly linear with the accumulated laser fluence. Thus double exposure of an intersection may result in about 100% depth variation. To avoid this, intersections are created by terminating the cutting of a "butting" trench at the point of intersection. The depth variation using this approach depends on the shape of the processing beam, which can be modified through position and amplitude modulation.

(b-i) Gaussian Beams

Figure 23:
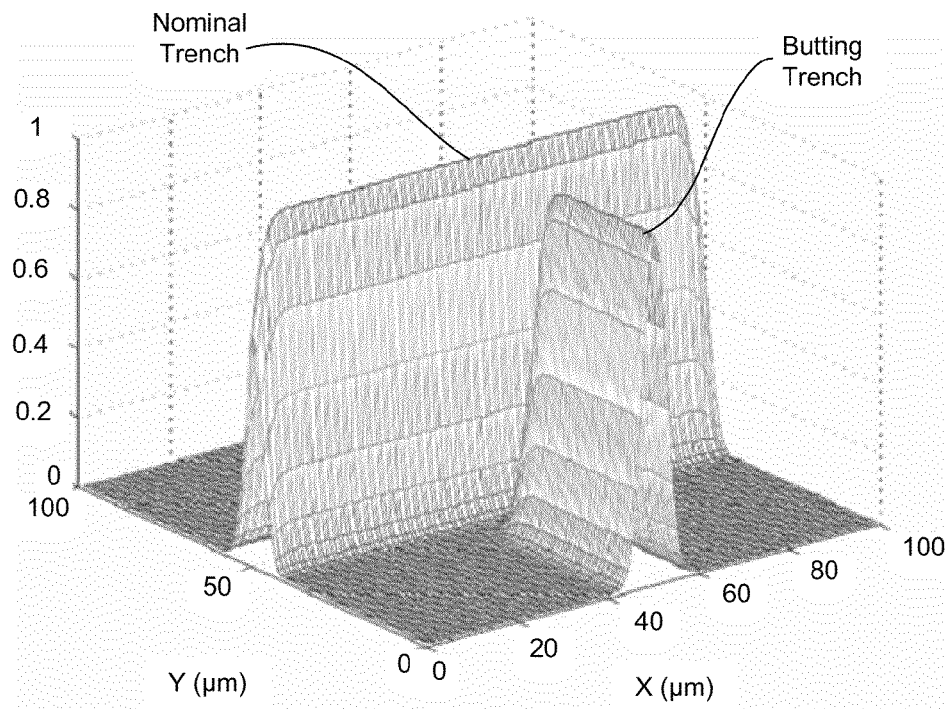
FIG. 23 graphically represents an approach of a butting trench at an intersection according to one embodiment.
Figure 24:
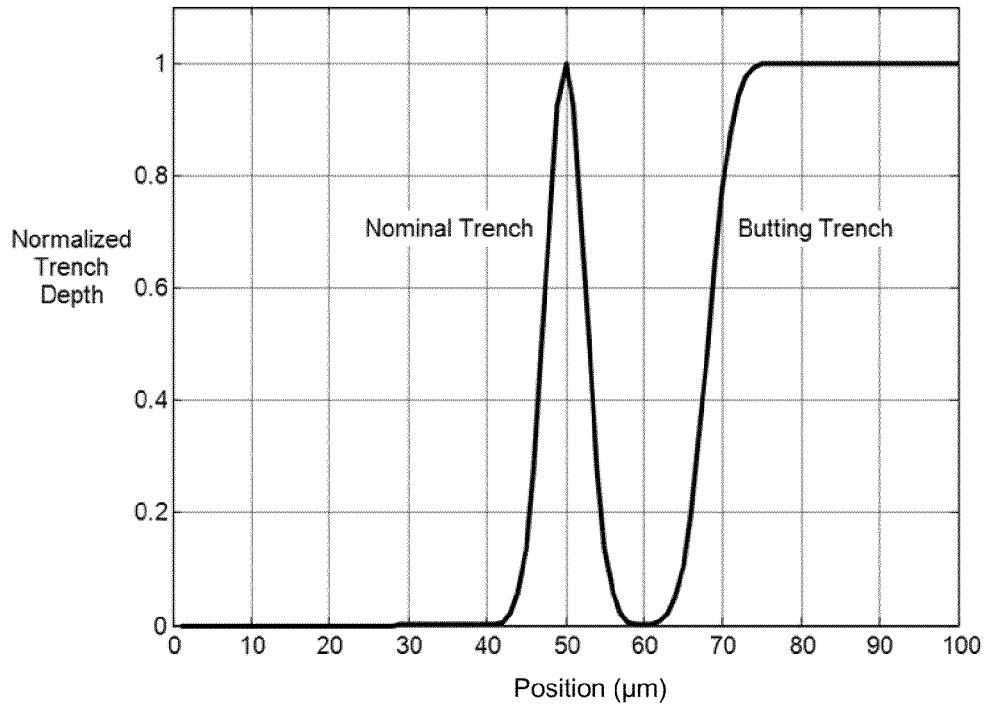
FIG. 24 graphically represents a cross-section profile of the butting and nominal trenches shown in FIG. 23 according to one embodiment.
Figure 25:
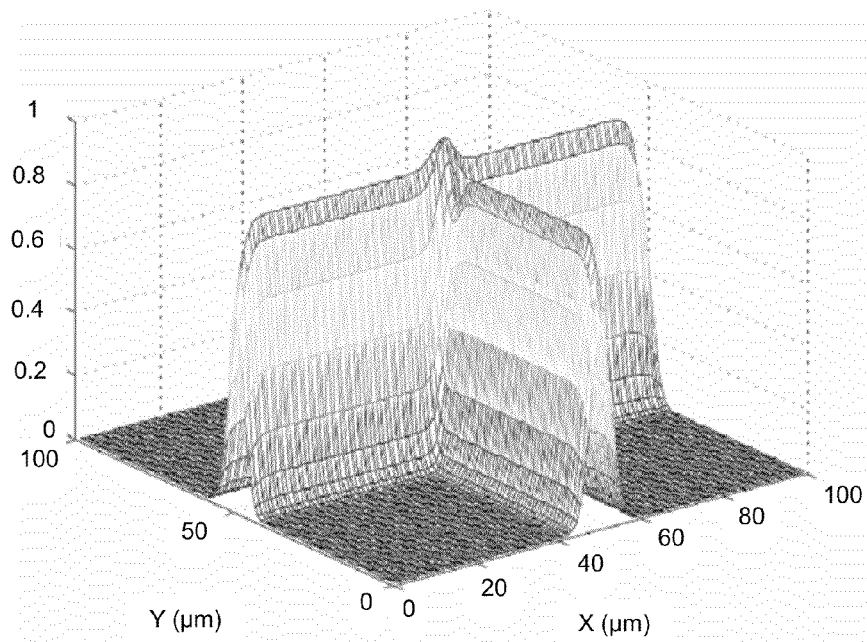
FIG. 25 graphically represents an optimum intersection with Gaussian beams according to one embodiment.
Figure 26:
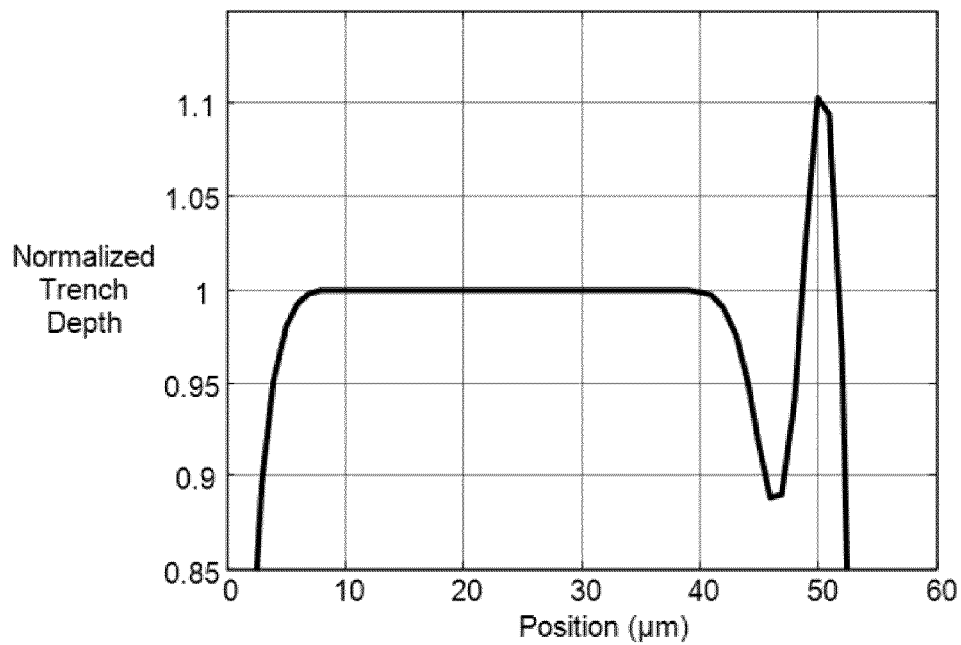
FIG. 26 graphically represents a cross-section profile of the optimum intersection with Gaussian beams shown in FIG. 25 according to one embodiment.

The system may cut an intersecting feature such that it ends at an optimum overlap point that minimizes depth variation. However, the accumulated fluence of Gaussian beams may make this difficult. FIG. 23 illustrates a nominal trench and a butting trench before the intersection is processed. FIG. 24 illustrates the cross-section along the butting trench axis shown in FIG. 23. Note that the end slope of the butting trench is smaller than that of the nominal trench in cross-section. This may be due to the accumulated fluence at the head of the butting trench. With a slope mismatch, a perfect intersection may not be able to be created. FIGS. 25 and 26 illustrate the result of the optimum intersection, which has a depth variation of about ±10%. The intersection allows no tolerance for position variation.

(b-ii) Dithered Beam

Figure 27:
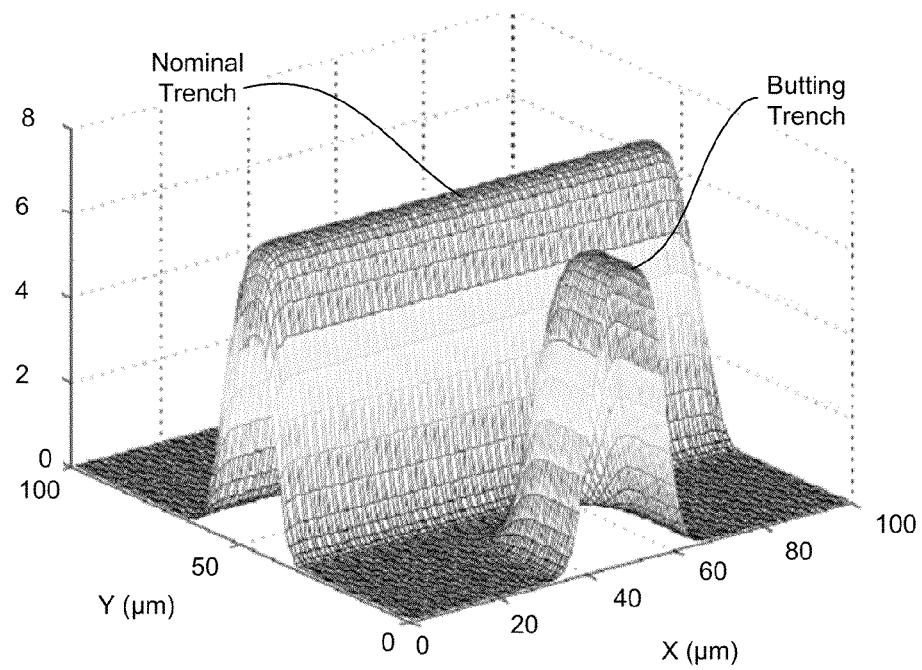
FIG. 27 graphically represents dithered trenches before intersection according to one embodiment.
Figure 28:
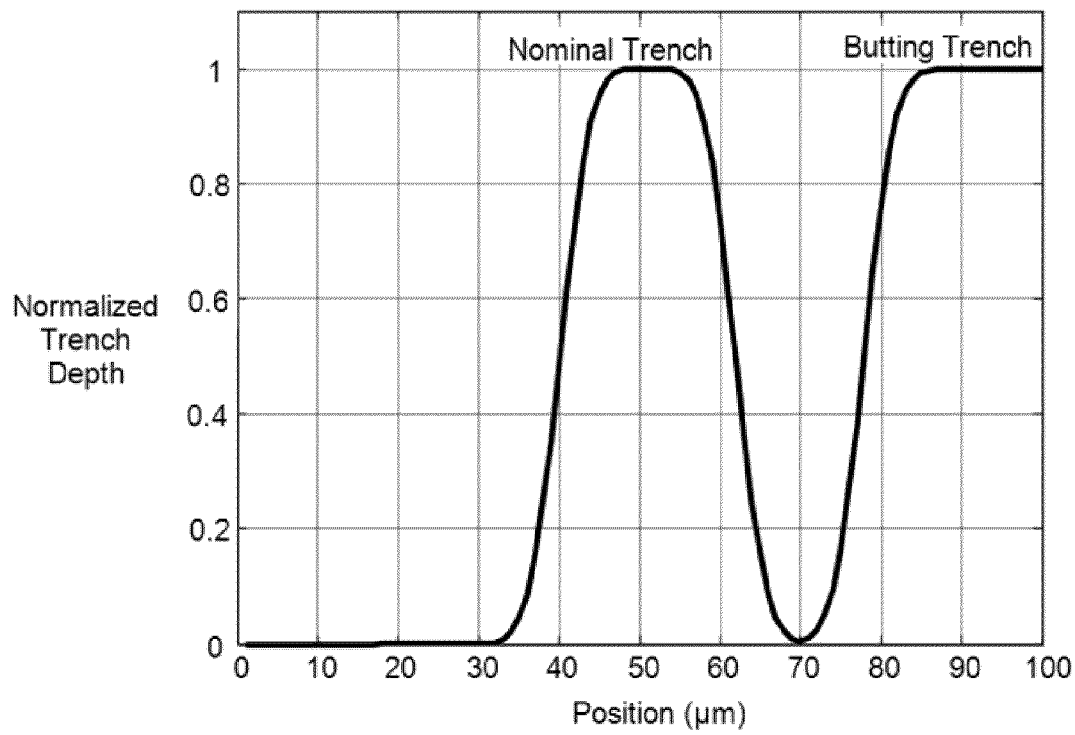
FIG. 28 graphically represents a cross-section profile of the nominal and butted trenches with dither shown in FIG. 27 according to one embodiment.
Figure 29:
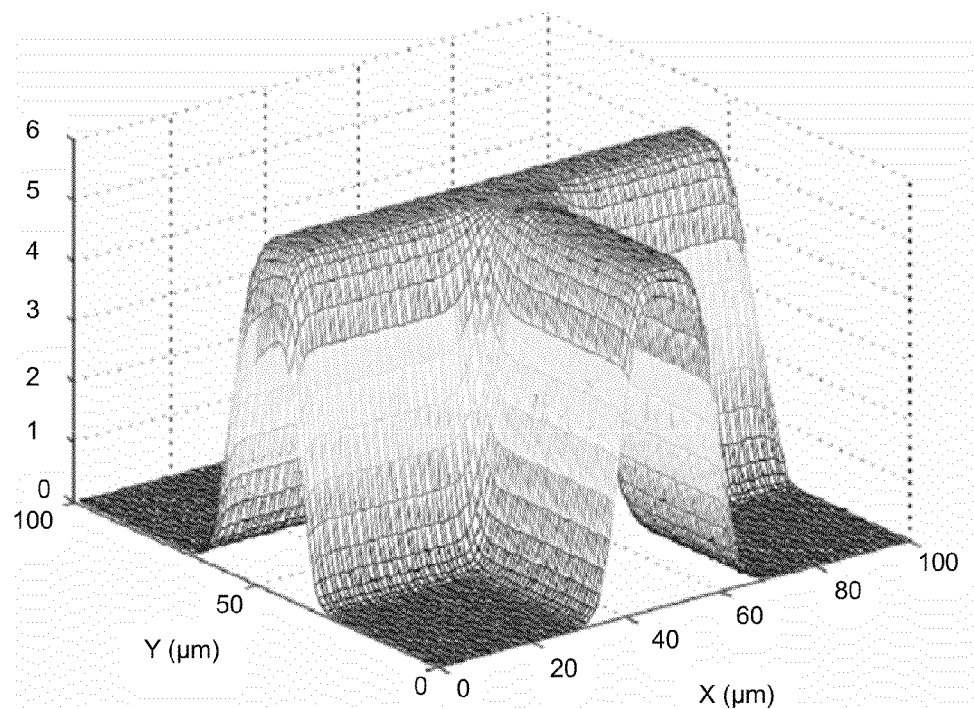
FIG. 29 graphically represents an optimum intersection with dithered beams according to one embodiment.
Figure 30:
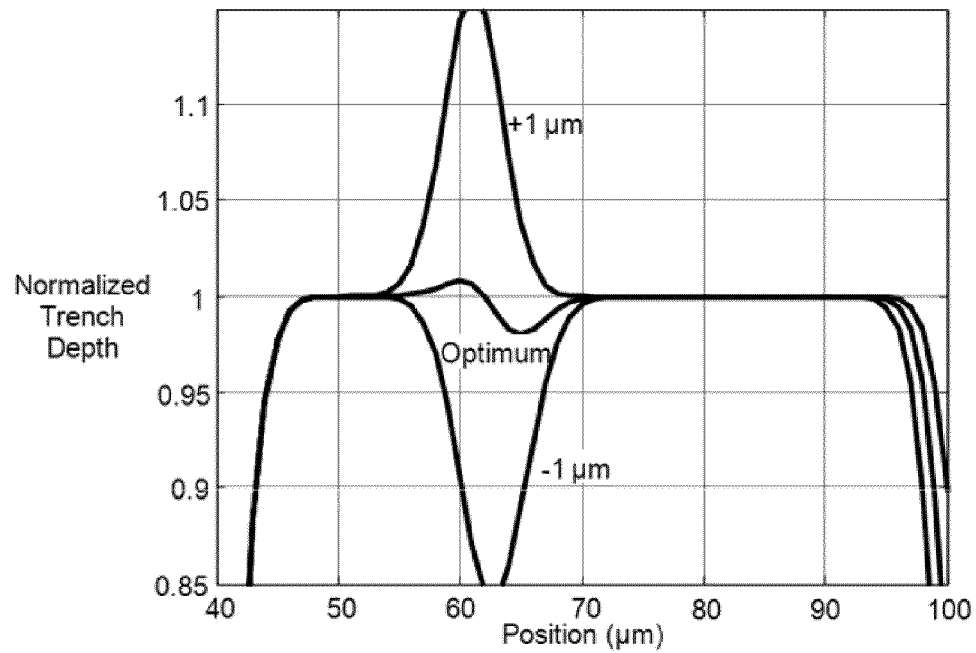
FIG. 30 graphically represents an intersection cross-section with dithered beams (optimum+sensitivity) corresponding to FIG. 29 according to one embodiment.

When the process beam is not dithered, the resulting trench slopes are determined by the (constant) Gaussian spot diameter. By dithering the process beam normal to the trench axis, the side slope can be modified such that the butting and nominal slopes are nearly equal, and less steep (see FIGS. 27 and 28). At the optimum intersection point, the depth variation is less than about 2% (see FIGS. 29 and 30). However, sensitivity to positioning error may still be unacceptable, e.g., a 1 μm position error may produce more than 10% depth variation.

(b-iii) Slope Shaping

The dithered beams improve the intersection because the dithering reduces the slopes of the intersecting process beams. However, these slopes may be only moderately reduced by dithering the beam position while holding beam power constant. Additional control of the trench slopes can be provided by modulating the power of the dithered beam as a function of dither position for the "nominal" trench (to control its sidewall slope), and/or by modulating the power of the beam as the butting trench approaches the intersection (to control the endwall slope).

Assuming an intersection positioning error tolerance of Ebp, and an allowable relative depth variation of Δ, the width of the slope transition zone is given by Ws=Ebp/Δ. For example, with Ebp=1 μm and Δ=0.05 (5%), Ws=20 μm.

A simple way to create a controlled slope is to profile the AOD attenuation, with a linear ramp from 0 to 1 over the transition zone (using dither modulation for the nominal trench, and position-dependent modulation on the butting trench). The resulting accumulated fluence is a convolution of the amplitude modulation and the beam profile. A "flat top" portion of the attenuation curve equal to the beam diameter keeps the transition slope from being influenced by the opposite slope.

Figure 31:
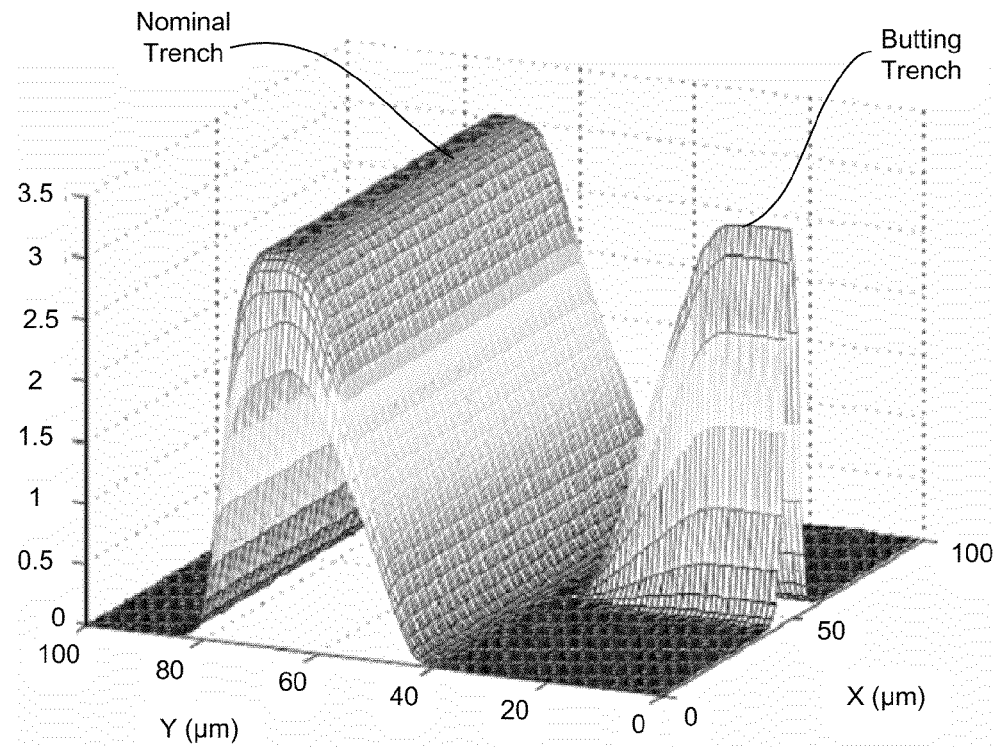
FIG. 31 graphically represents a wide transition edge for improved position tolerance (before intersection) according to one embodiment.
Figure 32:
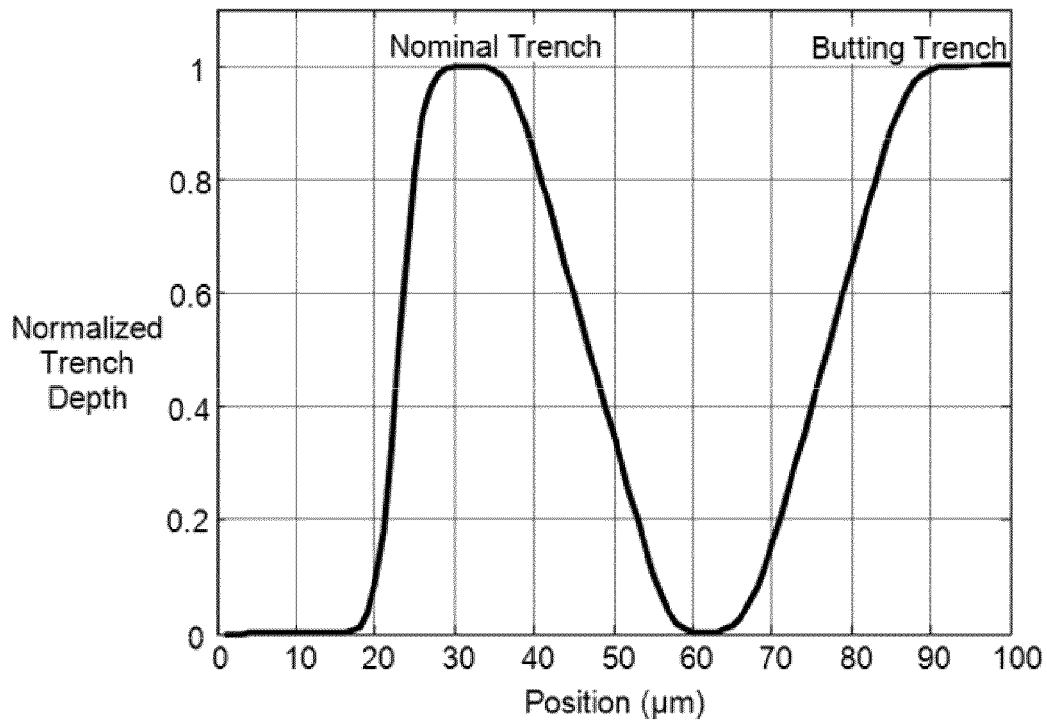
FIG. 32 graphically represents a cross-section profile of the nominal and butted trenches with wide transition trenches (before intersection) shown in FIG. 31 according to one embodiment.

FIG. 31 illustrates a nominal and butting trench pair, with a 20 μm width on the transition slope. FIG. 32 illustrates the cross-section of the trenches before intersection. In this case, only one wall of the nominal trench is sloped, while the profile of the butting trench is not shaped. The shaping may be desirable to minimize throughput impacts. Shaping may be implemented through attenuation and thus reduces effective laser power and throughput. In cases where the nominal and butting trenches are formed with different dither patterns, the effective dosage (J/m) applied to the two trenches is adjusted to normalize the trench depth.

Figure 33:
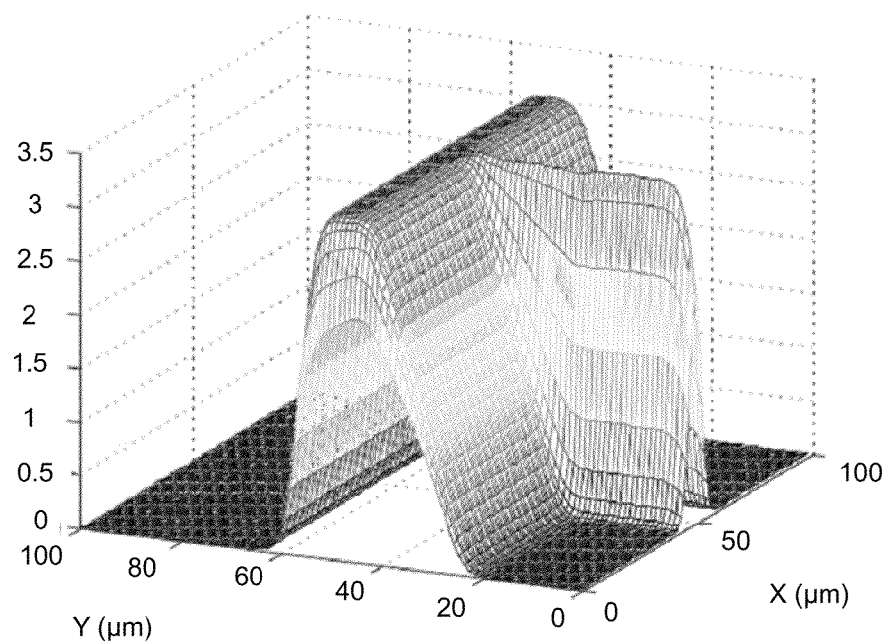
FIG. 33 graphically represents an optimum intersection with a wide transition edge according to one embodiment.
Figure 34:
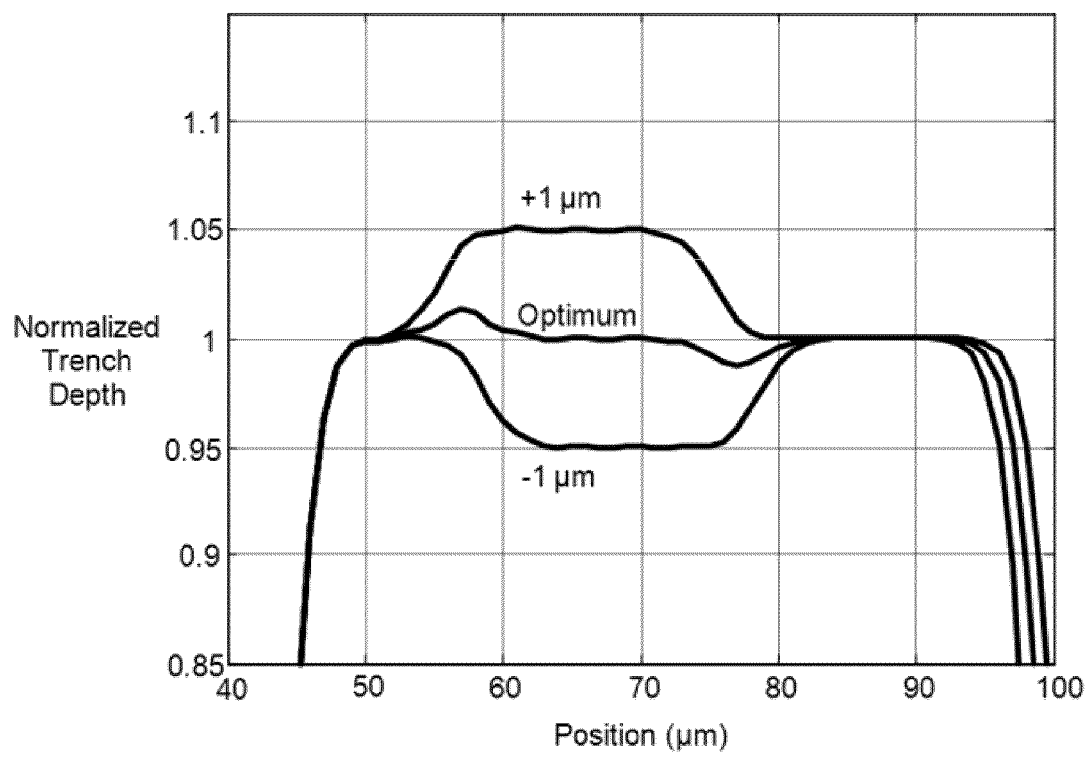
FIG. 34 graphically represents an intersection cross-section with wide transition (optimum+sensitivity) corresponding to FIG. 33 according to one embodiment.
Figure 35:
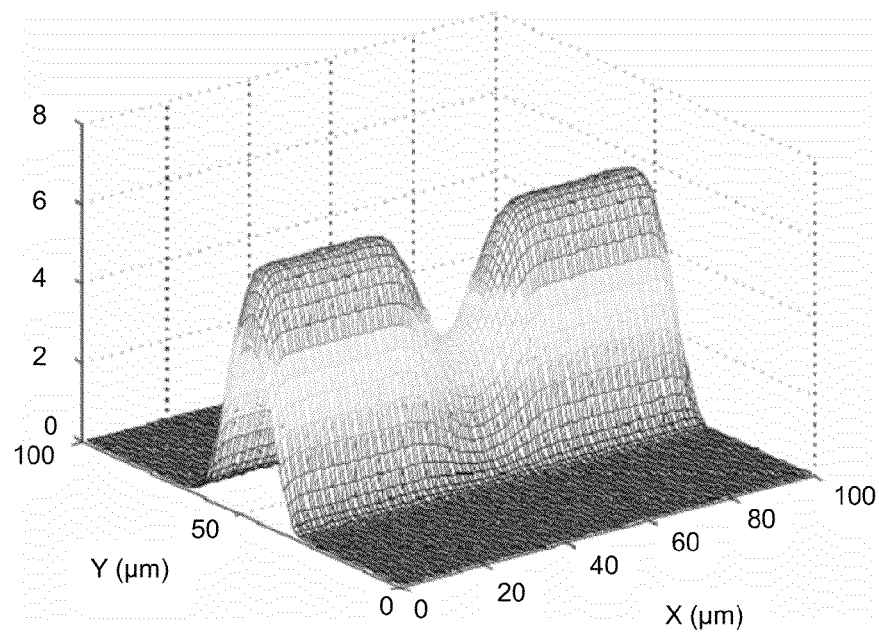
FIG. 35 graphically represents a crossed intersection trench with a notch according to one embodiment.
Figure 36:
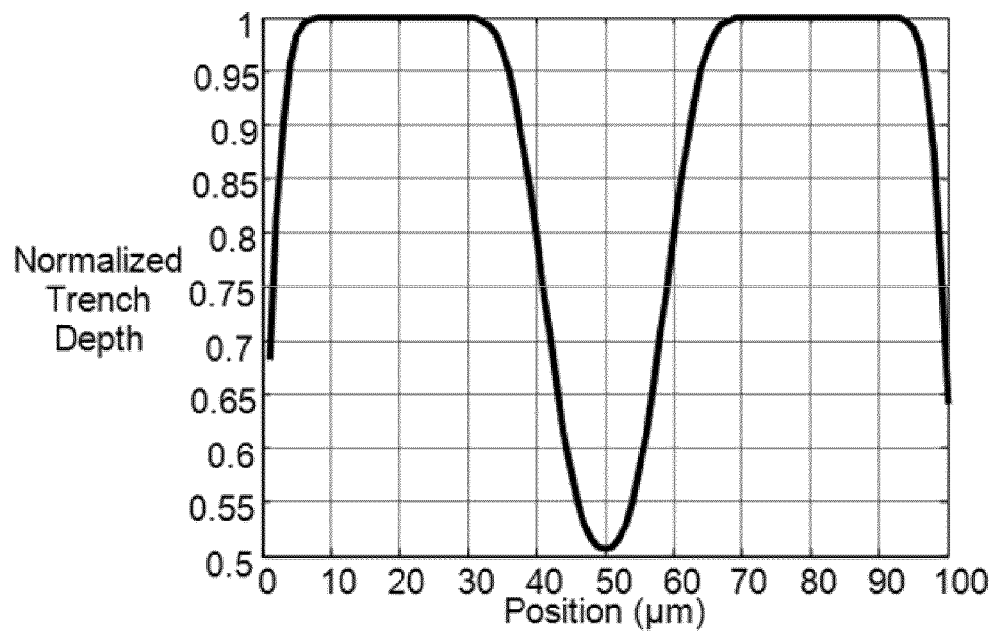
FIG. 36 graphically represents a cross-section profile of the notched trench shown in FIG. 35 according to one embodiment.
Figure 37:
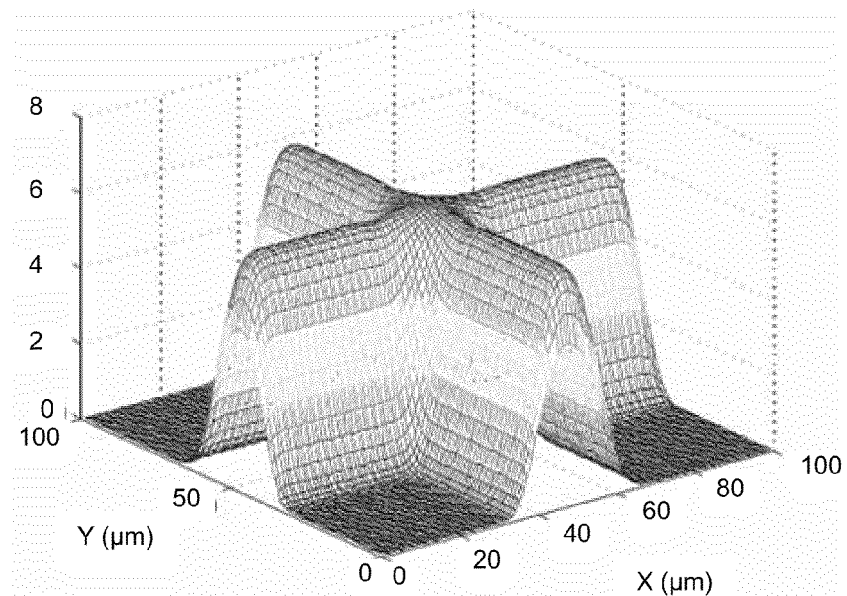
FIG. 37 graphically represents an optimum crossed intersection according to one embodiment.
Figure 38:
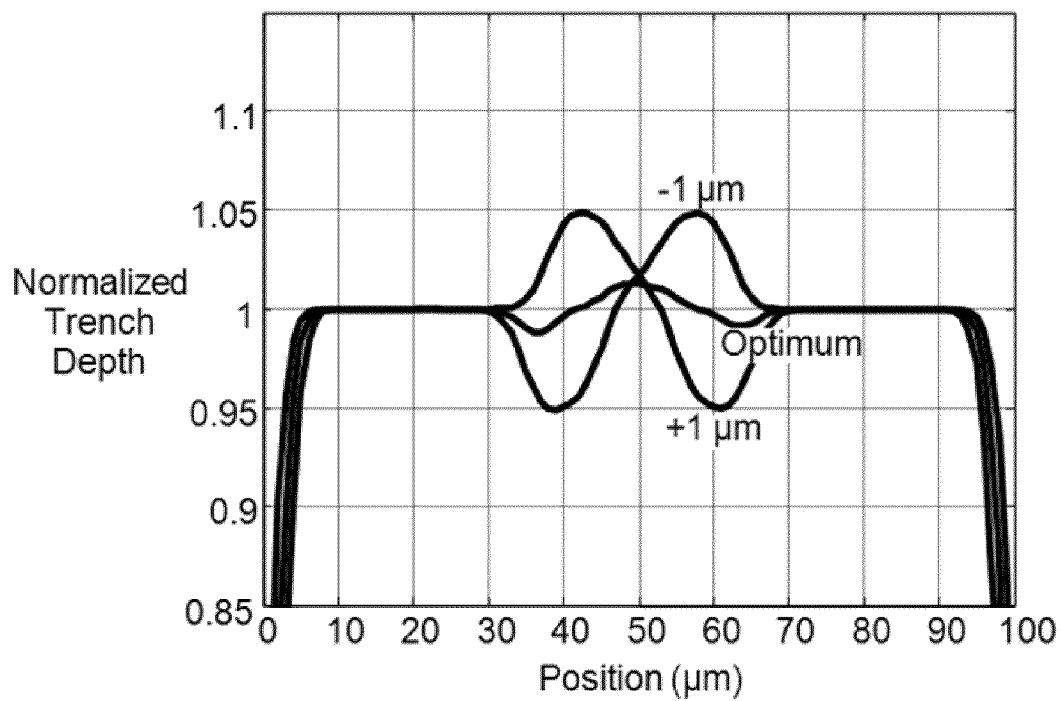
FIG. 38 graphically represents an intersection cross-section with a wide transition (optimum+sensitivity) corresponding to FIG. 37 according to one embodiment.

FIG. 33 illustrates the completed intersection with optimum positioning, while FIG. 34 illustrates the resulting depth variation at the optimum position and with ±1 μm tolerance. As expected, the 20 μm width transition creates about ±5% depth variation given about ±1 μm positioning error.

(b-iv) Crossed Intersection

The previous example provided good control over the intersection depth, at the expense of a wider trench dimension. This can become a problem if the travel range of the dither mechanism is constrained, which may be the case with AODs. An alternative approach which reduces the dither travel range is to process the intersection with crossed, rather than butted, trenches. Each trench is processed with a symmetrical "notch" at the intersection. With the notch depth equal to half the nominal trench depth, the side slopes can be half as steep for the same trench width. Thus, for the same dither width, the crossed approach is half as sensitive to positioning errors as the butting approach.

While crossed intersections generate a short stub on one side of a "T" intersection, according to certain embodiments, the stub's short length (of a few microns) may cause minimal impedance effects. Conversely, this approach allows for using identical processing for the two intersecting trenches and simplifies the processing of crossed (non-"T") intersections.

FIGS. 35, 36, 37, and 38 illustrate the properties of crossed intersections using notches according to certain embodiments. The same position tolerance is achieved while using a dither width half that of the previous example.

Figure 39:
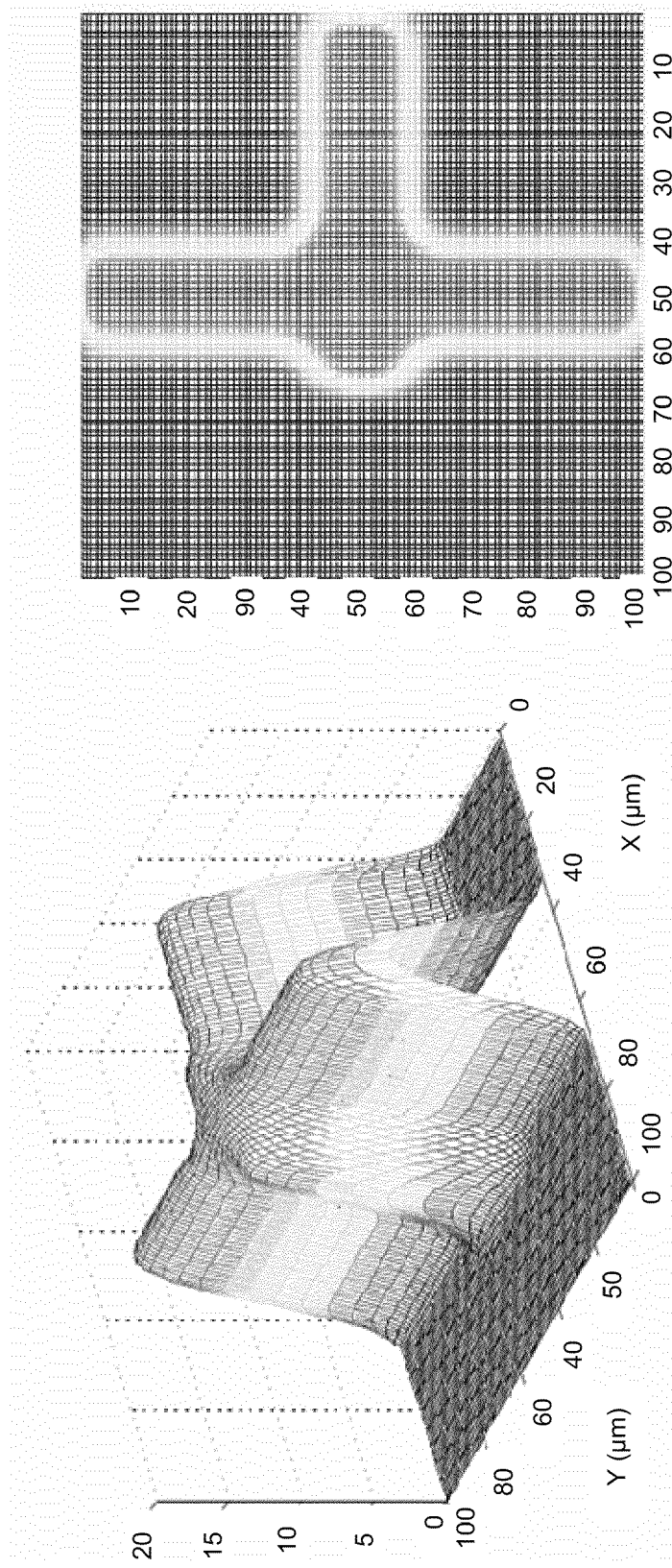
FIG. 39 graphically represents a "T" intersection processed with cross trenches according to one embodiment.

FIG. 39 illustrates one embodiment of a T intersection, which creates a small stub (a few microns long) at the intersection. As discussed above, the embodiment shown in FIG. 39 may be created using notches at the intersection. The resulting stub may cause little or no changes to impedance when the resulting trenches are plated for electrical conduction.

(c) Processing Parameter Definition

In order to properly process intersections, according to certain embodiments, the parameters for position dithering, amplitude dithering, and power control are defined. These parameters depend on various properties of the application, such as nominal Gaussian spot size, trench depth, trench width, and process velocity. In the example architecture described above, the high-speed amplitude and position dither parameters are created using FPGA look-up tables. Creating all intersections with the same dither parameters, according to certain embodiments, avoids excessive complexity with multiple dither tables. This implies that the same dither parameters used for intersections apply for generating wide trenches, which may be acceptable. Another embodiment includes loading multiple dither tables for different feature types.

To process an intersection, at least some of the following steps may be followed: change velocity to that desired for the intersection (e.g., based on precision, command update rates, and other processing factors); change width (dither position) and dosage (to maintain depth); change cross-sectional shape (dither amplitude) and dosage (to maintain depth, if required); decrease dosage (create intersection slope); maintain dosage at half of nominal for some distance (this may be optional); increase dosage (create opposite intersection slope); change cross-sectional shape (dither amplitude) and dosage (to maintain depth, if required); change width (dither position) and dosage (to maintain depth); and change velocity back to nominal.

In certain embodiments, the steps may be completed sequentially and separately in order to avoid interactions that may affect depth control (e.g., nonlinear power control may be used when combining width and velocity change).

Figure 40:
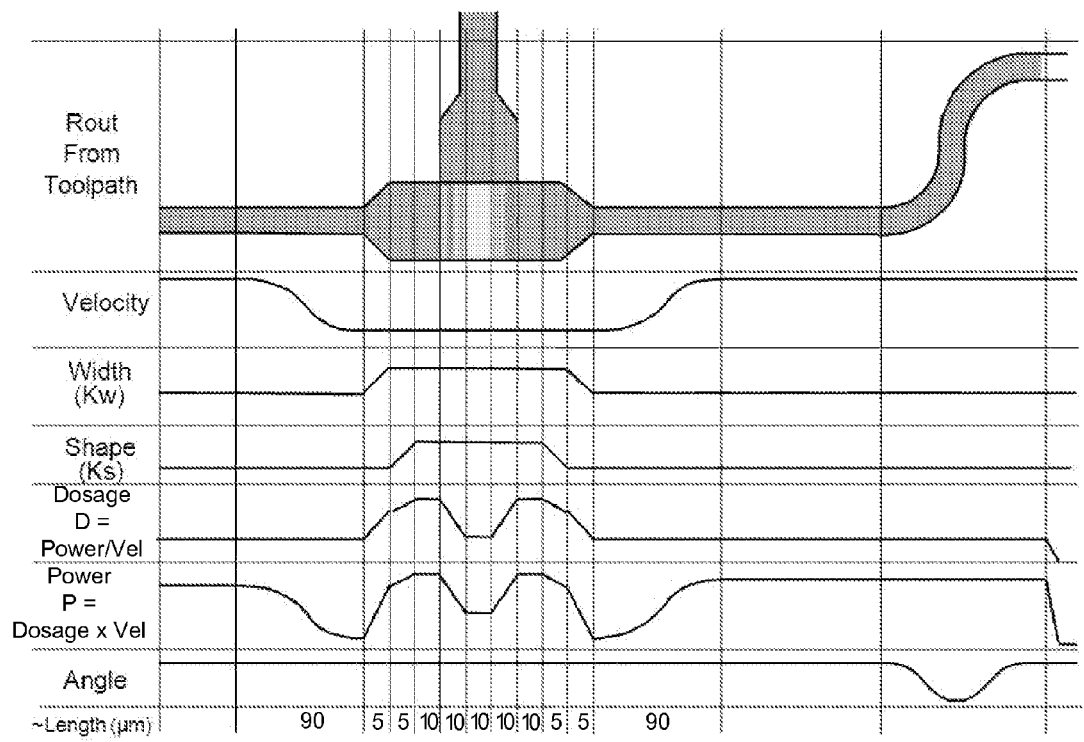
FIG. 40 graphically represents dynamics of dosage and shape control at intersections according to one embodiment.

The diagram of FIG. 40 illustrates the dynamics of dosage and shape control at intersections according to one embodiment.

It will be understood by those having skill in the art that many changes may be made to the details of the above-described embodiments without departing from the underlying principles of the invention. The scope of the present invention should, therefore, be determined only by the following claims.

What is claimed is:

1. A method for aligning a processing laser beam to workpiece features, the processing laser beam comprising a predetermined wavelength for processing the workpiece features, the method comprising:
   propagating the processing laser beam along a propagation path through a scan lens to a workpiece;
   manipulating the processing laser beam so as to illuminate, through the scan lens, a selected region of the workpiece comprising an alignment target with the manipulated processing laser beam at the predetermined wavelength, wherein the selected region is larger than a reference laser beam spot of the processing laser beam provided through the scan lens;

directing at least a portion of a reflection of the manipulated processing laser beam back through the scan lens to a camera for imaging the selected region of the workpiece; and based on an image of the selected region captured by the camera, determining a position of the reference laser beam spot relative to the alignment target.

2. The method of claim 1, further comprising:

calculating a positioning error based on the determined position of the reference laser beam spot relative to the alignment target;

based on the calculated positioning error, positioning a processing laser beam spot position relative to a selected workpiece feature; and propagating the processing laser beam along the propagation path through the scan lens so as to focus the processing laser beam at the predetermined wavelength at the processing laser beam spot position to process the selected workpiece feature.

3. The method of claim 1, wherein manipulating the processing laser beam so as to illuminate the selected region of the workpiece comprises:

diffusing or defocusing the processing laser beam.

4. The method of claim 1, wherein manipulating the processing laser beam so as to illuminate the selected region of the workpiece comprises:

using an acousto-optic deflector (AOD) subsystem to generate a raster pattern of laser beam spots that fills the selected region of the workpiece with a uniform fluence.

5. The method of claim 1, further comprising:

propagating the processing laser beam along the propagation path through the scan lens so as to focus the processing laser beam at a plurality of laser beam spot positions at the workpiece;

imaging, through the scan lens using the camera, a respective laser beam spot at each of the plurality of laser beam spot positions at the workpiece; and based on the imaging, measuring a size of each of the respective laser beam spots to correct a height of the scan lens with respect to the workpiece to maintain a desired spot focus.

6. The method of claim 1, wherein the steps of manipulating the process laser beam so as to illuminate a selected region of the workpiece and determining the laser beam spot position relative to the alignment target are performed during an alignment procedure before processing the workpiece features with the processing laser beam.

7. The method of claim 1, wherein the steps of manipulating the process laser beam so as to illuminate a selected region of the workpiece and determining the laser beam spot position relative to the alignment target are performed in real-time during processing of the workpiece features with the processing laser beam.

8. The method of claim 4, further comprising:

using the AOD subsystem to provide the reference laser beam spot at a higher intensity than that of the raster pattern of laser beam spots to use as a reference for the determination of the position of the reference laser beam spot relative to the alignment target.

9. A laser processing system for aligning a processing laser beam to workpiece features, the processing laser beam comprising a predetermined wavelength for processing the workpiece features, the system comprising:

a laser source for providing the processing laser beam;
a scan lens to focus the processing laser beam at a laser beam spot on or in the workpiece;

an acousto-optic deflector (AOD) subsystem to:

generate a raster pattern of laser beam spots that illuminates a selected region of the workpiece, through the scan lens, with a uniform fluence, wherein the selected region includes an alignment target; and provide, through the scan lens, the reference laser beam spot within the selected region, wherein the reference laser beam spot is at a higher intensity than that of the raster pattern of laser beam spots;

optical elements to direct at least a portion of a reflection of the processing laser beam from the selected region back through the scan lens; and a camera for imaging the selected region of the workpiece, wherein the image of the selected region is used to determine a position of the reference laser beam spot relative to the alignment target.

10. The system of claim 9, wherein the optical elements comprise:

a partial reflector for receiving the reflection of the processing laser beam from the selected region through the scan lens; and an imaging lens for receiving at least a portion of the reflection of the processing laser beam from the partial reflector and focusing the at least a portion of the reflection onto an aperture of the camera.

11. The system of claim 9, further comprising:

a controller for:

calculating a positioning error based on the determined position of the reference laser beam spot relative to the alignment target; and based on the calculated positioning error, commanding the AOD subsystem to position a processing laser beam spot position relative to a selected workpiece feature;

wherein the processing laser beam propagates along the propagation path through the scan lens so as to focus the processing laser beam at the predetermined wavelength at the processing laser beam spot position to process the selected workpiece feature.

12. A system for aligning a processing laser beam to workpiece features, the processing laser beam comprising a predetermined wavelength for processing the workpiece features, the method comprising:

means for propagating the processing laser beam along a propagation path through a scan lens to a workpiece;

means for manipulating the processing laser beam so as to illuminate, through the scan lens, a selected region of the workpiece comprising an alignment target with the manipulated processing laser beam at the predetermined wavelength, wherein the selected region is larger than a reference laser beam spot of the processing laser beam provided through the scan lens;

means for directing at least a portion of a reflection of the manipulated processing laser beam back through the scan lens to a camera for imaging the selected region of the workpiece; and means for determining, based on an image of the selected region captured by the camera, a position of the reference laser beam spot relative to the alignment target.

13. The system of claim 12, wherein the means for manipulating the processing laser beam so as to illuminate the selected region of the workpiece comprises:

means for diffusing or defocusing the processing laser beam.

14. The system of claim 12, wherein the means for manipulating the processing laser beam so as to illuminate the selected region of the workpiece comprises:

means for generating a raster pattern of laser beam spots that fills the selected region of the workpiece with a uniform fluence.

15. The system of claim 14, wherein the means for generating the raster pattern is further for providing the reference laser beam spot at a higher intensity than that of the raster pattern of laser beam spots to use as a reference for the determination of the position of the reference laser beam spot relative to the alignment target.

* * * * *

UNITED STATES PATENT AND TRADEMARK OFFICE
Certificate

Patent No. 8,288,679 B2                                                             Patented: October 16, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Mark A. Unrath, Portland, OR (US); and Mehrube Mehrubeoglu, Corpus Christi, TX (US).

Signed and Sealed this Twentieth Day of May 2014.

OLIK CHAUDHURI
*Supervisory Patent Examiner*
Art Unit 2823
Technology Center 2800